Nov. 21, 1950 J. H. VOSS ET AL 2,530,845

RELAY AUTOMATIC TELEPHONE SYSTEM

Original Filed Dec. 31, 1945 23 Sheets-Sheet 1

INVENTORS.
JOHN H. VOSS
ROY W. JONES
BY
Chas. W. Candy
ATTORNEY

Nov. 21, 1950 J. H. VOSS ET AL 2,530,845

RELAY AUTOMATIC TELEPHONE SYSTEM

Original Filed Dec. 31, 1945 23 Sheets-Sheet 2

INVENTORS.
JOHN H. VOSS
ROY W. JONES
BY
Chas. Tre. Candy
ATTORNEY

RELAY AUTOMATIC TELEPHONE SYSTEM

INVENTORS.
JOHN H. VOSS
ROY W. JONES
BY
Chas. Lu. Candy
ATTORNEY

RELAY AUTOMATIC TELEPHONE SYSTEM

Original Filed Dec. 31, 1945 23 Sheets-Sheet 4

INVENTORS.
JOHN. H. VOSS
ROY W. JONES
BY
[signature]
ATTORNEY

Nov. 21, 1950 J. H. VOSS ET AL 2,530,845

RELAY AUTOMATIC TELEPHONE SYSTEM

Original Filed Dec. 31, 1945 23 Sheets-Sheet 5

*INVENTORS.*
JOHN H. VOSS
ROY W. JONES

*BY* Chas. W. Candy

ATTORNEY

Nov. 21, 1950 J. H. VOSS ET AL 2,530,845

RELAY AUTOMATIC TELEPHONE SYSTEM

Original Filed Dec. 31, 1945 23 Sheets-Sheet 6

INVENTORS.
JOHN H. VOSS
ROY W. JONES.
BY
Chas. W. Candy
ATTORNEY

Nov. 21, 1950 J. H. VOSS ET AL 2,530,845

RELAY AUTOMATIC TELEPHONE SYSTEM

Original Filed Dec. 31, 1945 23 Sheets-Sheet 7

INVENTORS
JOHN H. VOSS
ROY W. JONES

BY

Chas. W. Candy

ATTORNEY

INVENTORS.
JOHN H. VOSS
ROY W. JONES
BY
Chas. W. Candy
ATTORNEY

RELAY AUTOMATIC TELEPHONE SYSTEM

Original Filed Dec. 31, 1945 23 Sheets-Sheet 9

INVENTORS.
JOHN H. VOSS
ROY W. JONES
BY
ATTORNEY

INVENTORS.
JOHN H. VOSS
ROY W. JONES
BY Chas. W. Candy
ATTORNEY

RELAY AUTOMATIC TELEPHONE SYSTEM

Original Filed Dec. 31, 1945 23 Sheets-Sheet 11

INVENTORS.
JOHN H. VOSS
ROY W. JONES
BY [signature]
ATTORNEY

RELAY AUTOMATIC TELEPHONE SYSTEM

Original Filed Dec. 31, 1945 23 Sheets-Sheet 12

INVENTORS.
JOHN H. VOSS
ROY W. JONES
BY
Chas. W. Candy
ATTORNEY

RELAY AUTOMATIC TELEPHONE SYSTEM

Original Filed Dec. 31, 1945 23 Sheets-Sheet 13

INVENTORS.
JOHN H. VOSS
ROY W. JONES
BY [signature]
ATTORNEY

INVENTORS.
JOHN H. VOSS
ROY W. JONES
BY
ATTORNEY

RELAY AUTOMATIC TELEPHONE SYSTEM

Original Filed Dec. 31, 1945 23 Sheets-Sheet 15

INVENTORS.
JOHN H. VOSS
ROY W. JONES
BY [signature]
ATTORNEY

RELAY AUTOMATIC TELEPHONE SYSTEM

INVENTORS.
JOHN H. VOSS
ROY W. JONES
BY
ATTORNEY

INVENTORS.
JOHN H. VOSS
ROY W. JONES
BY
ATTORNEY

Nov. 21, 1950 J. H. VOSS ET AL 2,530,845
RELAY AUTOMATIC TELEPHONE SYSTEM
Original Filed Dec. 31, 1945 23 Sheets-Sheet 18

INVENTORS.
JOHN H. VOSS
ROY W. JONES
BY
ATTORNEY

INVENTORS.
JOHN H. VOSS
ROY W. JONES
BY [signature]
ATTORNEY

INVENTORS.
JOHN H. VOSS
ROY W. JONES
BY Chas. Ter. Candy
ATTORNEY

RELAY AUTOMATIC TELEPHONE SYSTEM

Original Filed Dec. 31, 1945 23 Sheets-Sheet 21

INVENTORS.
JOHN H. VOSS
ROY W. JONES
BY
[signature]
ATTORNEY

RELAY AUTOMATIC TELEPHONE SYSTEM

Original Filed Dec. 31, 1945 23 Sheets-Sheet 22

INVENTORS.
JOHN H. VOSS
ROY W. JONES
BY [signature]
ATTORNEY

RELAY AUTOMATIC TELEPHONE SYSTEM

INVENTORS.
JOHN H. VOSS
ROY W. JONES
BY Chas. M. Candy
ATTORNEY

Patented Nov. 21, 1950 2,530,845

UNITED STATES PATENT OFFICE 2,530,845

RELAY AUTOMATIC TELEPHONE SYSTEM

John H. Voss and Roy W. Jones, Rochester, N. Y., assignors to Automatic Electric Laboratories, Inc., Chicago, Ill., a corporation of Delaware Original application December 31, 1945, Serial No. 632,444. Divided and this application November 19, 1948, Serial No. 60,843

9 Claims. (Cl. 179—27)

The present invention relates to automatic telephone systems, and more particularly to improvements in automatic switching equipment. These improvements are applicable in a network of small exchanges where there are varied traffic requirements, such as free service privileges to adjacent exchanges for some subscribers, while others pay toll. This application is a division of application Serial No. 632,444 filed December 31, 1945 now Patent 2,491,291.

The traffic conditions mentioned above may occur where subscribers, in an area that is too small for a profitable exchange, are given service through an adjacent exchange, and tariff schedules may require that these transferred subscribers have extended free service to other adjacent exchanges. In applying this extended service to small exchanges, it is not economical or practical to route free service calls to an operator, nor to segregate subscriber lines within the exchange, nor to provide separate groups of trunks for free service and toll service. Accordingly, it is one of the broad objectives of the present invention to arrange for readily adapting any line or group of lines for extending calls over any predetermined group or groups of trunks, while other, "restricted" lines, are excluded from this service.

A feature of the invention is the extension of the line service-classification markings to the inter-office trunk repeaters, whereby specified lines are provided special trunk privileges that are denied other lines.

Another feature of the invention is the provision of means whereby an operator may override a busy condition or control supervisory equipment by dialling suffix digits over a trunk, together with means in the associated repeater for limiting the number of digits restricted stations may dial over such trunk.

Another feature of the invention is the provision of special lock pulsing elements in the various pulse repeating circuits, to compensate for long or short impulses coming in over the lines or trunks.

Still another feature of the invention is the provision of a special dial back repeater for serving a plurality of toll trunks, with a relay type allotter for preselecting idle ones of said trunks for use one at a time, in rotation.

The above-mentioned objects and features together with other features not specially mentioned will be apparent from the following general and detailed description of the drawings which form a part of this specification.

The invention both as to its organization and method of operation together with its objects and advantages will be better understood by considering their application in a telephone system as a whole. Accordingly, Fig. 1 illustrates diagrammatically the embodiment of a small branch exchange in a network of four exchanges. The small exchange is illustrated by the usual circuit diagrams, comprising Figs. 2 to 24, inclusive. The other exchanges are shown for general reference purposes and may be of the type disclosed herein or any well known type that reverses battery when the call is answered.

The circuit diagrams when laid out in accordance with the plan shown in Fig. 25 illustrate a well known "All Relay Type" exchange having a capacity of 200 lines. Systems of this general type are disclosed in Voss Reissue Patent No. 23,412 and E. S. Peterson Patent No. 2,333,039 of which reference will be made in this specification.

The drawings Figs. 2 to 24 are identified as follows:

Figure 1:
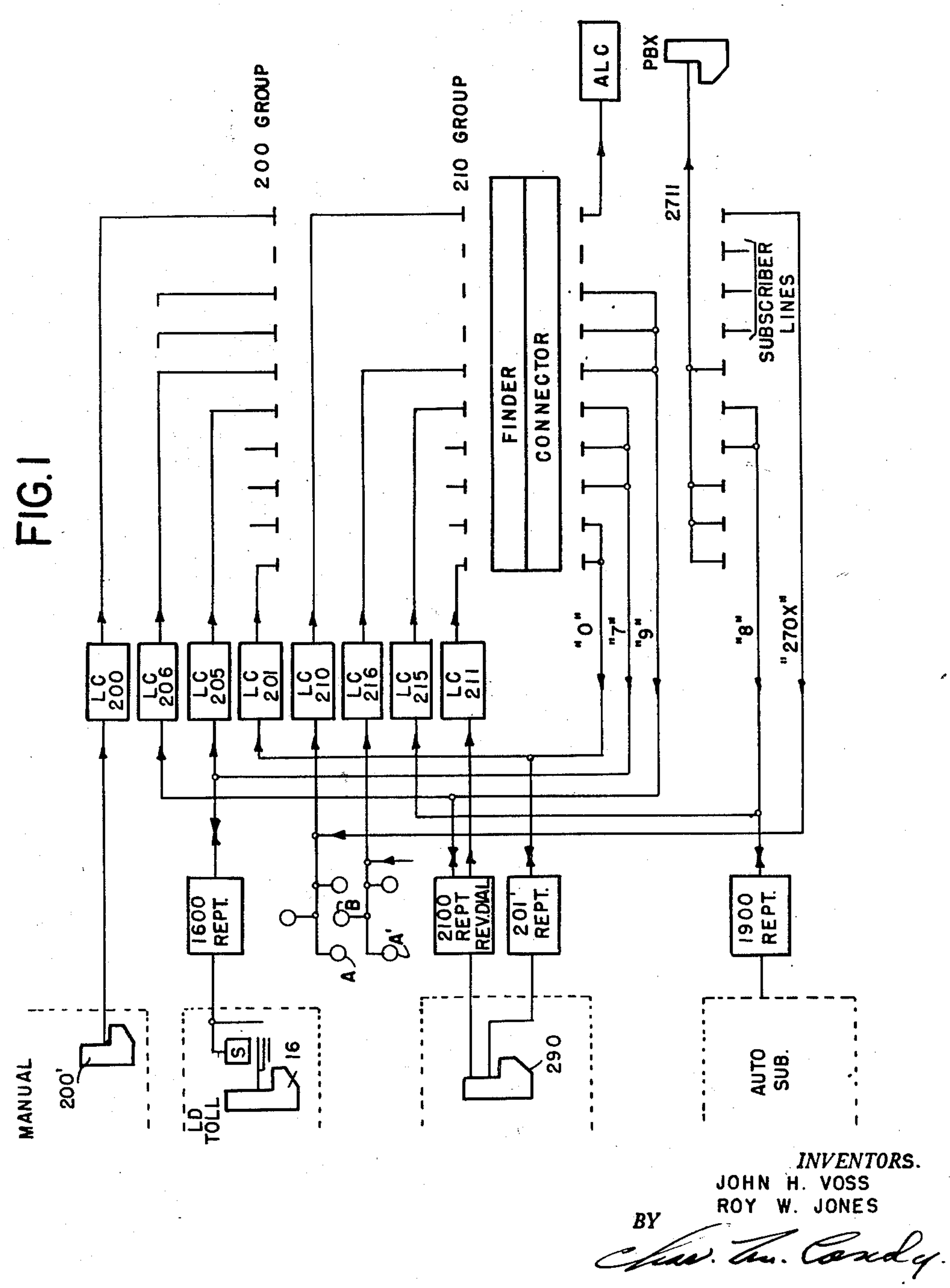

Referring now to Fig. 1, the branch exchange is diagrammatically illustrated by a schematic drawing of a portion of the finder and connector terminals and their connections to the various line circuits. Only two groups of terminals, such as the 200 group and the 210 group, are shown accessible to the finder for extending incoming calls or calls originating from the line circuits.

Only two groups of connector terminals are shown below the connector over which outgoing calls are made. Incoming calls from the manual exchange 200′ are made over the trunk line to line circuit LC200 which causes the finder to connect with the tenth, or last, finder terminal in the 200 group. Incoming calls from exchange 16 come in over a repeater such as 1600 and a line circuit such as LC205 and are extended by way of the third, fourth and fifth finder terminals in the 200 group. Incoming toll calls from the toll operator's position 290 are extended by way of a toll repeater such as 201′, a line circuit such as LC201 and the first and second finder terminals in the 200 group. Other incoming calls from an operator's position 290 also extend by way of dial back repeater 2100, LC211 and the first finder terminals in the 210 group. The line circuit LC206 and other similar line circuits are utilized by the operator to establish dial back connections extendable through the local exchange by way of the sixth, seventh and eighth finder terminals in the 200 group. Incoming calls from the automatic suburban exchange extend by way of repeater 1900, line circuit LC215, and the fifth finder terminal in the 210 group. Incoming calls from subscribers' lines extend through their associated line circuits and terminate in finder terminals as illustrated for lines A and B.

Outgoing calls from the connector terminals to the various trunk groups and line groups are made by dialling a single digit call number for trunk groups while P. B. X lines and subscribers' lines require three digits plus a ringing digit. Calls to the "0" trunk group extend by way of the first two connector terminals in the upper connector group, repeater 201′ to the toll board 290. Calls to the "7" trunk group extend by way of the third, fourth and fifth connector terminals in the upper group to a repeater such as 1600 and exchange 16. Calls to the "9" trunk group extend by way of the sixth, seventh and eighth connector terminals of the upper group, and a repeater such as 2100 to operator's position 290. Calls to the "8" trunk group extend by way of the fourth and fifth connector terminals of the lower group and a repeater such as 1900 to the automatic suburban exchange. Calls to the P. B. X group extend by way of the first, second, third and sixth connector terminals of the lower group. Calls to the local subscribers' lines, as illustrated, extend from the seventh, eighth, ninth and tenth connector terminals of the lower group. An alarm supervisory control circuit ALC is shown as terminating in the tenth connector terminal of the upper group by means of which an operator may dial into the local exchange and sequentially test for various trouble or alarm conditions. It should be realized that this trunking layout is only diagrammatic and that additional trunks and lines may be grouped differently than illustrated, such illustrations being made in this manner to reduce the number of circuits required to fully describe the invention.

Throughout the drawings, relays without any designations are quick acting relays, relays normally operated are shown in the operated position, relays designated "SR" are slow to release, relays designated "SO" are slow to operate and relays with sleeves are slow acting both on operation and release.

We will now describe briefly the purpose of the equipment illustrated in Figs. 2 to 24, inclusive. Reference will be made herein to hundreds groups, which means an exchange subgroup of one hundred lines; to tens groups, which means a subgroup of ten lines; and to units, which is the individual line in the subgroup.

Figure 2:
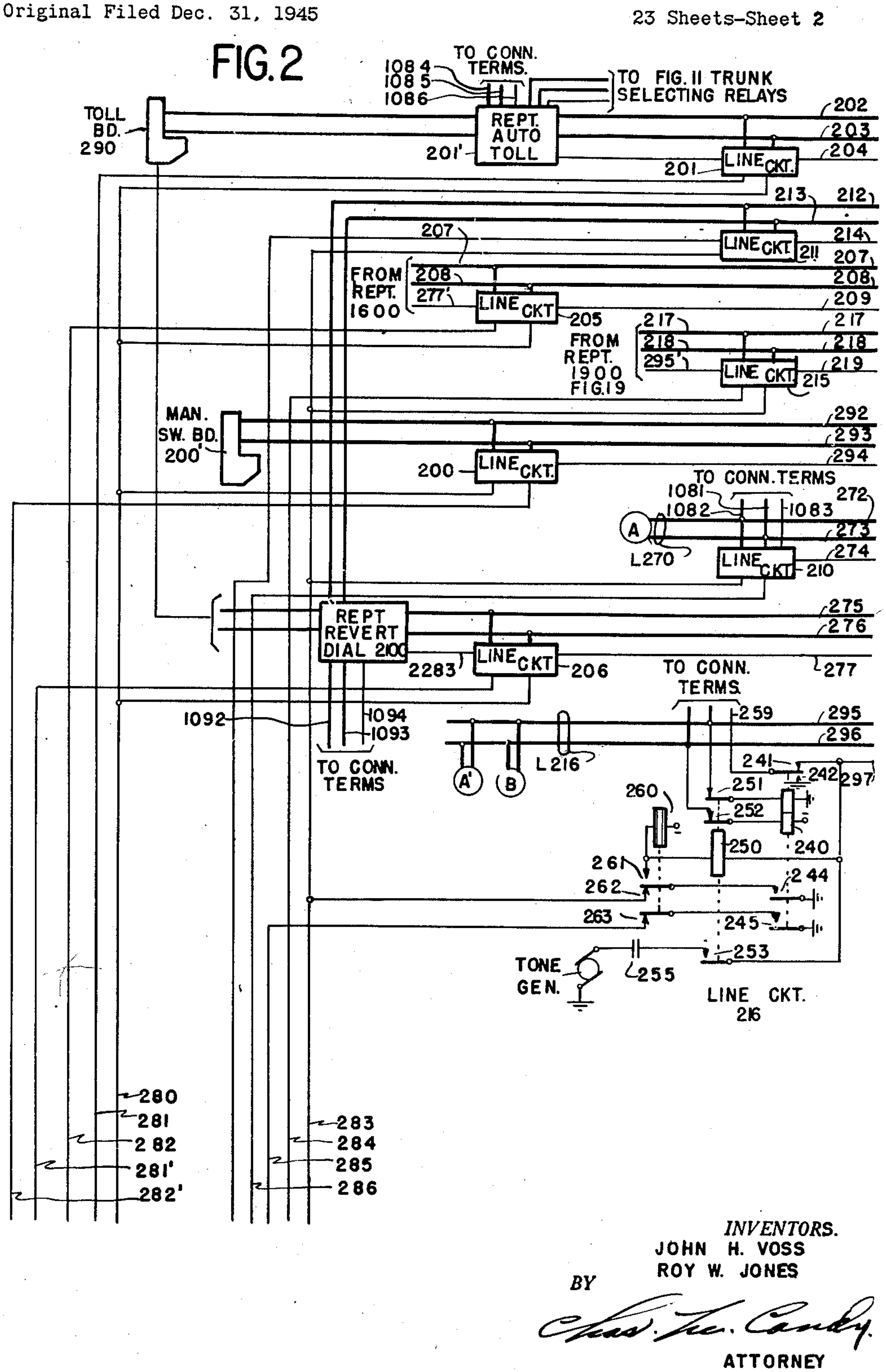
Fig. 2 shows a plurality of line circuits, one of which is shown in detail.

In Fig. 2 there are shown the various line terminations for subscribers' lines and trunk lines. Only sufficient line circuits are shown to illustrate the service restricting facilities described in this specification. The various kinds of subscribers' lines are not shown; it is understood that these may be party lines with as many as 20 stations on a line, individual lines or P. B. X lines. The number designations on each line circuit correspond to the finder bank terminations. All line circuits are similar to the illustrated circuit 216 and are similar in character to those described in the aforementioned E. S. Peterson Patent No. 2,333,039. It is understood that where trunks terminate on repeaters, the terminations from the connector terminals are at the repeaters as indicated in the drawing instead of terminating at the line circuit as in 216. The line circuit 206 is not shown in detail as it is used only for extending revertive calls from the group 9 trunks. The latter is the same as line circuit 216 except that the conductor corresponding to conductor 285 terminates at contacts 307 instead of 317 and finder bank terminations are at terminals 211 instead of terminals at 216.

The manual boards 200′ and 290 are of the well known conventional type that operate with automatic exchanges and do not require further description.

Likewise repeater 201′ is any well known automatic to toll repeater such as repeater 7 in the aforementioned Peterson Patent No. 2,333,039. Repeater 1600 is illustrated herein by Figs. 16, 17, and 18; repeater 1900 in Figs. 19 and 20; and repeater 2100 in Figs. 21, 22 and 23.

Figure 3:
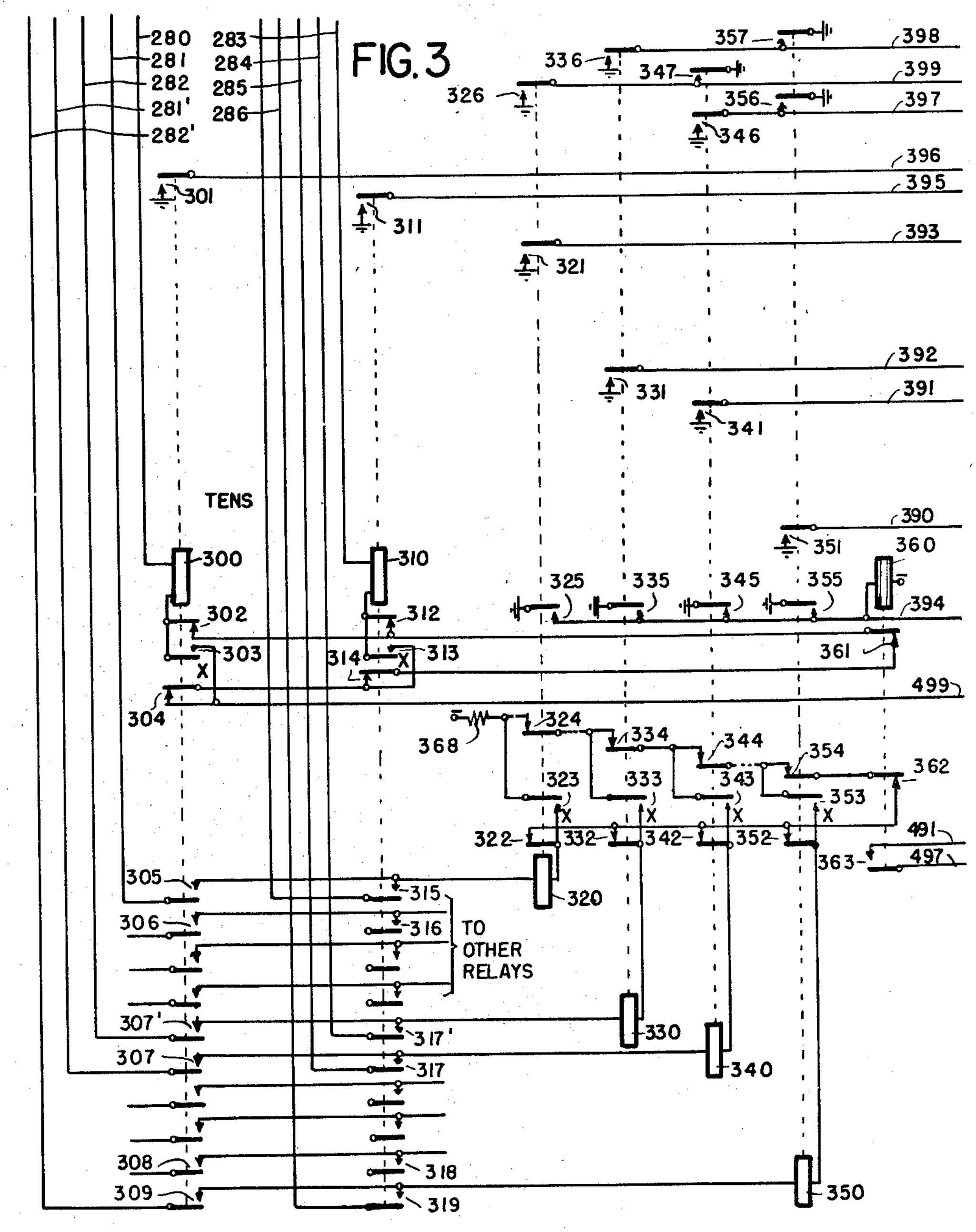
Fig. 3 shows a call allotter common to all line circuits.
Figure 4:
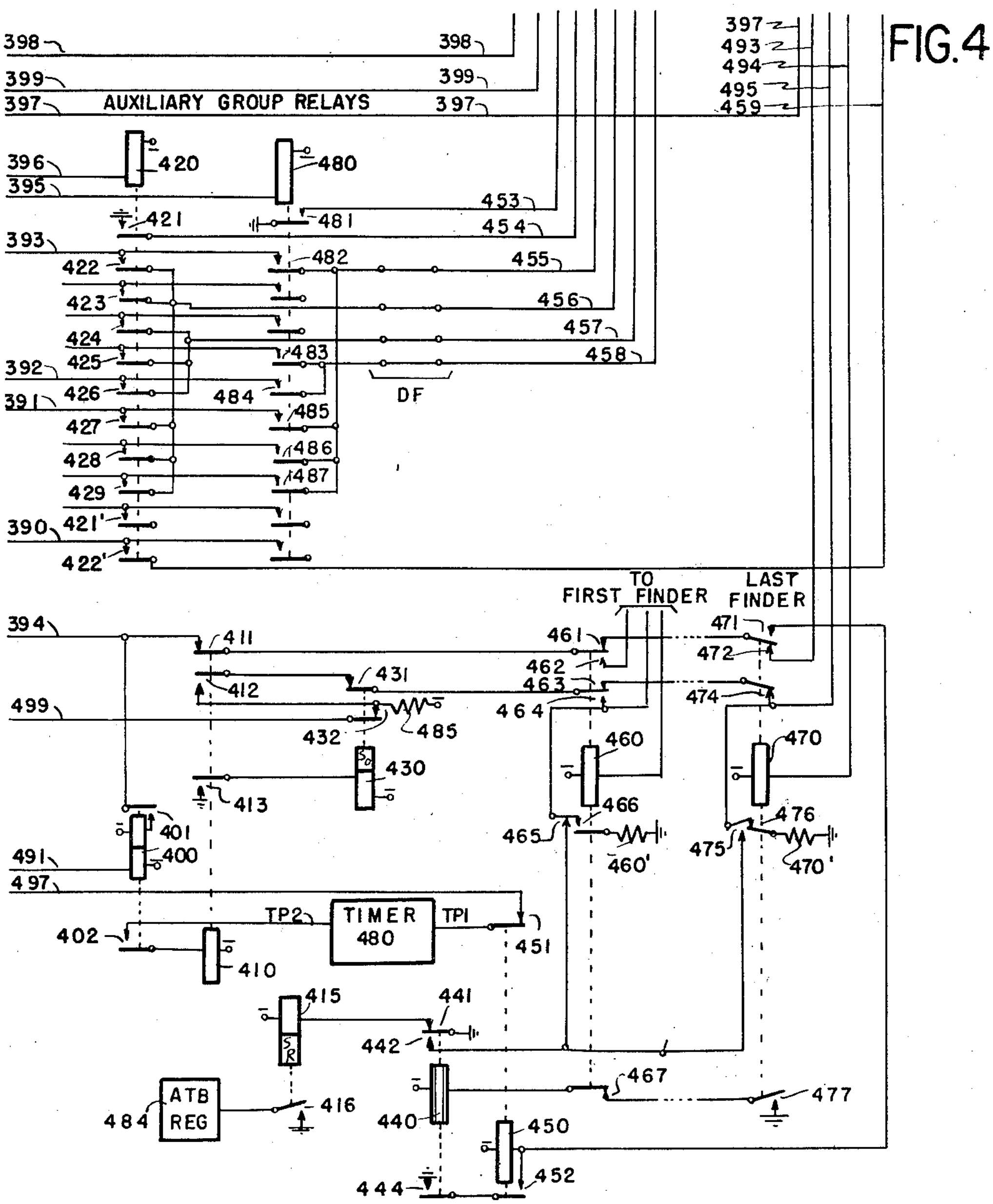
Fig. 4 shows the control circuits for the common call allotter, a relay allotter for preselecting idle finder-connector links, and a pair of auxiliary group restricted service relays.

The call allotter in Fig. 3 is a well known apparatus for directively extending a finder to a calling line and for blocking any other call from being connected until the finder is extended to the calling line. Fig. 3 in conjunction with Fig. 4 is similar in character to the aforementioned Peterson patent. It is further understood that only sufficient group and unit relays are shown to illustrate the method of operation and that a group relay 300 etc. is required for each 10 lines or a total of 20 for 200 lines. The complete board requires 10 unit relays 320 etc.

Fig. 4 shows the finder-link allotter and common control apparatus. The allotter portion consists of a relay per finder-connector link of which two relays 460—470 together with the common reset relay 440 are shown. This allotter is the well known cyclic type for preassigning the order in which idle links are used in extending successive calls. The other portion includes register and control apparatus. Fig. 4 differs from prior disclosures, such as described in the aforementioned Peterson and Voss patents, in that provision is made for an all trunk busy register 484 controlled from relay 415, and the timing apparatus is simplified by controlling the time period from a common exchange timer 480. It is understood timer 480 is normally incorporated in the exchange timer 760′.

Figure 5:
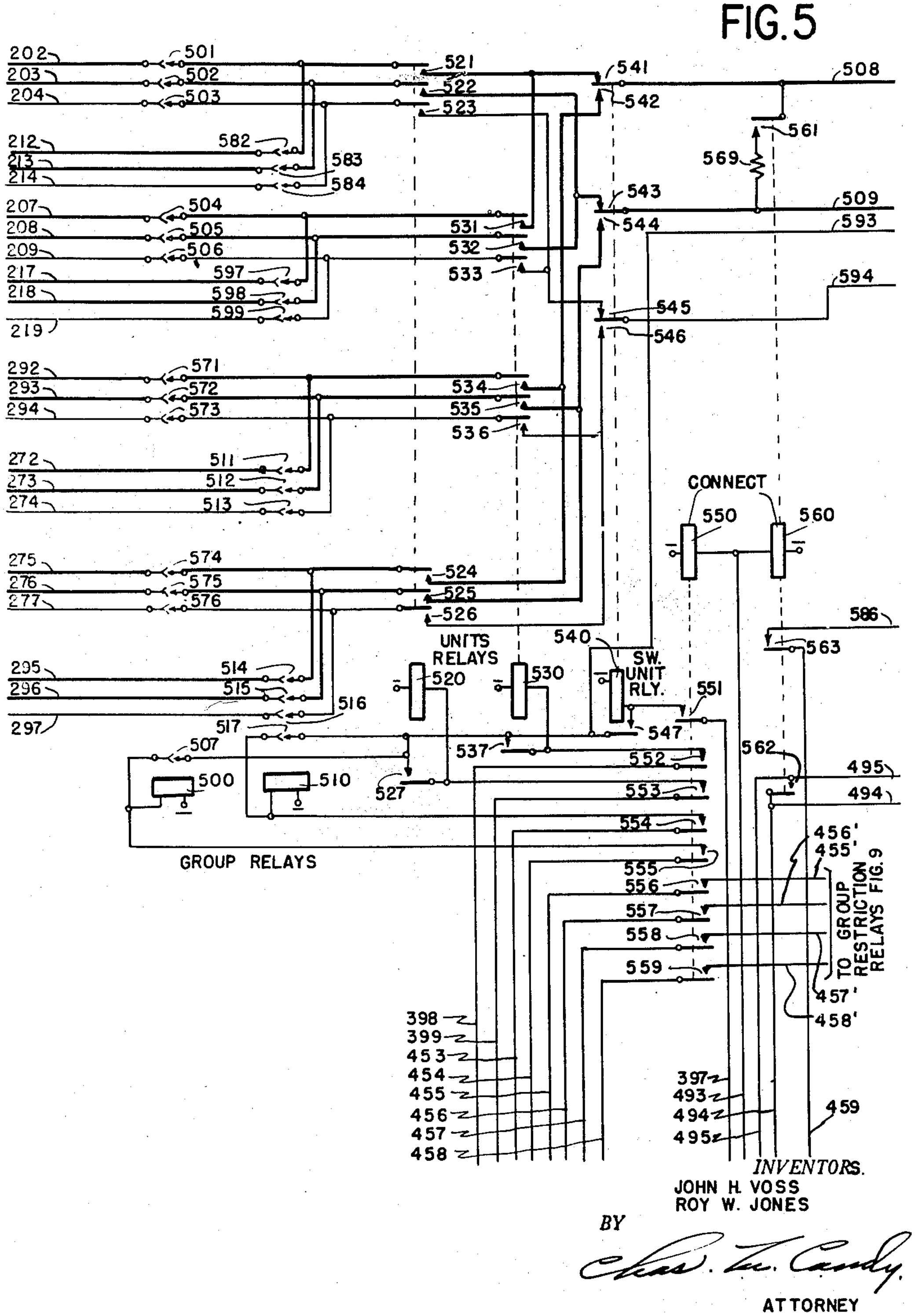
Fig. 5 shows a skeleton outline of the all-relay finder.

In Fig. 5 only a portion of a complete link is shown. It is understood that a group connect relay like 500 is required for each 10 lines equipped or a total of 20 such relays for 200 lines. Only two of the five unit relays and the unit switching relay 540 are shown. This apparatus is similar to that described in the aforementioned Peterson patent except that for convenience of this description the special service markings are on a line basis instead of a group basis.

In Fig. 4 line restricting auxiliary group relays are shown. It is understood that a relay is provided for each group of ten lines having lines of a special service character. Two such relays 420 and 480 are shown and should be considered as auxiliary relays to tens group relays 300 and 310. Such relays are effective only during the period that a finder is being extended to a calling line and further extend a special service line marking to a predetermined restricting relay 930, 940 or 950 in Fig. 9 or group restriction relays shown in the connector.

Figure 9:
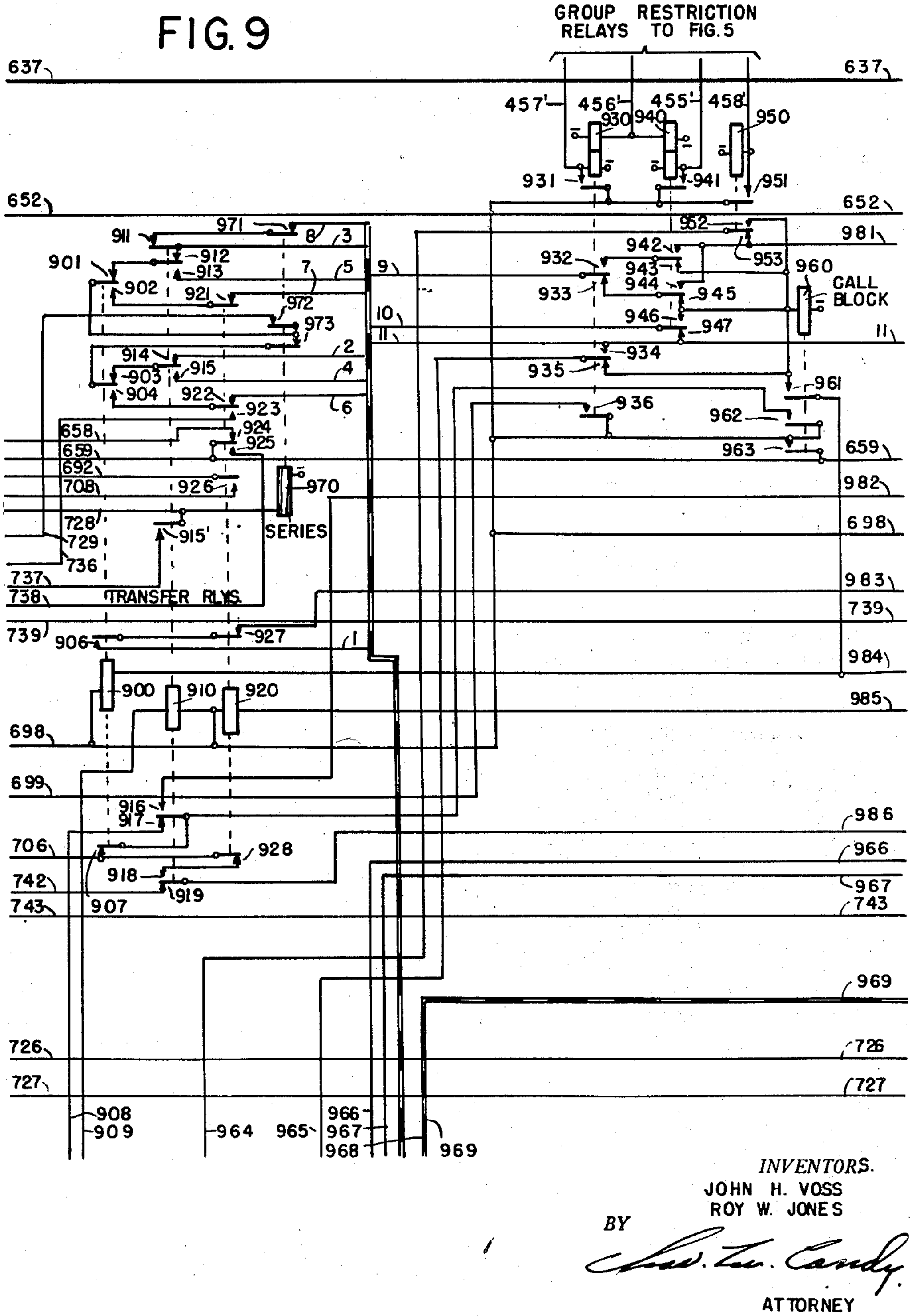

The connector group restricting relays are shown in Fig. 9 and it is understood one relay or combination of relays is required for each restricted class of lines of which three relays 930, 940 and 950 are shown to provide four classes of restricted lines together with a common call blocking relay 960. The latter is effective only if a connector group is called by an unauthorized line.

The time pulse generator 760′, ringing interrupter 761′, the ringing generator and tone generator are well known and are only diagrammatically shown. It is understood such apparatus may be either of the relay or motor driven cam type.

Figure 10:
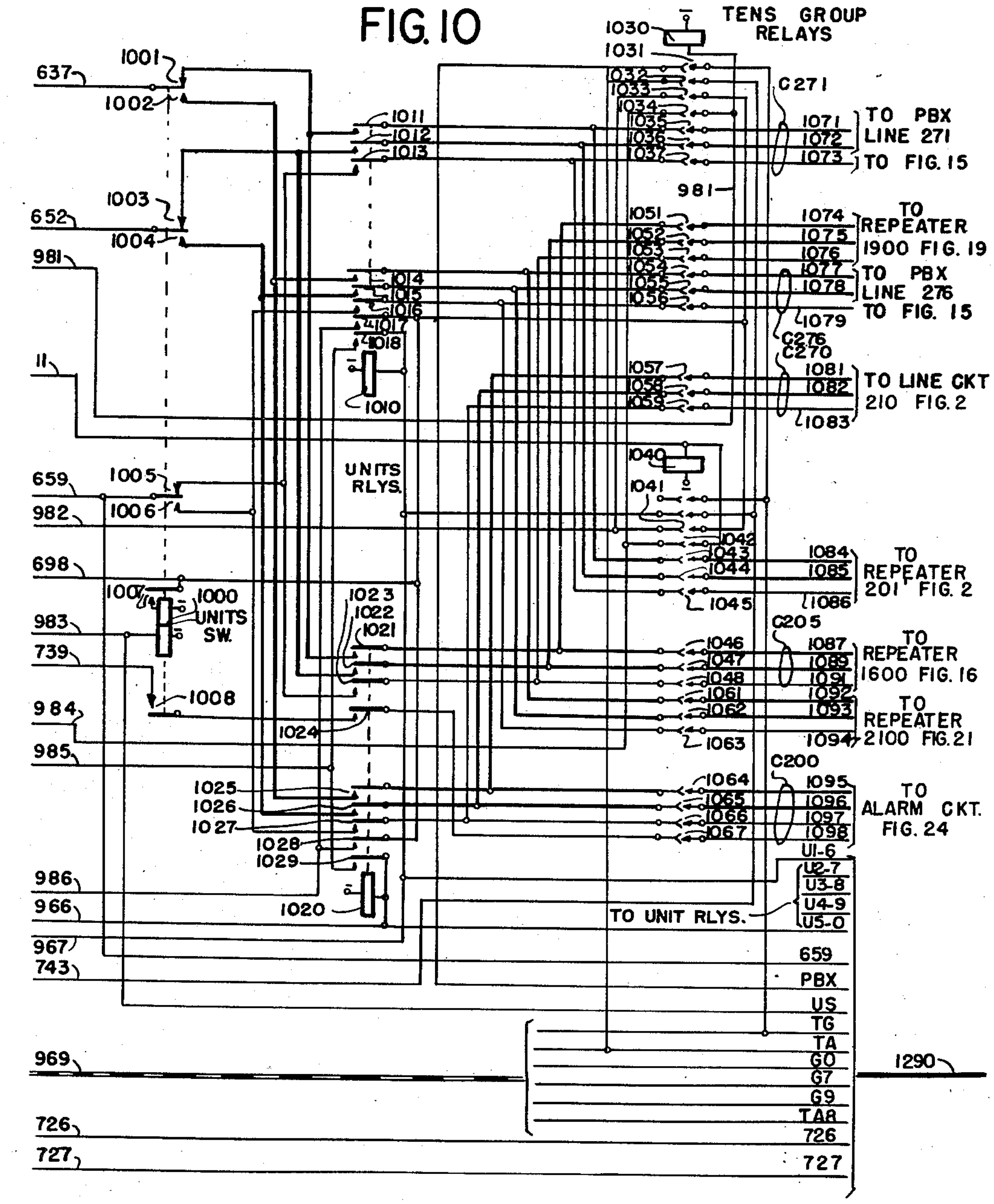

Figs. 6, 7, 8, 9 and 10 illustrate a 200 line all-relay connector having 20 tens, or group relays, five units relays and a switching unit relay, and other control relays. The general character of this apparatus is similar to that described in the Peterson and Voss patents mentioned hereinbefore and is well known. Briefly described it is of the 200 line type with a maximum of 20 parties per line. Four digits are required to call local stations of which the first digit determines the hundreds group and the station ringing group, the second digit determines the tens group of the selected hundreds group, the third digit determines the individual line (unit) of the selected tens group, the fourth digit determines the particular ringing signal of the selected group of ringing signals. The trunk groups are selected by a one digit number. Only two of the connector tens, or group relays 1030 and 1040, two of the connector units relays 1010 and 1020, and the units switching relays 1000 are shown in Fig. 10 in order to simplify the drawings. Each small trunk group can be considered as a subgroup of the tens group. A plurality of such subgroups together with subscribers' lines may be assigned within the same tens group provided the total number of trunks and lines therein is not greater than 10.

Figure 8:
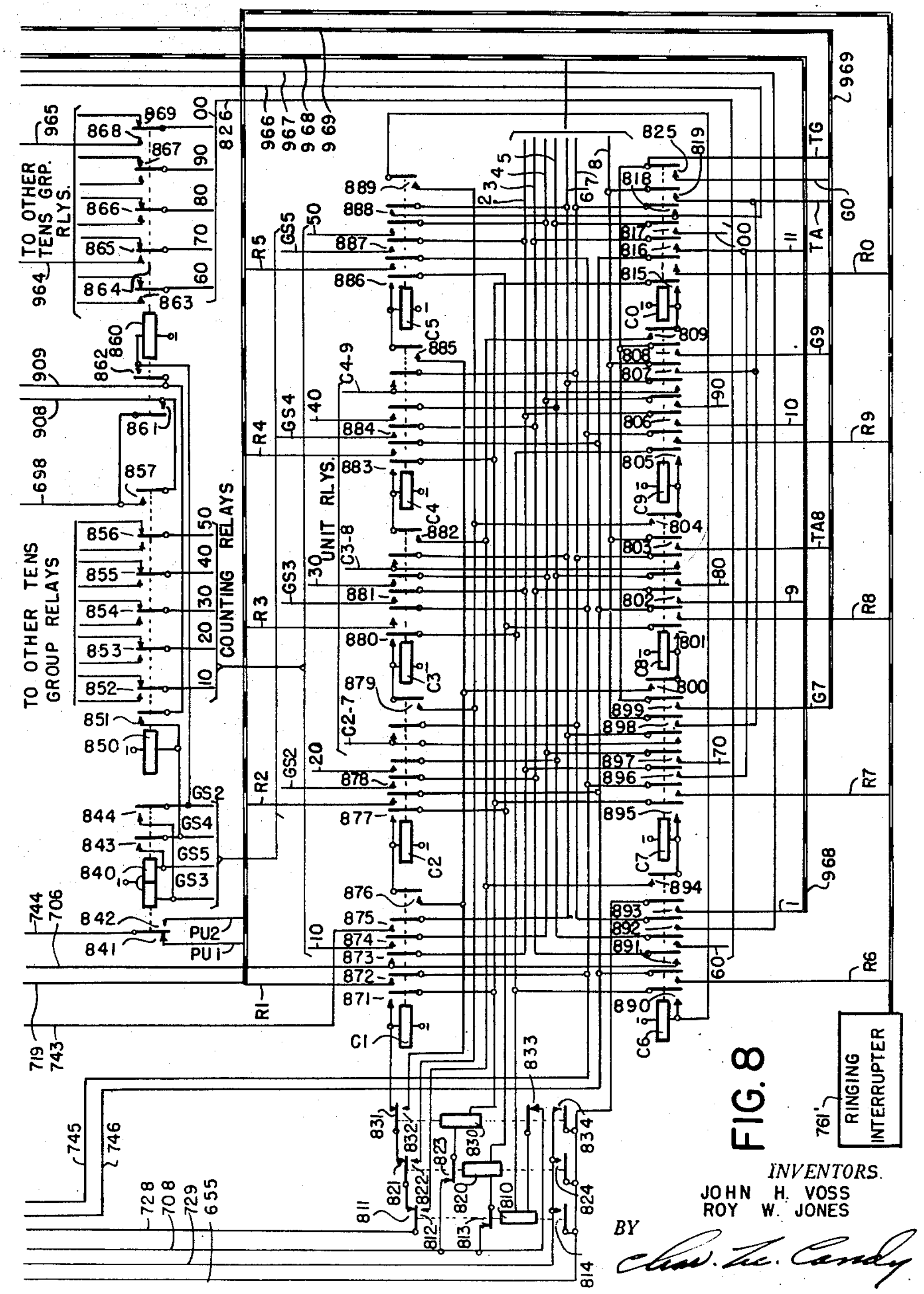
Figure 11:
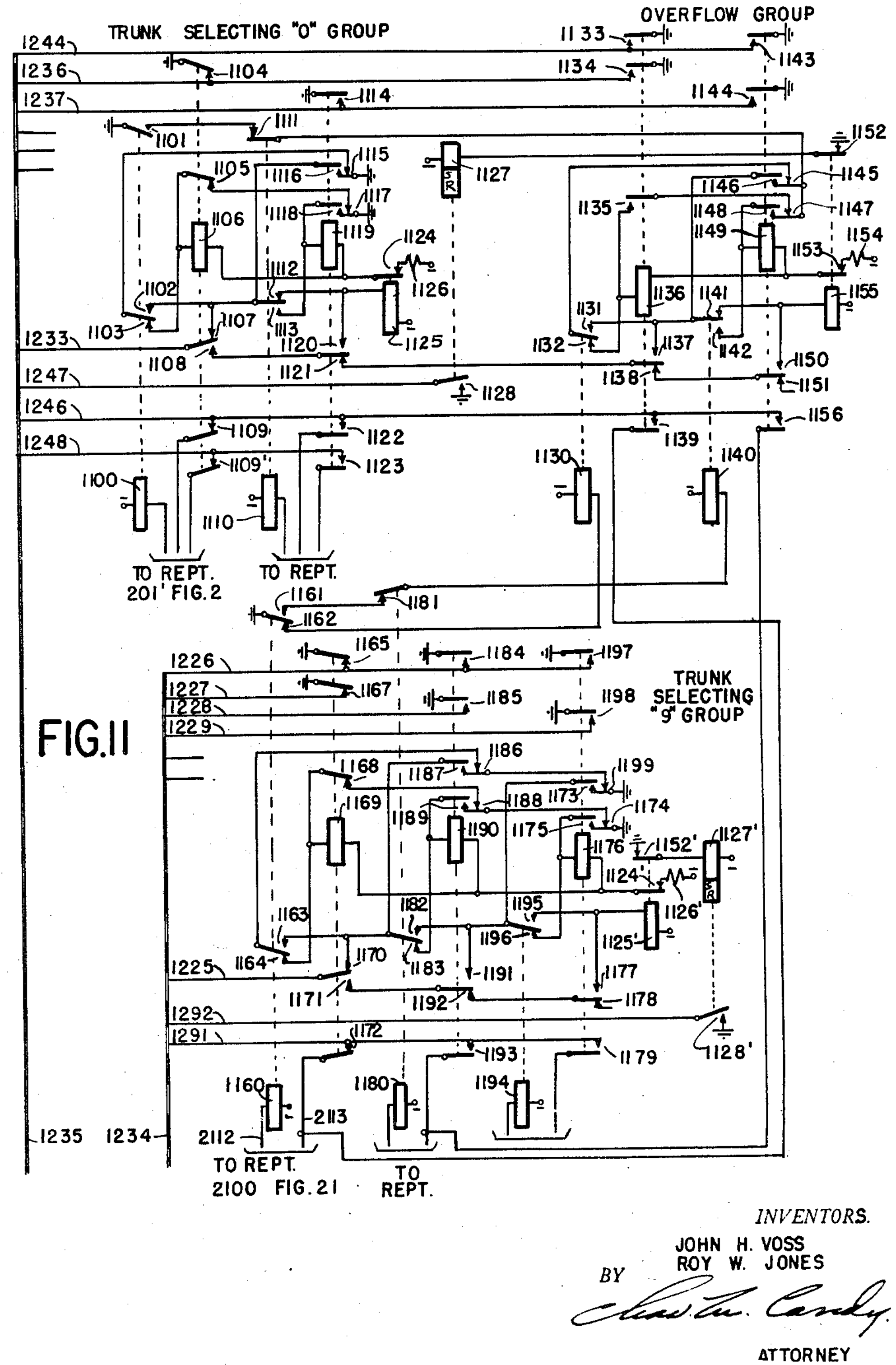
Figs. 11, 12, 13, 14 and 15 show the common trunk controlling and selection relays for controlling trunk connections with the various groups of trunks.
Figure 12:
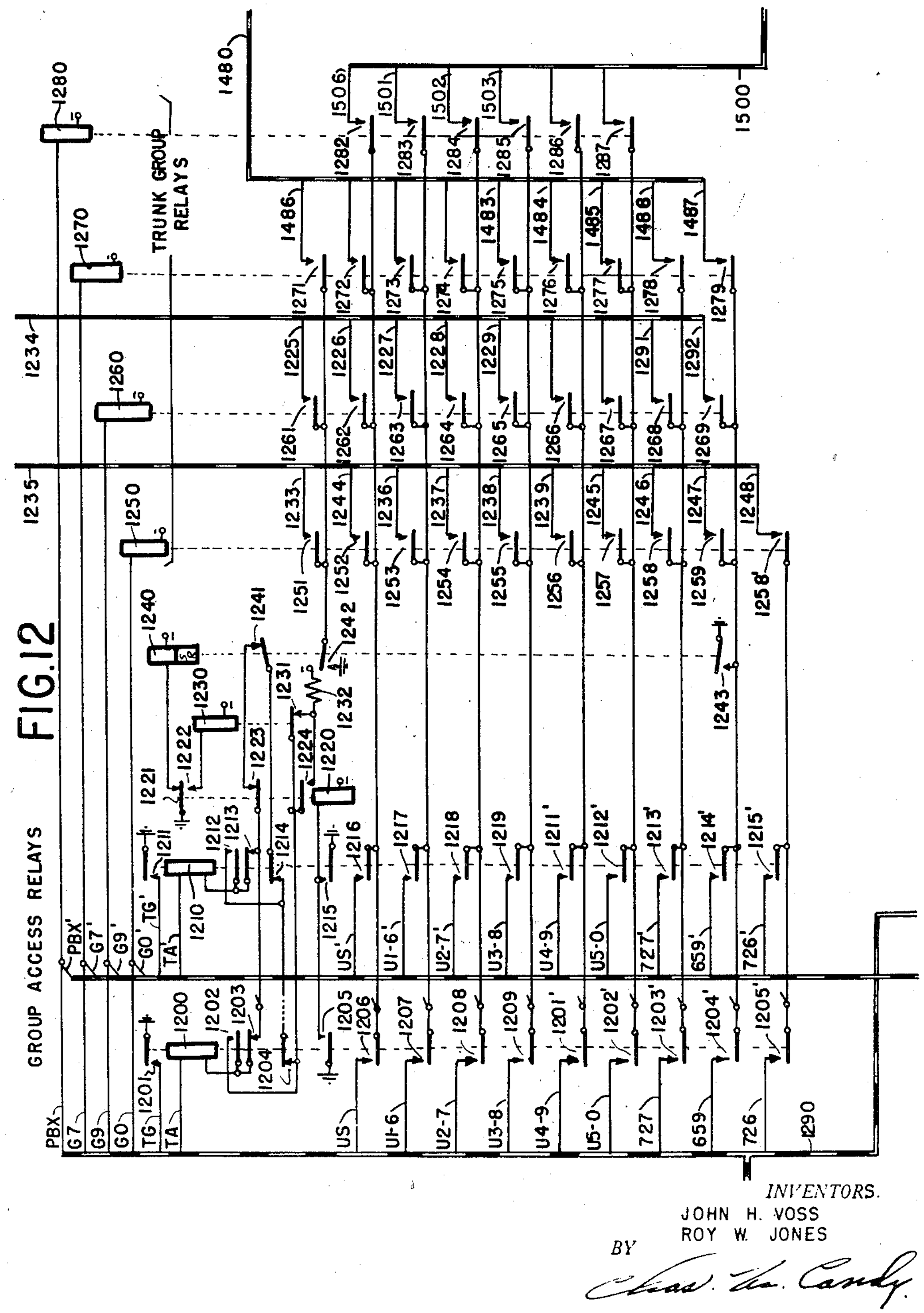
Figure 13:
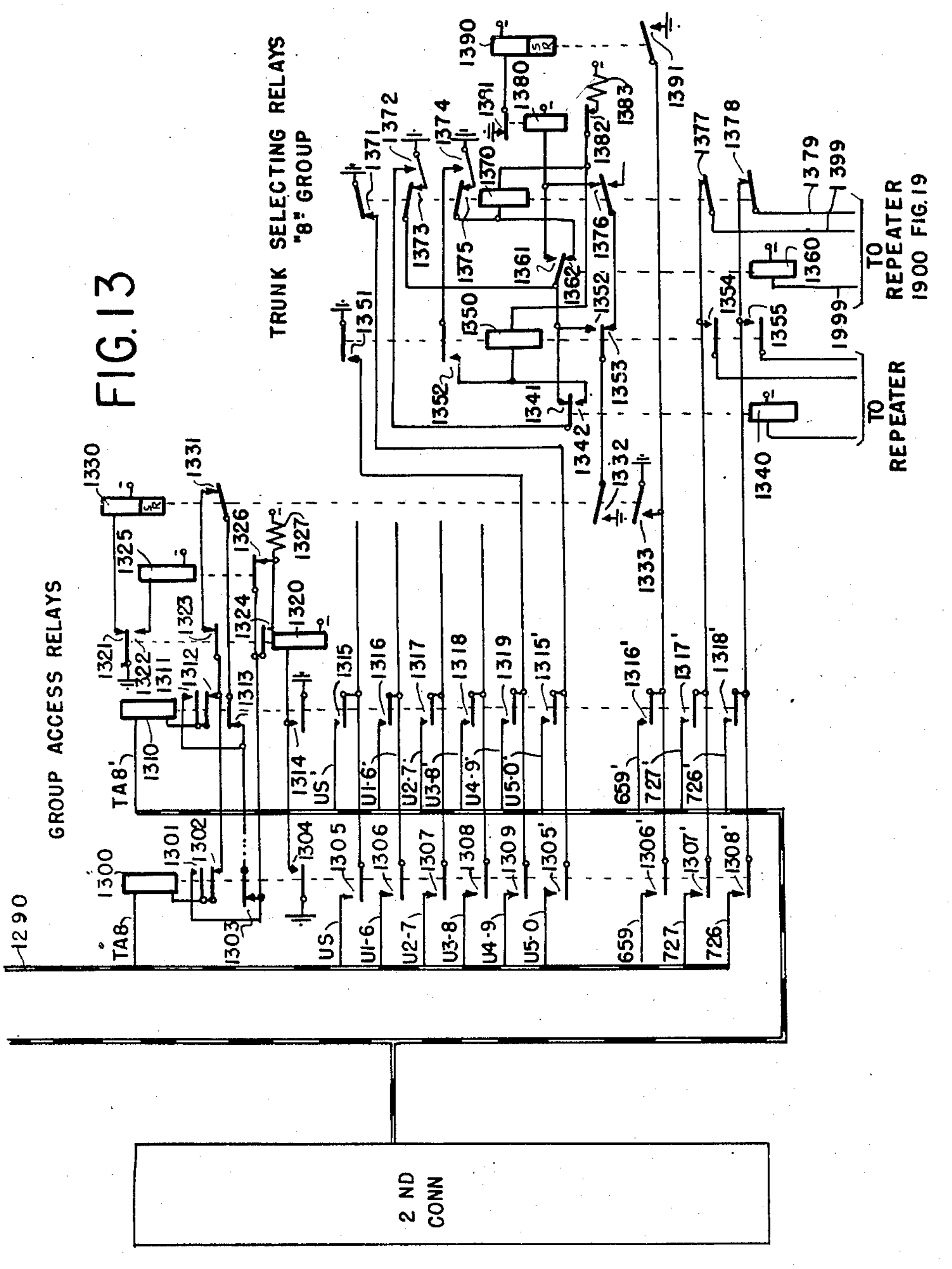
Figures 14, 15, 25:
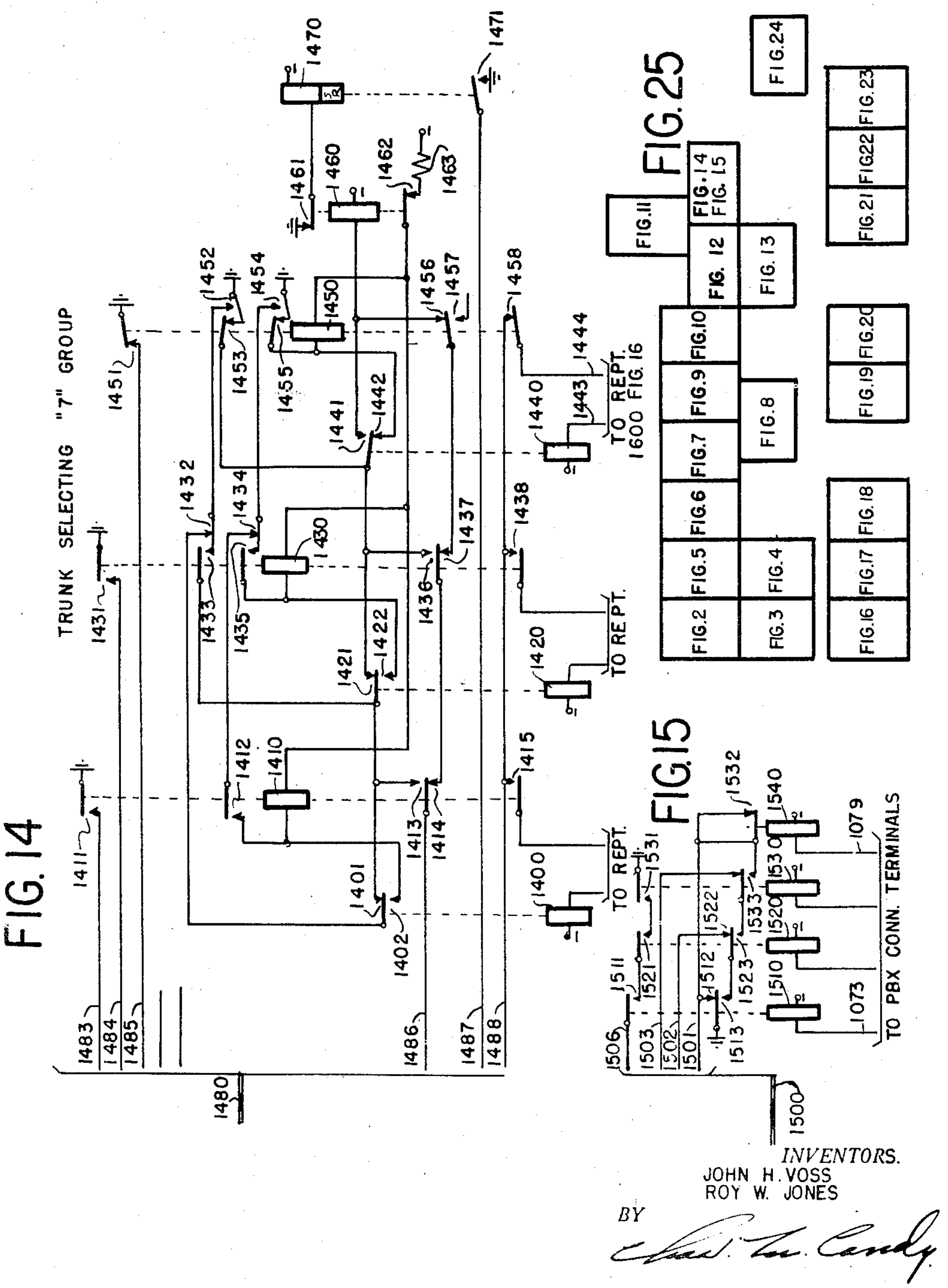

The unit relays 1010 and 1020 previously mentioned are controlled direct from the counting relays, Fig. 8, in response to a dialed third digit or are directively energized from trunk selecting relays, such as shown in Figs. 11, 14 and 15, through the trunk access relays in Figs. 12 and 13.

Figure 24:
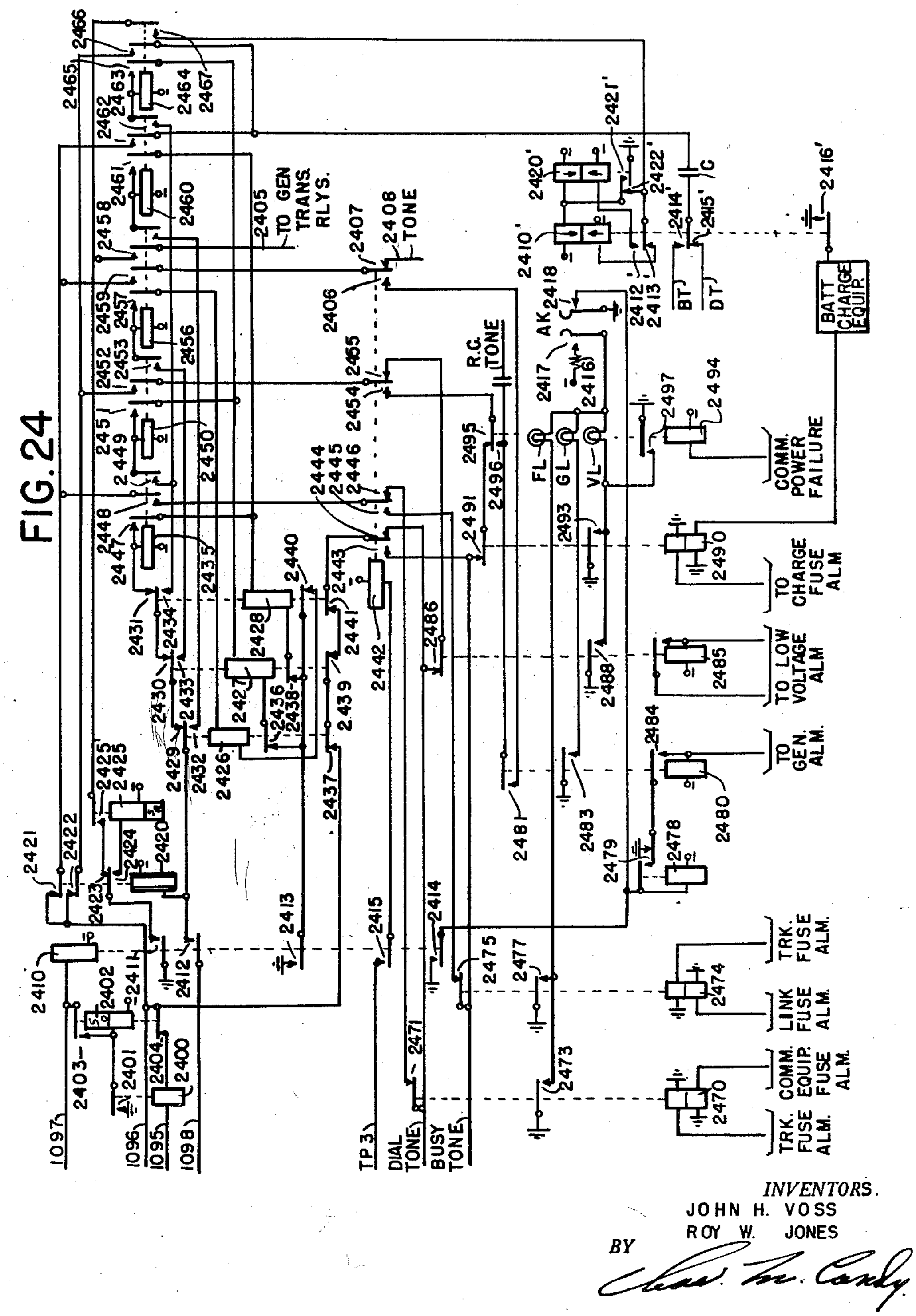
Fig. 24 shows the alarm checking and supervisory circuits.

Line terminals C200 are provided for access to the remote supervisory apparatus, Fig. 24, and are the same as any other susbcriber line except that an additional conductor is provided over which additional dial pulses are repeated.

In addition to the restricting relays 930, 940 and 950 there is shown by relays 625 and 644 how a toll line of one classification has the combined special facilities controlled by both of the above-mentioned relays while a toll line of another classification has only a portion of these facilities, such as controlled from relay 644.

Trunk connections to the various trunk groups are made through common trunk selecting apparatus which preselect an idle trunk in the respective trunk groups by marking a corresponding conductor with marking potential to control the operation of the connector units relays when such trunk group is called. The common trunk selecting apparatus includes group access relays, trunk group relays and trunk selecting relays. In Fig. 12 is shown a portion of the group access relays and trunk group relays provided to permit trunk connections with the "0," "9," "7" and P. B. X trunk groups. A relay, such as relays 1200 and 1210, is provided for each connector in the group access relay group and these relays are interlinked with a chain circuit so that only one such relay can be energized at a time in order to prevent faulty trunk connections. The group access relays close connections from the corresponding calling connector to the trunk group relay contacts. The particular trunk group relay corresponding to the called trunk group operates to extend the connector connections to the trunk selecting relay group, such as shown in Fig. 14, to thereby connect the marked conductor, corresponding to an idle trunk in this group, to the connector units conductor to operate the corresponding connector units relay. A trunk group relay, such as relay 1250 for the "0" trunk group, is provided for each separate trunk group. Such trunk group relays are common to all connectors. The trunk selecting relays of Fig. 14 are individual to the "7" trunk group and comprise a relay, such as relay 1400, which is normally energized when the repeater is idle. A chain of relays 1410, 1430 and 1450 are provided to preselect the idle trunks in rotation by grounding the conductors corresponding to the units relays in the connectors. Relay 1460 is a reset relay for resetting the chain relays after the last trunk is taken into use so as to again preselect the idle trunks in rotation. Relay 1470 is a slow to release relay which deenergizes to mark this trunk group busy when all the trunks are in use. Relays 1220 and 1230 in Fig. 12 are controlled by the relays 1200, 1210, etc. to control a slight delay in the reestablishment of the operating circuits for these latter relays so they can not be prematurely energized before the trunk selecting relays have functioned to release the marking of a trunk just taken into use on a trunk call and mark the next idle trunk in the group. Kick-off relay 1240 is a slow to release relay which is normally maintained energized during trunk selection unless, for some reason, a trunk is not selected within the release time of such relay, in which case the relay will restore and cause the next idle trunk to be preselected while the calling party is given the busy signal.

The trunk selecting relays for the "0" and "9" trunk groups shown in Fig. 11 are similar to the trunk selecting relays for the "7" trunk group shown in Fig. 14. In addition Fig. 11 shows a group of overflow group relays which enable calls to the "0" trunk group to overflow into the "9" trunk group in case all the trunks in the "0" trunk group are busy when the "0" group is called.

Fig. 13 shows the group access relays and trunk selecting relays for the "8" trunk group. This group of trunks normally has heavy traffic and a separate group of access relays is provided to enable a connector to call this trunk group even though another connector is simultaneously making another trunk call through the group access relays of Fig. 12. The group access relays of Fig. 13 are similar to the group access relays of Fig. 12 and the trunk selecting relays of the "8" trunk group are similar to the trunk selecting relays for the "7" trunk group shown in Fig. 14. A separate relay, such as relay 1300 is provided for each connector switch and, since these relays are provided for only one trunk group, no trunk group relays, such as relays 1250 to 1280 are needed.

Fig. 15 shows the trunk selecting relays for the P. B. X trunk group comprising relays 1510 to 1540 which are energized when the corresponding trunks are busy. The first P. B. X trunk is shown as being idle with relay 1510 restored to preselect and mark the first P. B. X trunk at contacts 1512.

Figure 16:
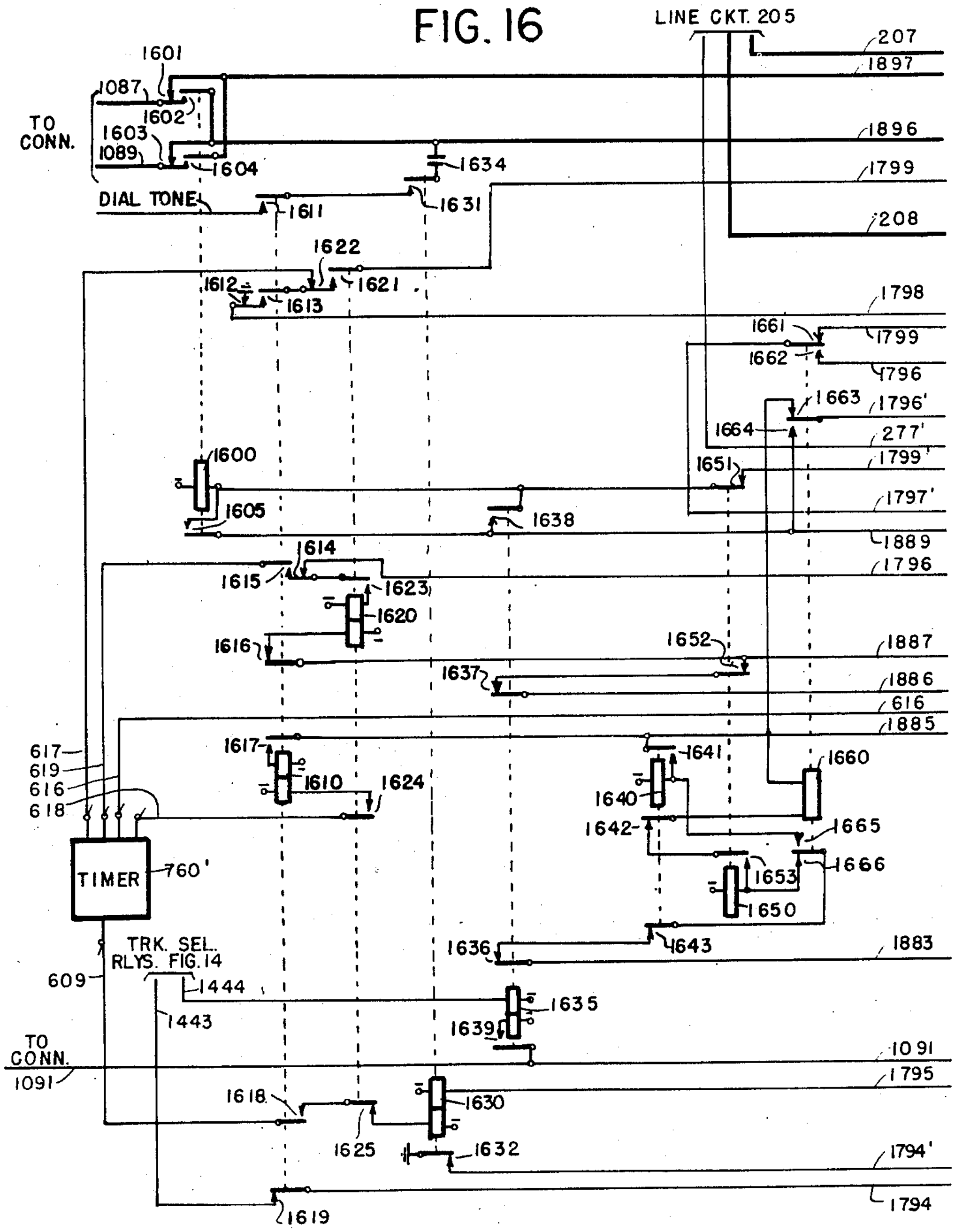
Figs. 16, 17 and 18 show the circuits of repeater 1600.
Figure 17:
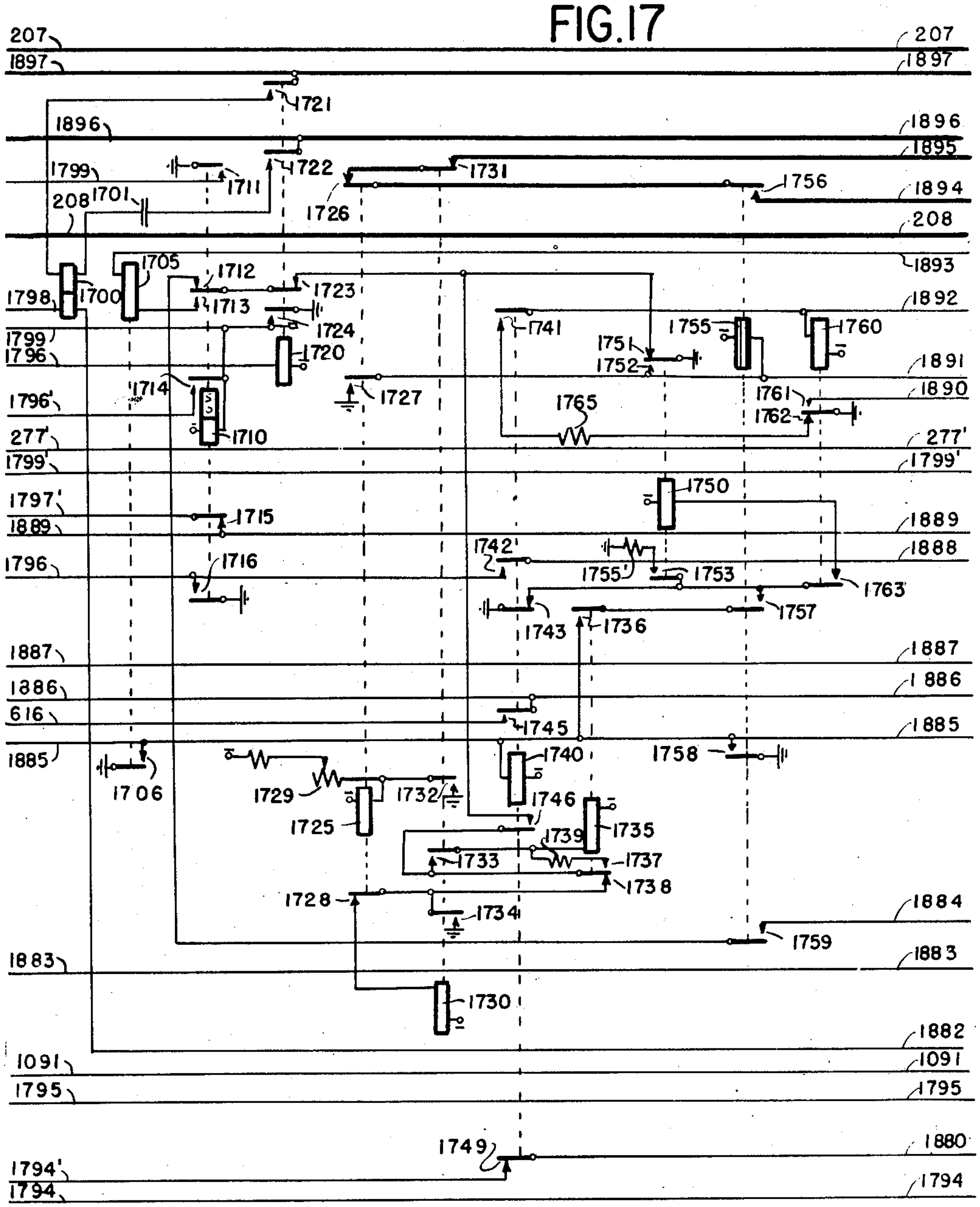
Figure 18:
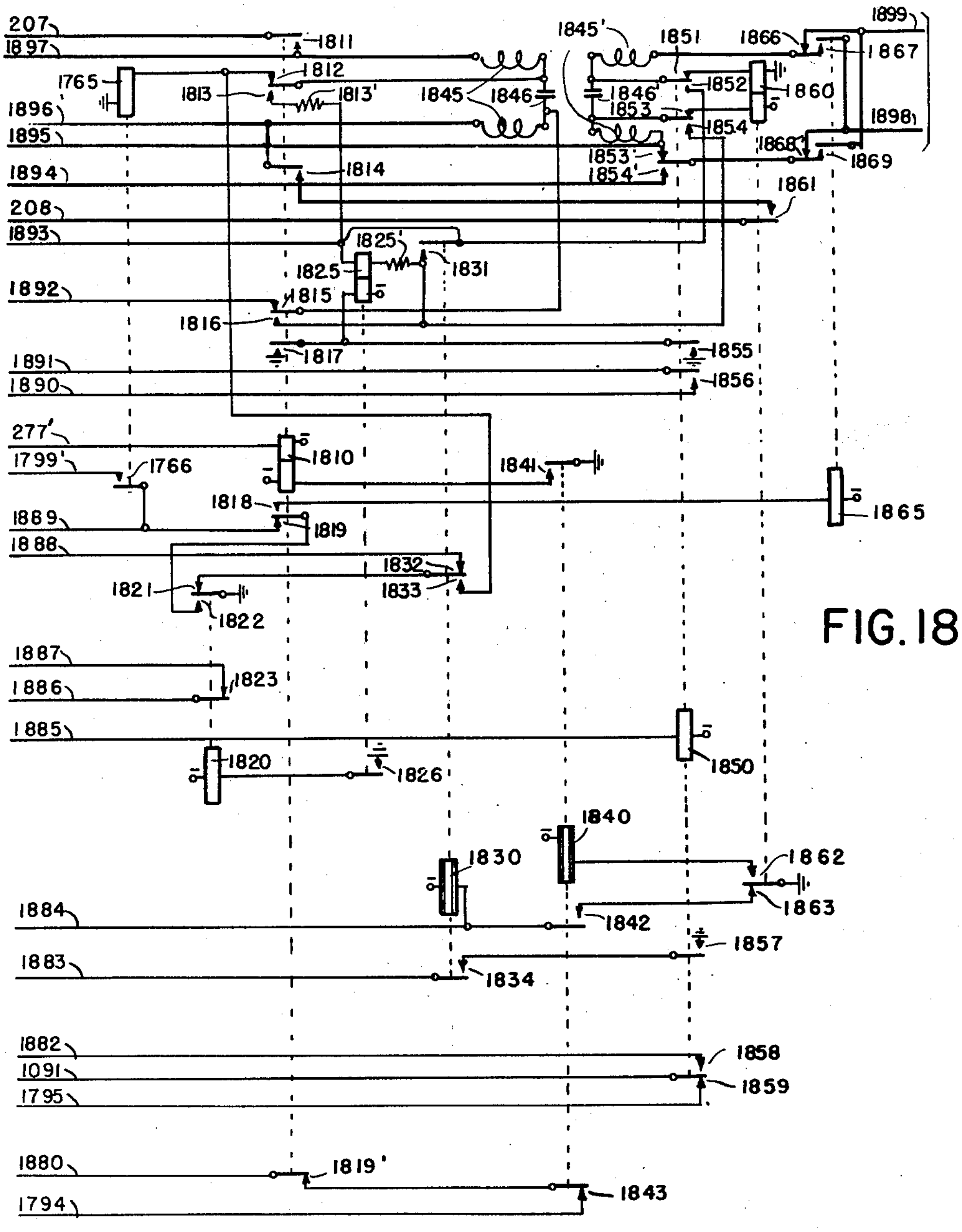

Figs. 16, 17 and 18 show the relays and circuits of repeater 1600 having conductors 207, 208 and 277' which terminate in the line circuit 205, conductors 1087, 1089 and 1091 which terminate in the connector terminals as shown in Fig. 10, conductors 1443 and 1444 (Fig. 16) which extend to the trunk selecting relays in Fig. 14 and the trunk line conductors 1899 and 1898 (Fig. 18) which extend to the distant exchange 16 as indicated in Fig. 1.

Figure 19:
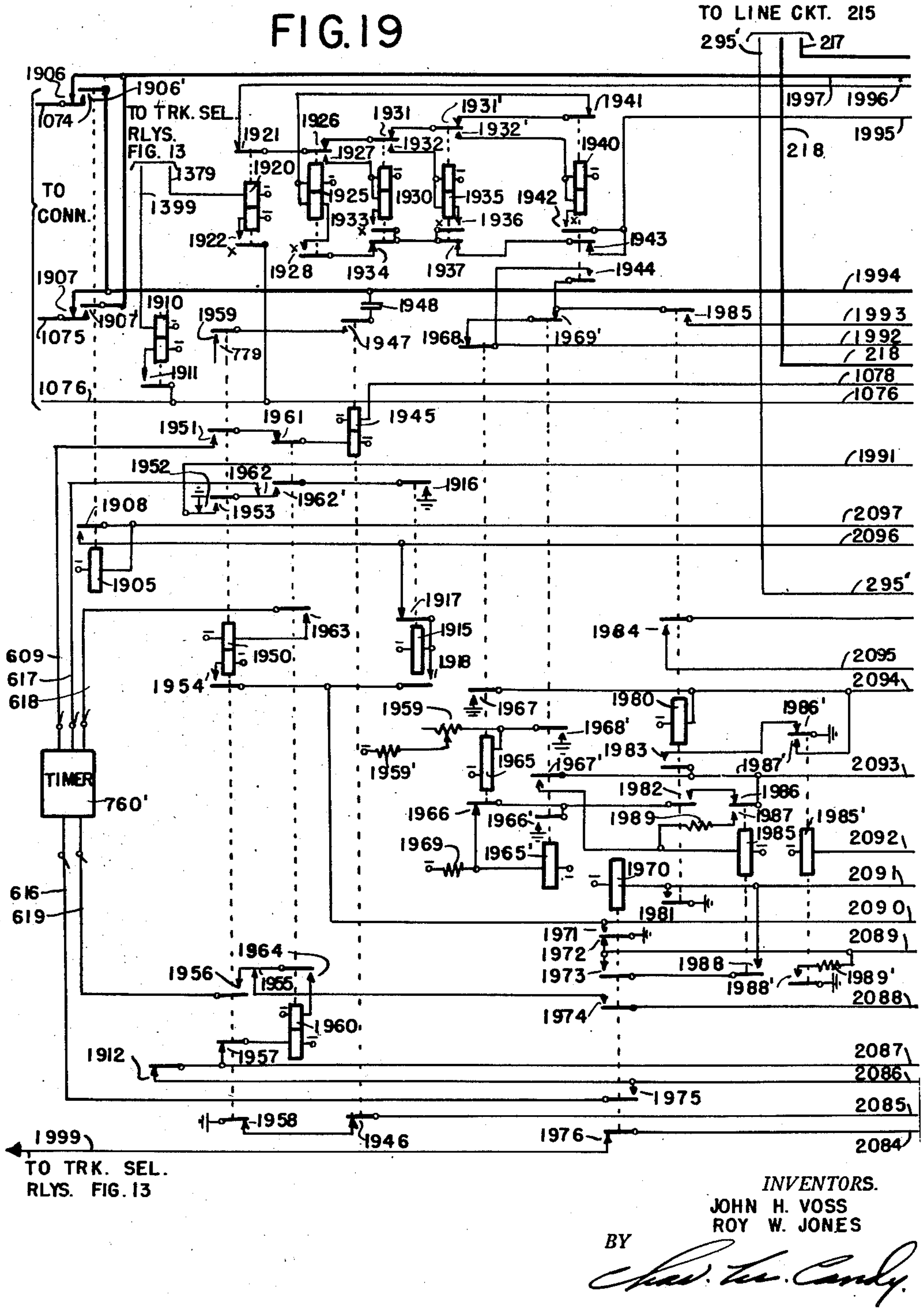
Figs. 19 and 20 show the circuits of repeater 1900.
Figure 20:
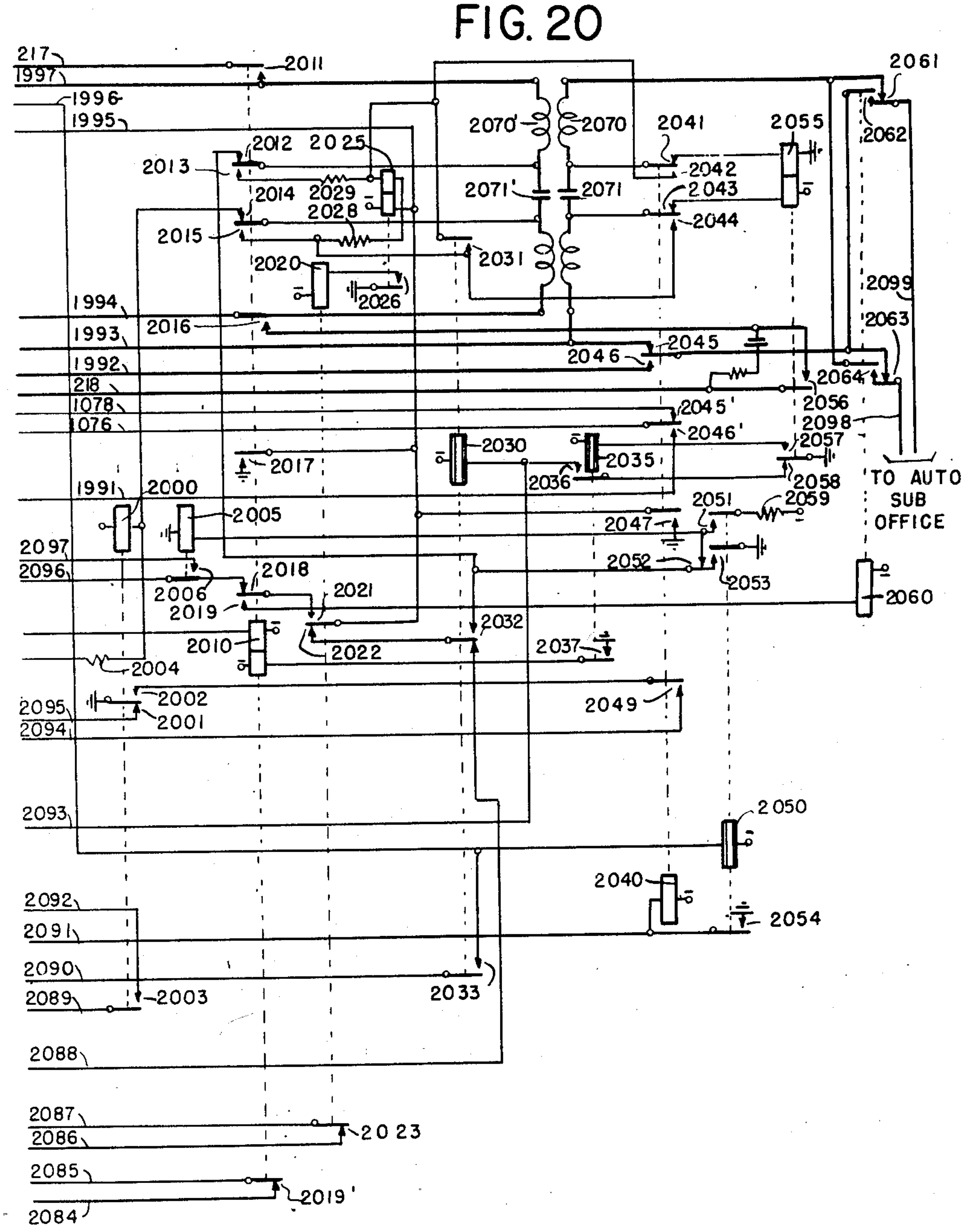

Figs. 19 and 20 show the relays and circuits of the repeater 1900 having conductors 217, 218 and 295' extending to line circuit 215, conductors 1074, 1075 and 1076 extending to the connector terminals in Fig. 10, conductors 1379, 1399 and 1999 extending to the trunk selecting relays of the "8" trunk group in Fig. 13, and conductors 2099 and 2098 extending to the automatic suboffice as indicated in Fig. 1.

Figure 21:
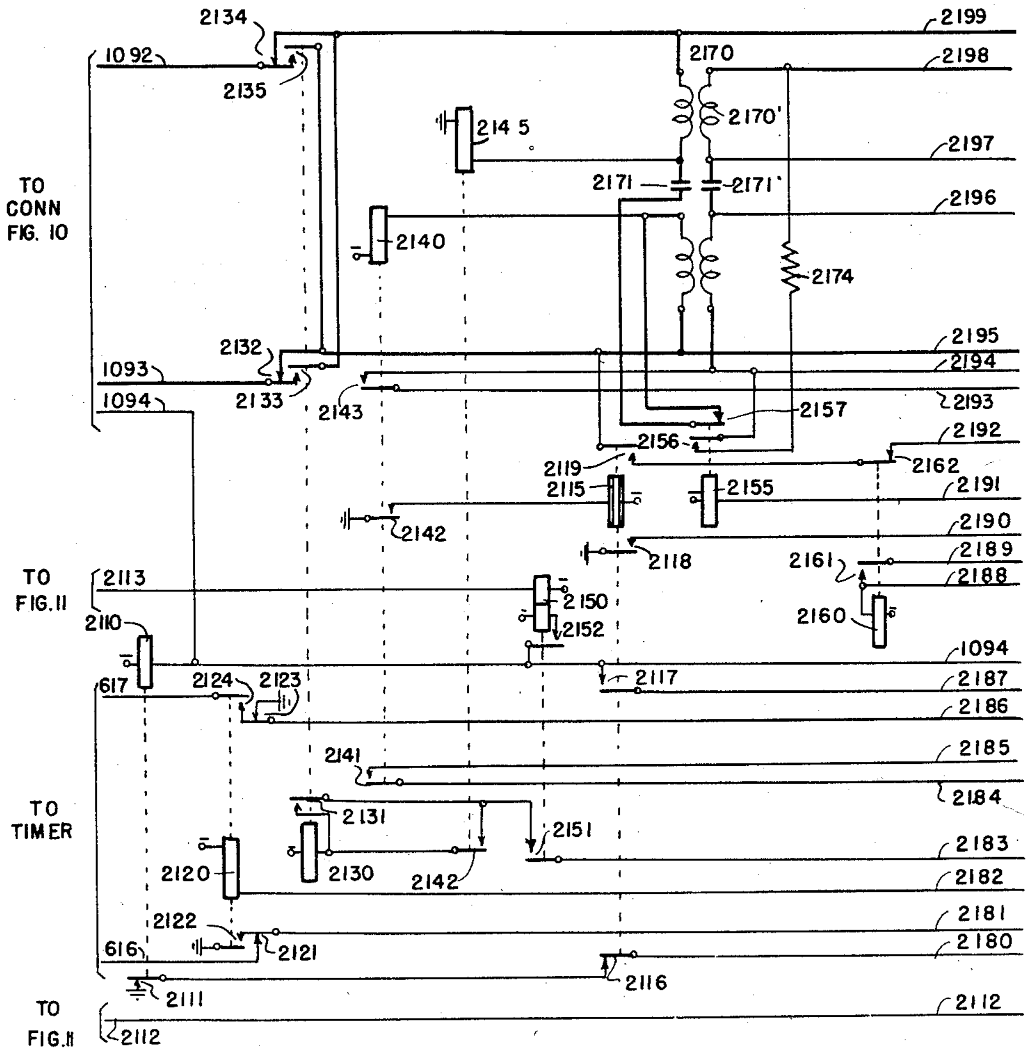
Figs. 21, 22 and 23 show the circuits of dial-back repeater 2100.
Figure 22:
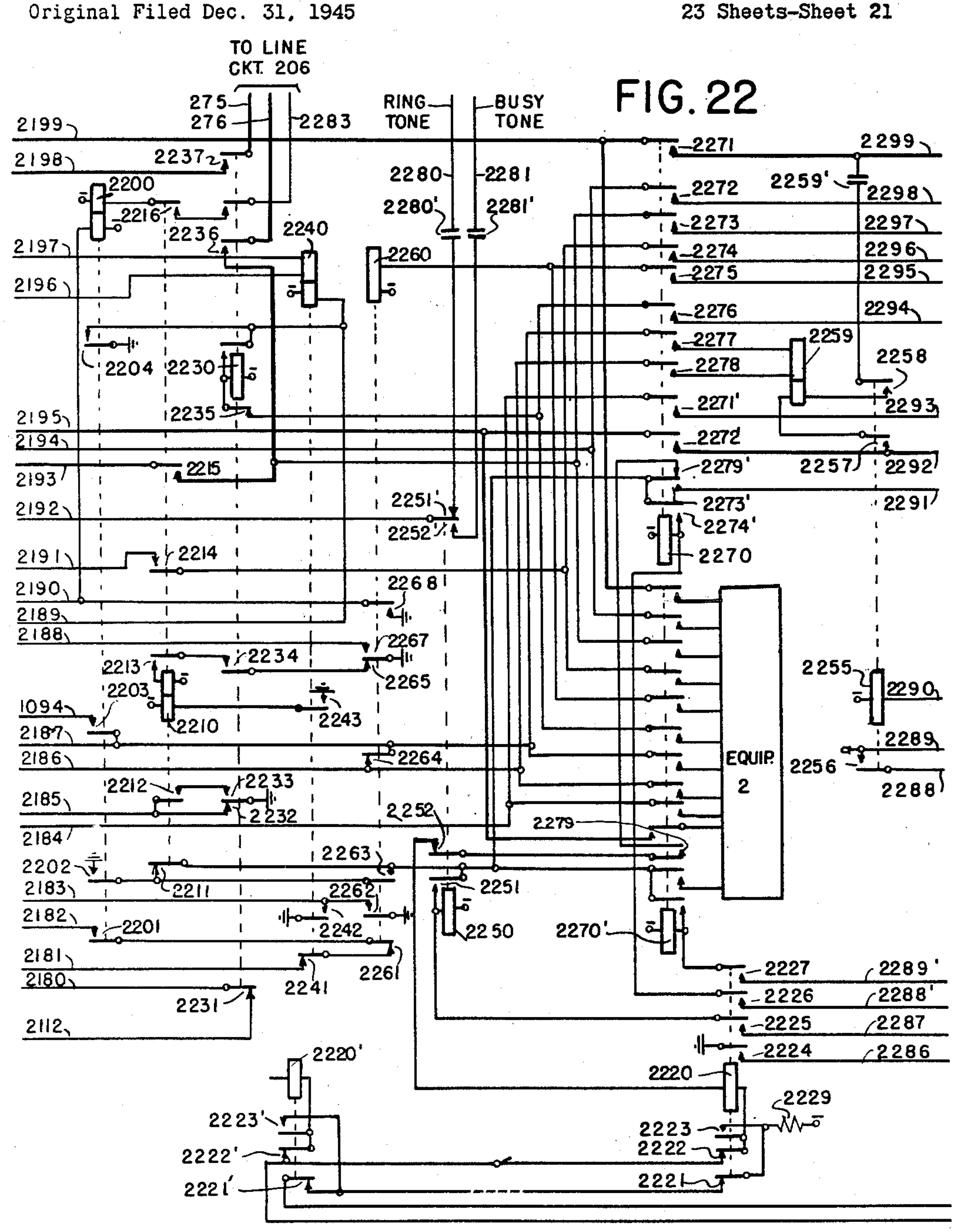
Figure 23:
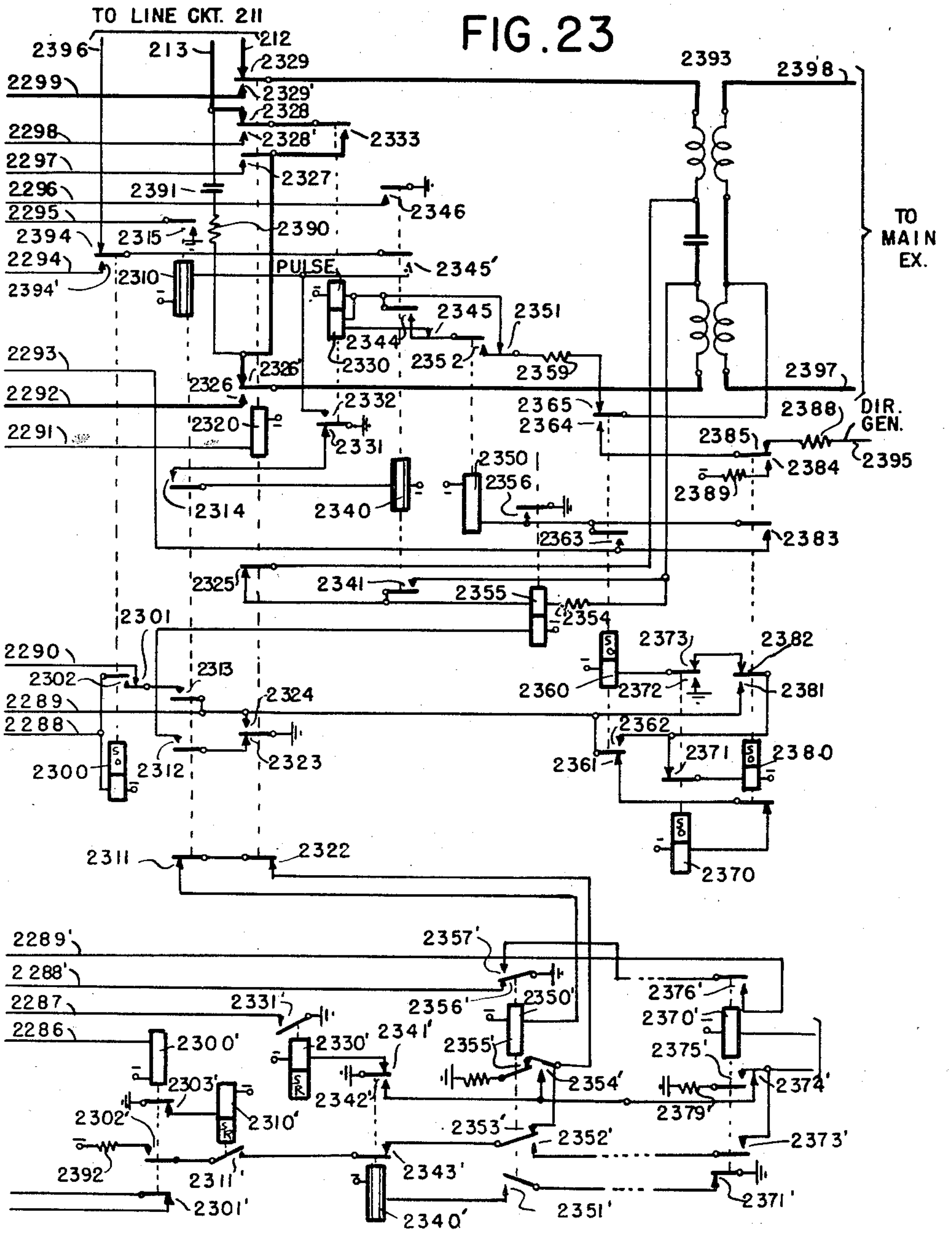

Figs. 21, 22 and 23 show the relays and circuits of the revertive dial back repeater 2100 having conductors 1092, 1093 and 1094 terminating in the connector terminals in Fig. 10, conductors 2112 and 2113 terminating in the trunk selecting relays of the "9" trunk group in Fig. 11, conductors 275, 276 and 2283 terminating in line circuit 206 for establishing dial back connections, conductors 212 and 213 terminating in line circuit 211 for completing incoming calls over the trunk line, and conductors 2398 and 2397 extending to the toll board 290. This repeater is somewhat similar to the dial back repeater 61 shown in the Peterson Patent 2,340,554, issued February 1, 1944, except for circuit changes improving both the operation characteristics and the economy of the arrangement.

Fig. 24 shows the alarm checking and supervisory circuits which are accessible over conductors 1095 to 1098 from the connnectors for enabling an operator to connect therewith, and by dialling a relay switch therein to check for various trouble conditions or alarm signals, such as fuse alarm, low voltage alarm, generator transfer and other conditions described more fully hereinafter.

*Local connections*

Having briefly described the purpose of the equipment shown in the drawings, the operation can be better understood by a description based on establishing a local connection and then describing the operation of each special feature. Accordingly, station B line L216 will call the subscriber A on line L270 by dialing 270 plus the ringing digit "1."

The call is initiated by station B lifting the telephone handset which closes an operating circuit to line relay 240 over the calling loop including contacts 251 and 252. Relay 240 at contacts 244 and 245 prepares a line marking circuit by energizing tens group relay 310 and unit relay 340. The line is made busy to outgoing calls by opening the circuit to relays 250, 260 at contacts 241 and by grounding conductor 259 at contacts 242. The primary energizing circuit for relay 310 is traceable from ground, contacts 244, 262, conductor 283, winding of relay 310, contacts 312, 361, series chain contacts 314—304, conductor 499, contacts 432, resistance 485 to battery. Contacts 313 are the first to close, holding relay 310 energized after the above described primary energizing circuit, for all group relays 300, 310 is open at contacts 314 and 312. The primary energizing circuit for relay 340 is traceable from ground, contacts 245, 263, conductor 285, contacts 317, winding of relay 340, contacts 342, 362, series chain contacts 354—324, resistance 368 to battery. Contacts 343 are the first to close, holding relay 340 energized after the above-described primary energizing circuit, for all unit relays 320, 350, is open at contacts 342 and 344. Relay 360 is energized at contacts 345, further opening the primary operating circuits for the group relays at contacts 361 and the unit relays at contacts 362. Relay 360, at contacts 363 prepares a timing circuit comprising relays 400, 410 and 430. The operation of relays 400—430 together with the link distributor relays 440—470 will be explained under a separate heading "Link Distributor." For the present it will only be necessary to understand that the illustrated wiring is for the last link in a group to receive the call by showing relay 470 energized, 460 deenergized and conductor 394 connected through closed contacts 411, 461, 472, conductor 493 to the connect relays 550 and 560. Relays 550 and 560 energize in multiple with relay 360 over the above traced circuit from ground at closed contacts 345. Relay 550 at contacts 551—555, extends conductors 397, 398, 399, 453 and 454 to the subgroup, or switching unit relay 540, unit relays 530, 520 and group relays 510, 500 respectively.

The group relays 500, 510 are controllable either direct from corresponding group relays 300, 310 in the allotter when the group does not have restricted lines, or from the auxiliary group relays 420, 480 when restricted lines are assigned. Unit relays 520—530 are controllable from the allotter unit relays 320, 330 at contacts 326 and 336 and also are controllable from allotter unit relays 340, 350 at contacts 347, 357 respectively. Relays 340 and 350 representing the unit digits 6 and 0 also control the sub-group, or switching unit relay 540 at contacts 346 and 356. The operation of the restricted service feature comprising contacts 321—351, inclusive, together with the contacts controlled by relays 420 and 480 will be explained under a subsequent heading "Restricted Service."

Specifically, when relays 310 and 340 are energized as described hereinbefore, relays 510, 520 and 540 are energized. Relay 480 is energized from ground, contacts 311 over conductor 395. Relay 480 at contacts 481 extends ground to conductor 453, contacts 554, and winding relay 510 to battery. Relay 510, closes contacts for a group of ten lines, including contacts 514, 515, 516 for extending conductors 295, 296 and 297 to contacts 524, 525 and 526, respectively. Relay 520 is energized from ground contacts 347, by way of conductor 399 and contacts 553. Contacts 524, 525, 526 connect the extended conductors 295, 296 and 297 to contacts 542, 544 and 546, respectively. Relay 540 is operated from ground at contacts 346 by way of conductor 397 and contacts 551. The conductors 295, 296 and 297 are further extended at contacts 542, 544 and 546 to conductors 508, 509 and 594. As previously described relay 560 is energized in multiple with relay 550. An energizing circuit is closed at contacts 561 for line relay 610 which is traceable from the ground, upper winding of relay 610, contacts 621, 601', conductor 508, contacts 561, resistance 569, conductor 509, contacts 602', 623 and lower winding of relay 610 to battery. Relay 610 at contacts 611 extends ground at contacts 663 for energizing relay 630. Relay 630 at contacts 631 closes a multiple ground through resistance 615 to relay 630 to hold relay 630 energized until contacts 611 are opened. At contacts 633 relay 630 extends ground at contacts 681 to energize relay 640. Contacts 642 energize relay 660. At contacts 664, relay 660 connects ground to hold conductor 593. The energized relays 510, 520 and 540 lock through contacts 517, 527, 547, respectively, to the ground on hold conductor 593. The energized relay 660 at contacts 661 extends ground at contacts 642 to conductor 594 which energizes relays 250, 260 in series, over conductor 297, contacts 516, 526, 546 and conductor 594. Relay 250 at contacts 251 and 252 opens the circuit to line relay 240. Relay 240 restores and opens contacts 242, 244 and 245 and relays 310 and 340 restore. Contacts 345 open, deenergizing relays 360, 550 and 560. After a slight delay relay 360 restores and the common equipment in Fig. 3 is in the normal position for extending a new call. Relays 510, 520, 540, 250 and 260 remain operated from ground on conductors 593 and 594.

*Link distributor*

Before proceedings with the description of the connector relays, the operation of the link distributor will be described.

From the previous description relay 660 was operated after relay 560 energized. Relay 660 opens contacts 669' and after relay 560 is deenergized contacts 562 are opened. This combination of relay 560 deenergized and relay 660 energized opens the closed circuit between conductors 495 and 494 and relay 470 deenergizes. Relay 470 at contacts 477 will complete the chain circuit through contacts 467 to relay 440. An incomplete circuit is prepared at contacts 475 for reenergizing relay 470. It must be understood at this time that this busy link has relay 660 energized, therefore relay 470 cannot be reenergized because its operating circuit is opened at contacts 669'. The same condition exists on all other busy links and each associated link relay such as 460, 470 cannot be reenergized if the link is busy.

For explanatory purposes we will assume that the link associated with relay 470 is idle. Relay 440, energized from closed chain contacts 477, 467 and extends ground from contact 442 to contacts 465, 475. All corresponding relays associated with idle links are energized in a like manner as will be explained for relay 470 which pulls from ground, contacts 442, 475, conductor 495, contacts 684, 669', conductor 494 and winding of relay 470 to battery. Relay 470 at contacts 472 prepares an energizing circuit for connect relays 550, 560. Preceding relays such as 460 are also operated, in a like manner, and conductor 394 is extended to the first idle link. After a call is extended by each preceding allotted link the associated distributor relays 460 etc. are deenergized in the same manner as described for relay 470. Contacts such as 461 are reclosed and conductor 394 is successively extended through these contacts to the next idle link, such as through contacts 472 to conductor 493.

If all links are busy, relays 460—470 cannot reoperate and relay 440 remains in the energized position. The circuit to the slow to release relay 415 remains open at contacts 441. Relay 415 deenergizes after a slight delay and operates the all trunk busy register 484 from contacts 416. In addition, chain contacts 461, 471 extend conductor 394 to relay 450. If a call is initiated during the all links busy condition, ground at contacts 345 or similar contacts will energize relays 450 and 360. A multiple holding circuit for relay 450 is completed from ground contacts 444 and 452. Relay 450 at contacts 451 opens the timer circuit extending to the lower winding of relay 400. After a link becomes idle the associated relay such as 460 or 470 is reoperated as described hereinbefore and relays 440, 450 will restore to the normal position.

In case an allotted link is not extended to a calling line within a predetermined time period, that link is released and the call is then extended on to the next link in the following manner. Relays 310, 340, 470 together with 360, 550 and 560 are operated as previously described. Relay 360, at contacts 363, extends the time pulse lead TP1 at timer 480 to conductor 491 and lower winding of relay 400. A ground pulse on TP1 conductor from the timer unit 480 energizes relay 400 which locks through contacts 401 to ground at contacts 345. Relay 400 at contacts 402 extends the second time pulse conductor TP2 to relay 410. The timer 480 is well known and is not shown in detail. It is only necessary to know that the timer unit extends a ground pulse to TP2 approximately three seconds after the time pulse to conductor TP1. This time interval is of sufficient duration for the normal extension of a link to the calling line and the release of relays 310, 340. We will assume the link is not extended and that relay 410 is operated after the stated time interval. At contacts 412 battery is extended from resistance 485 through contacts 431, 463, 474, conductor 495, contacts 562, conductor 494, to relay 470 and battery. This battery connection to relay 470 shunts relay 470 and this relay restores to assign a new link as hereinbefore described. Relay 410 at contacts 413 energizes slow to operate relay 430. The operating delay for relay 430 is sufficient to make the shunt effective to release relay 470 before contacts 431 are opened. Contacts 432 disconnect battery through resistance 485 from conductor 499 so that any operated tens guard relay, such as relay 310, restores to prevent a faulty line circuit from holding the distributor and sequentially taking into use successive idle links. Contacts 317 open and relay 340 restores. Contacts 345 open and relays 360 and 400 restore to open the circuits to relays 410 and 430. After contacts 314, 312 and 361 are reclosed, relays 310, 340 are again energized from relay 240 and the call is established over the next link. It is understood that any other call having a preferred assignment will be extended before the released call is extended the second time.

*Connector*

Figure 6:
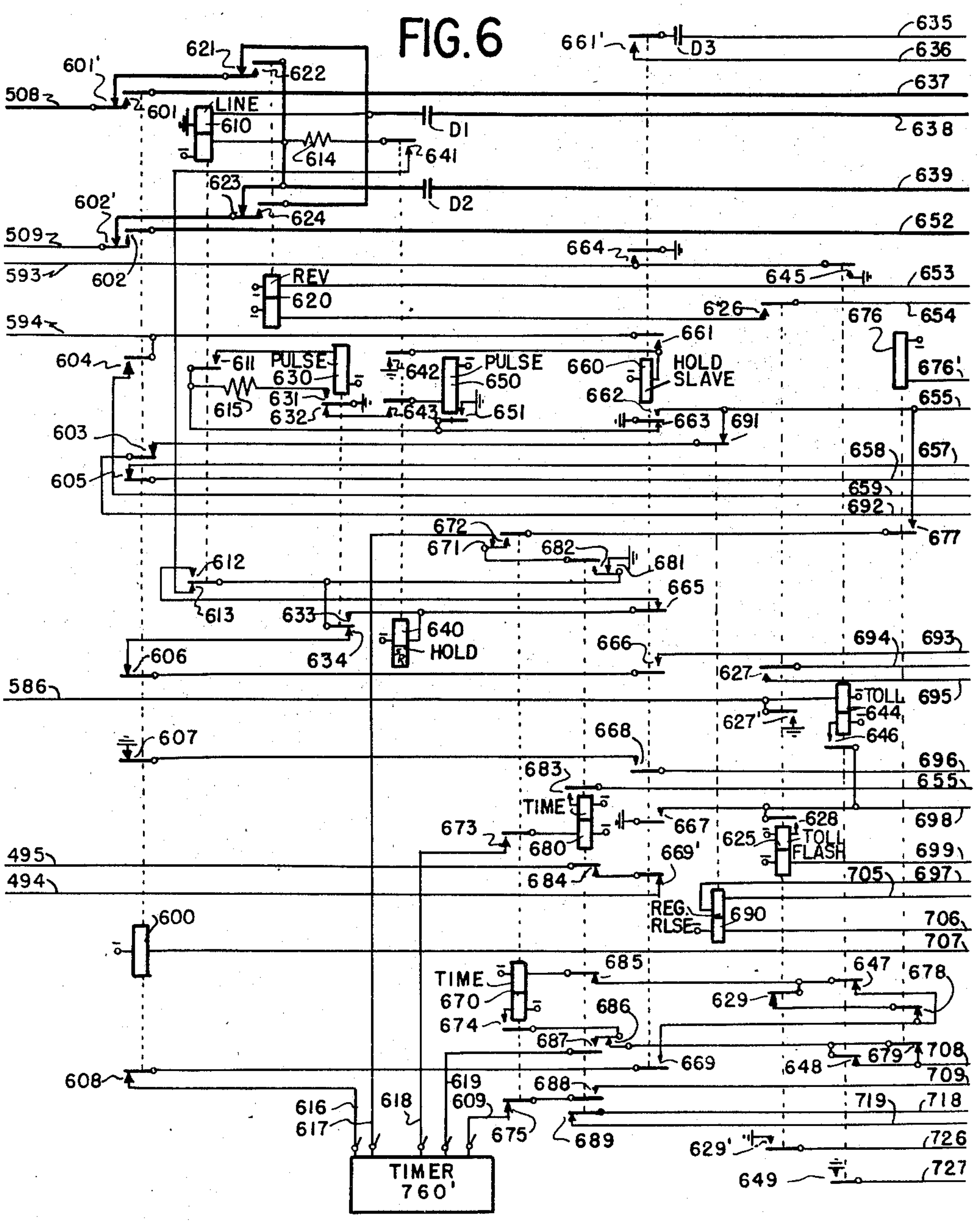
Figs. 6, 7, 8, 9 and 10 show the relays of the connector portion of the finder-connector link.
Figure 7:
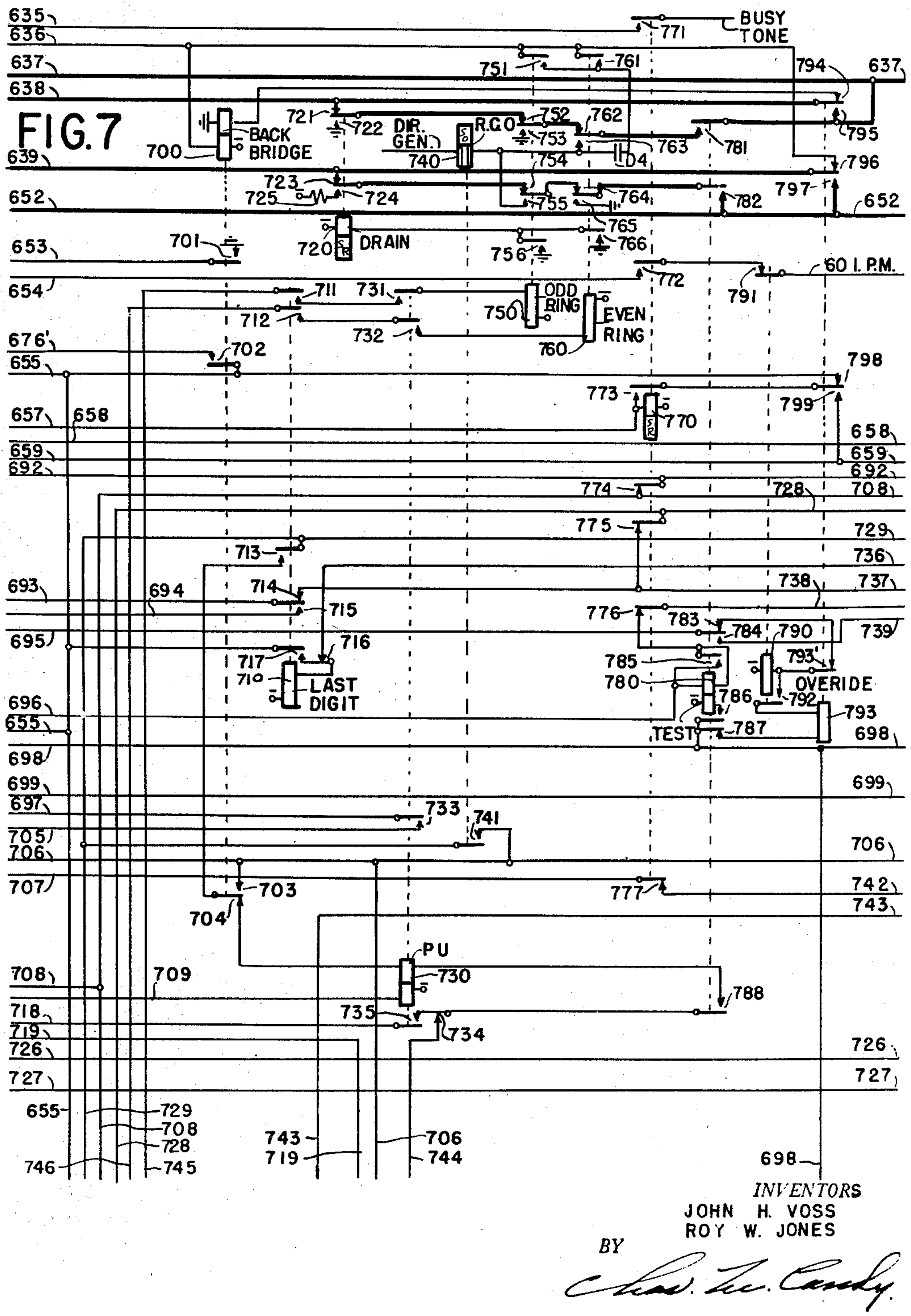

In the preceding description a call was established from the calling line B through the finder link Fig. 5 to conductors 508, 509, 593 and 594 in Fig. 6 of the connector. Relay 610 was first energized from contacts 561 but after the described release of relay 560, relay 610 is held in the energized position over the calling loop of station B. Further, relays 630, 640 and 660 are energized at contacts 611, 633 and 642, respectively, preparing the additional control paths.

We will now describe the operation of the connector in response to the calling party dialing the called station directory number.

The loop circuit between the line conductors 508 and 509 is successively opened and closed by the dial springs at calling station B and relay 610 follows these dial impulses, opening and closing contacts 611, 612, and 613. Relay 640, being slow to release, holds relay 660 energized during successive dial impulses. Relay 630 restores after contacts 611 open and at contacts 634, ground is extended through contacts 606, 666, conductor 693, contacts 714, 775, conductor 728, contacts 811, 821, 831, winding relay C1 to battery. Relay 970, connected to conductor 728 in multiple with relay C1, energizes over the circuit traced above. Slow to release relay 970 does not restore between successive dial pulses and at contacts 971—973 the control paths from contacts on relays C1 to C0 are temporarily disabled. Relay C1 at contacts 871 prepares a circuit for energizing relay 830 in series with relay C1 after ground is removed from conductor 728 at springs 634. The above operations have taken place during the open period of the first impulse from the calling station dial. The dial springs again reclose and relay 610 is reenergized. The energization of relay 610 is aided by a circuit through resistance 614, contacts 641, contacts 613 to ground at contacts 681. Ground through resistance 614 will not reoperate relay 610 until the loop between conductors 508 and 509 is closed at the dial springs. Relay 650 is energized from contacts 643, 632. Relay 630 re-energizes from ground at contacts 651, contacts 611 to battery at relay 630. Relay 610 at contacts 612 recloses a multiple circuit for holding relay 640 from ground at contacts 681. Relay 630 at contacts 632 deenergizes relay 650 and at contacts 634 opens the impulsing circuit previously traced to relay C1. Relay C1 remains energized from contacts 871, winding of relay 830, contacts 823, conductor 708, contacts 774, conductor 692, contacts 603, contacts 691, to ground at contats 662. Prior to the reoperation of relay 630, ground through contacts 634 to conductor 728 shunted relay 830. Relay 830 now energizes in series with the winding of relay C1. The first described circuit to relay C1 is further opened at contacts 831 and an energizing circuit for relay C2 is prepared at contacts 832 and 876. It should be noted at this time that the purpose of relay 650 is to insure an effective pulse to relay C1 from contacts 634. Relay 630 normally cannot be reenergized even if line relay 610 is energized until relay 650 closes contacts 651. Relay 650 energizes slower than relay C1, therefore it is obvious that should relay 610 be reenergized prematurely, the reenergizing path for relay 630 is not effective until a ground pulse of sufficient duration has been sent to relay C1 to cause its operation.

In a like manner to that described for the energization of relays C1 and 830, relays C2 and 820 are energized in response to the second impulse. Contacts 823 open and relays 830, C1 restore. Slow to release relay 970 remains in the operated position during successive impulses and prevents the counting relays from effectively energizing any transfer circuits during this period.

The first digit of the called number is 2. During the pause between digits relays 610, 630, 640 and 660 are energized, relay 970 restores and the following relay operations are completed. Relay 860 is energized from battery winding relay 860, conductor GS2, contacts 878, conductor 3 of cable 968, contacts 912, 901, 972, conductor 729, contacts 824, conductor 655 to ground at contacts 662. Relay 860 at contacts 862 closes a multiple holding circuit in series with relay 910 to ground on conductor 698. The ground circuit which operates relay 860 prevents relay 910 from operating at this time. Relay 860 at contacts 861 energizes relay 690 from battery, lower winding of relay 690, conductor 706, contacts 907, 917, conductor 908, contacts 861, conductor 698 to ground at contacts 667. Relay 690 at contacts 691 opens the holding ground circuit for relays 820 and C2. Relays 820 and C2 restore, removing the ground shunt to relay 910 at contacts 824 and 878. Relay 910 now energizes in series with relay 860, from contacts 862, conductor 909, winding of relay 910, conductor 698 to ground at contacts 667. Relay 910 at contacts 916 and 917 transfers the energizing circuit for relay 690 from conductor 908 to 982, and relay 690 deenergizes.

The connector is now ready to receive the second digit 7. The operation for the first two impulses is the same as described for the first digit. Briefly summarized, relay 610 deenergizes relay 630 which energizes relays 970 and C1 by extending ground from contacts 681, contacts 634, 606, 666, conductor 693, contacts 714, 775, conductor 728, contacts 811, 821, 831 to battery at relay C1. The above traced circuit is extended through contacts 871, the winding of relay 830, contacts 823 to ground on conductor 708. After the first impulse relays 610, 630 are again reenergized, ground is disconnected from pulse conductor 728 at contacts 634, and relay 830 is energized in series with the winding of relay C1. Relay C2 is connected to conductor 728 through contacts 876, 832. On the next impulse ground is again connected to conductor 728 at contacts 634 energizing relay C2. At contacts 877 a circuit is prepared for energizing relay 820. After the second impulse, ground is again opened to conductor 728 at contacts 634 and relay 820 energizes. Relay 820 at contacts 823 opens the circuit for relays 830 and C1. Relays C2 and 820 prepare the energizing circuit for relay C3 at contacts 879 and 822. In a like manner relay C3 followed by relay 810 are energized from the third impulse which prepares an energizing circuit for relay C4 at contacts 882 and 812 and deenergizes relays 820 and C2 at contacts 813. On the next impulse relay C4 followed by relay 830 are energized and relays C3 and 810 restore. In a similar manner successive impulses energize corresponding relays and after seven impulses, relays C7 and 830 are energized. Slow to release relays 640 and 970 together with relay 660 remain in the energized position during the dialing period. Relay 970 deenergizes during the interdigital pause. Contacts 971, 972, 973 are reclosed, extending ground on conductor 655, contacts 834 over conductor 729, contacts 972, 973, 903 and 915, conductor 4 in cable 968, contacts 897 of relay C7, conductor 70 in cable 826, contacts 864, conductor 864, contacts 953, conductor 981, winding of relay 1030 to battery. Relay 1030 energizes relay 690, and at contacts 1034 prepares a self locking circuit for itself in series with relay 900. Relay 900 is shunted by the ground initially energizing relay 1030 until the circuit to conductor 981 is opened at contacts 834. Relay 690 energizes over a circuit comprising ground at contacts 667, conductor 698, contacts 1033, conductor 982, contacts 916, contacts 907, conductor 706, winding of relay 690 to battery. Relay 690 at contacts 691 deenergizes relays 830 and C7 opening contacts 834 and 897 which disconnects ground from the primary operating circuit for relay 1030. Relay 900 energizes in series with relay 1030. At contacts 906 a circuit is prepared over which relay 1000 energizes in case the next digit is greater than 5. Relay 900 at contacts 907 opens the circuit to relay 690 and at contacts 904, 903, transfers conductor 729 from conductor 4 to conductor 6 of cable 968. At contacts 902 conductor 729 is extended to conductor 7 of cable 968. Relay 690 deenergizes and prepares at contacts 691, a ground circuit for energizing relays 810—830 during the next digit.

The next digit 0 is dialed in a like manner. Relays 610 and 630 follow the impulses and contacts 634 are opened and closed ten times. The counting relays C1 to C0 together with the sequence relays 810—830 are energized on each impulse as previously described. In a like manner relay 970 remains energized during impulses. After the tenth impulse relays C0 and 830 are energized and relay 970 restores, energizing relay 1020 by closing grounded conductor 729 at contacts 972 to conductor 7 of cable 968 by way of contacts 902, 921, contacts 818, conductor 966 and winding of relay 1020 to battery. On the sixth impulse relay C6 energizes relay 1000 from ground on conductor 655, contacts 893, conductor 1 in cable 968, contacts 906, 927, conductor 983, relay 1000 to battery. Relay 1000 at contacts 1007 locks to ground on conductor 698. At contacts 1002, 1004, 1006, conductors 637, 652 and 659 are extended to contacts on the unit relays 1010, 1020 that correspond to lines that end in digits 6 to 0. At contacts 1029 a holding circuit is prepared for relay 1020 in series with relay 920. Battery for energizing relay 920 is shunted by the ground on conductor 966 at the coil 1020. Relay 690 is energized at contacts 1028 from ground on conductor 698, contacts 1028, conductor 986, contacts 918 and 928, conductor 706 to battery at the coil of relay 690. At contacts 691 conductor 708 is disconnected from ground and relays C0 and 830 restore, opening contacts 834 and 818. Relay 920 now energizes in series with relay 1020. Relay 920 at contacts 927 opens the energizing circuit for relay 1000 and at contacts 923 prepares a circuit over which relay 710 energizes after the next digit is dialed. Relay 690 is deenergized at contacts 928 and the counting relays are again ready to receive the next series of impulses.

It is understood that the called line is free and battery is extended from the cut off relay in line circuit 210 through conductor 1083, contacts 1059, 1027, 1006 to conductor 659. Relay 920 at contacts 925 extends the above traced test circuit by way of conductor 738 and contacts 776 to the upper winding of relay 780 which energizes from ground on conductor 696 by way of contacts 668 and 607. Relay 780 at contacts 786 locks to ground on conductor 698 and at 785 the energizing winding of relay 780 is shunted. Relay 780 at contacts 781 and 782 prepares a circuit between back bridge relay 700 and the called station over the C270 line conductors 1081, 1082 respectively. The above circuit is the transmission circuit when a call is completed but is used in the present instance to establish a supervisory condition, should a station on the called line attempt to initiate a call before the last digit is dialed.

The calling station dials the last digit 1. Relays 610 and 630 respond, and relay 630 at contacts 634 again extends a momentary ground to energize relays 970 and C1 in multiple. Relay C1 locks at contacts 871 in series with relay 830. Relay 630 reenergizes, open contacts 634 and removes ground from pulse conductor 728. Relay 830 previously shunted now energizes. Relay C1 at contacts 872 extends ringing interrupter conductor R1 to conductor 745. Relay 970 restores, and relay 710 energizes from ground on conductor 655 at contacts 662, contacts 834, conductor 729, contacts 972 and 973, contacts 904 and 923, conductor 736, contacts 716, coil of relay 710 to battery. Relay 710 energizes and locks at contacts 717 to ground on conductor 655 and at contacts 714 opens the pulsing circuit. At contacts 713 a circuit is prepared for energizing relay 730. At the start of each ringing cycle of the interrupter 761′ a pulse of battery is momentarily connected to conductor PU-1 for energizing relay 730 by way of contacts 841, conductor 744, contacts 734 and 788, upper winding of pick-up relay 730, contacts 704 and 713, conductor 729, contacts 834, conductor 655 to ground at contacts 662. Relay 730 energizes and locks at contacts 735, conductor 718, contacts 689, conductor 719 to a normally closed source of battery at interrupter 761′. Relay 730 at contacts 731 and 732 extends ringing control paths 745 and 746 to ring relays 750 and 760 of which only the relay 750 is effective when the ringing digit is 1. Since digit 2 was dialed as a first digit relay 840 is not energized and only relay 750 is responsive to ringing ground pulses from the interrupter 761′. The circuit for relay 750 is traceable from battery at relay 750, contacts 731, 711, conductor 745, contacts 872, conductor R1 to ground pulses from interrupter 761′. Relay 750 is energized in response to the described ground pulses on the ringing interrupter conductor R1 and at contacts 755 closes a ringing circuit to be called line conductor 1082 from ringing generator Gen., winding of ring cut off 740, contacts 755, 764 and 782, conductor 652, contacts 1004, 1026 and 1058, conductor 1082 to the called station. Relay 750 at contacts 753 connects ground to the other line conductor 1081 as a return path for the ringing circuit in case of bridged ringing and also for operating the ring cutoff relay 740 when the called party answers. This circuit may be traced from ground, contacts 753, 762 and 781, conductor 637, contacts 1002, 1025 and 1057 to conductor 1081 and the called line. The ringing current is alternating current and includes a direct current battery potential for energizing the ring cutoff relay 740 when the called party answers. Relay 740 is energized over the previously traced line circuits when the called station answers. Relay 740 at contacts 741 energizes relay 690 over conductor 706 from the previously described ground on conductor 729. Contacts 691 disconnect ground from conductors 692 and 708 and relay 830 and C1 restore. At contacts 872 the ringing interrupter conductor R1 is disconnected from relay 750. At contacts 834 ground is disconnected from conductor 729 and relay 730 restores, further opening the circuit to relay 750.

Referring back to the prior description wherein ringing current is connected to the called line by the energization of relay 750. At contacts 756 relay 720 is also energized at that time. Relay 720 at contacts 721 and 723 opens the transmission circuit of the called line. At contacts 722 and 724 ground and battery through resistance 725 is connected to conductors 637 and 652. Relay 720 is slow to release and will hold momentarily after relay 750 restores. Thus ground and battery are connected to the called line to drain any foreign potentials that remain on the called line after ringing current is applied before the line is extended to relay 700.

After the drain relay 720 restores the called line is extended to relay 700 over conductors 1081 and 1082, contacts 1057, 1058, 1025 and 1026, contacts 1002 and 1004, conductors 637 and 652, contacts 781 and 782, 762 and 764, 752 and 754, 721 and 723, 794 and 796 to the upper and lower windings of back bridge relay 700. Relay 700 energizes over the answering station line and at contacts 701 energizes relay 620 over conductor 653. Relay 620 reverses the current on the calling line conductors for supervisory purposes. Relay 700 also, at contacts 702 operates relay 676 to prepare conversation timing circuits, to be described later.

After conversation and in response to the called party hanging up his receiver the back bridge relay 700 releases and at contacts 702 causes the release of relay 676. In response to the calling party restoring his receiver line relay 610 restores and at contacts 612 opens the circuit of relay 640 which releases after a short interval. At contacts 642 relay 640 opens the circuit of relay 660 and disconnects ground from conductor 594 to release the cutoff relay 250 and lockout relay 260 in the line circuit. At contacts 664 relay 660 disconnects ground from conductor 593 to restore the operated finder group and units relays. At contacts 662 relay 660 disconnects ground from conductor 655 to release relay 710. At contacts 667 relay 660 disconnects ground from conductor 698 to release the remaining connector relays, such as relays 780, 900, 910, 920, 940, 1000, 1020 and 1030. The finder connector link is now restored and may be used on subsequent calls.

*Multi-party signalling*

The selection of different ringing codes is well known and will only be briefly described herein. It is obvious from the previous description that any one of ten ringing leads R1 to R0 can be selected by dialing any one of the digits 1 to 0 as the last digit to energize one of the counting relays C1 to C0. In a like manner the selected ringing interrupter conductor is extended to either relay 750 or 760 depending on the digit dialed. Relay 750 is effective if the ringing digit is an odd number and relay 760 is effective if the ringing digit is an even number. When relay 750 is effective the coded ringing current is extended over conductor 652 to conductor 1082, and relay 760 connects ringing current to conductors 637 and 1081. Thus a total of ten codes are available for signalling as many as ten stations on one line. These signalling facilities are doubled by having the code conductors R1 to R0 arranged for two codes each. The interrupter 761′ for producing this type of code is well known and therefore it is not shown in detail. It is only necessary to know that the second group of ringing codes includes a ringing pulse that precedes the first group of codes. It is obvious that the above-mentioned prefix signal is effective provided relay 730 is energized. Accordingly the interrupter is arranged to close battery to conductor PU-1 only between the first and second signals of a code. Likewise battery on conductor PU-2 precedes all ringing pulses. It is obvious that relay 840 controls the connection of conductors PU-1 or PU-2 to relay 730 to determine whether code groups 1 or 2 are used for signalling. Relay 840 is energized in combination with relay 860 if the first digit dialed is 3 and in combination with relay 850 if digit 5 is dialed. When the first digits are 2 or 4 relay 840 is not energized. Accordingly the first group of codes are effective on first digits 2 and 4 and the second group of codes are effective on first digits 3 and 5.

As previously described relay 730 is held energized at contacts 735 from battery over conductor 718, contacts 689, conductor 719 to a normally closed battery supply at interrupter 761′. This battery is opened at the end of each code cycle, restoring relay 730 which reenergizes from battery on either pick-up conductor PU-1 or PU-2 that precedes the selected code dependent upon the operated condition of relay 840.

The energization of relay 860 when the first digit is 2 has been described. In a like manner, relay 860 is also energized together with relay 840 when the first digit is 3, relay 850 is energized on a first digit 4 and in combination with relay 840 on a first digit 5. Relay 850 transfers conductors 10–50 to another group of tens relays. Thus the first digit also determines which of the two groups of tens relays is being used in each call.

*Timing a call*

The common timer 760′ is well known and therefore is not shown in detail. The timer operates in cycles of approximately two minute intervals in which conductors 617 and 619 are normally grounded while conductors 616, 618 and 609 are normally free of ground. During a two minute cycle the conductor 609 is grounded twice, conductor 617 is opened for one second after one and one-half minutes from the start of the cycle, conductor 619 is opened for one second following the open period on conductor 617, conductor 618 is grounded for a short closed period following the open period on conductor 619, and conductor 616 is grounded for a short closed period following the closed period on conductor 618. The two minute cycle just described is repeated continuously during a call.

When the finder-connector link is seized and relay 660 is energized as previously described, a circuit is prepared at contacts 669 for operating relay 670 as soon as timer conductor 616 is grounded. This circuit may be traced as follows: from grounded timer conductor 616, contacts 608, 669, 647 and 685 through the upper winding of relay 670 to battery. Relay 670 at contacts 674 completes a locking circuit for itself through its lower winding from ground at contacts 662, 691, 603, conductor 692, contacts 774, conductor 708, contacts 679 and 648 in multiple, and contacts 686 to locking contacts 674. At contacts 673 relay 670 prepares a circuit for energizing relay 680 over timer conductor 618 which is not grounded for an interval approximating two minutes. If a digit is dialled and register release relay 690 is operated as previously described before timer conductor 618 is grounded, contacts 691 open the described locking circuit for relay 670 which restores until another ground pulse is connected to timer conductor 616. Assuming now, however, that the digit is not dialled within two minutes then ground on timer conductor 618 energizes relay 680 over contacts 673 and the lower winding of relay 680. Relay 680 at contacts 683 locks to grounded conductor 655. At contacts 681 relay 680 disconnects ground from relay 640 which restores. At contacts 642 relay 640 opens the circuit of relay 660 which also restores. Relay 660 at contacts 664 releases the finder link and at contacts 661 releases the line circuit. At contacts 662 and 667 the holding ground is disconnected and relays 670, 680 and other link relays restore the connector to normal position.

The time disconnect is ineffective on operator or special calls, calls wherein relays 644 and 625 are operated as previously described. These relays at contacts 629, 647 and 648 control the circuit of relay 670 so that the time disconnect connections are opened.

If a local to local call progresses to a point where the called party answers and relays 700 and 676 are operated as previously described, the timing circuits are temporarily disabled because relay 676 at contacts 677 connects ground at contacts 662 over contacts 672, 682, 612 and 665 for holding relay 640 energized when relay 680 is first energized. Relay 680, it will be remembered, energized after the energization of relay 670 when timer conductor 618 was grounded. In this case since the called party has answered relay 640 is maintained energized as above described. At contacts 687 relay 670 is now locked to grounded timer conductor 619. Approximately two minutes after the energization of relay 680 ground is removed from timer conductor 619 thereby opening the locking circuit of relay 670 which restores. At contacts 671 and 672 grounded timer conductor 617 is substituted for ground at contacts 662. Approximately two minutes after the release of relay 670 ground is removed from timer conductor 617 with the result that the relay 640 restores to release the connection as previously described.

A warning tone is transmitted to the calling party prior to the release of the connection in the same manner as described in the Peterson Patent No. 2,333,039 and in the present case by the operation of pick-up relay 730. Briefly, timer conductor 609 is grounded prior to the removal of ground from conductor 619 to operate pick-up relay 730 over contacts 675 and 688 and conductor 709. The pick-up relay 730 closes circuits (not shown) for connecting a tone to the talking conductors to inform the subscribers that their conversation period is about used up and that the connection will be automatically released in a short time.

*P. B. X Service*

For explanatory purposes station B, line L216 will call a P. B. X having trunks assigned at terminals such as C271 and C276 by dialing the first trunk in the group, namely 271, followed by dialing the ringing digit 1.

The operation of the equipment illustrated in Figs. 2 to 10 is the same for dialing 2711 as described for station B calling station 2701 except for the third digit 1 in place of digit 0. A description of similar operating features will not be repeated. It is only necessary to know that the calling line is extended by dial pulses as previously described. After the second digit, relays 610, 630, 640, 660, 860, 910, 900, and 1030 are energized. Also after the third digit the energization of relay C1 is followed by relay 830 and the restoration of relay 970. The latter relay completes a circuit at contacts 972, 973 for energizing relay 1200 through contacts 875. The circuit to relay 1200 is traceable from ground contacts 662, conductor 655, contacts 834, conductor 729, contacts 972, 973, contacts 904, 922, conductor 6 in cable 968, contacts 875, conductor 743, contacts 1032, conductor TA, winding or relay 1200, contacts 1203, 1223, 1241, chain contacts 1214—1204, contacts 1231 to battery at resistance 1232. Relay 1200 at contacts 1202 closes a holding circuit to battery and at contacts 1203, 1204 opens the chain to prevent similar relays, such as relay 1210, from energizing during the trunk selecting period. Therefore only one trunk call through the group access relays of Fig. 12 can take place at a given time.

Relay 1200 at contacts 1201 energizes relay 1280 from ground at contacts 1201, conductor TG, contacts 1031, conductor P. B. X to battery at relay 1280. Relay 1280 together with relay 1200 prepares a circuit over which one of the unit relays 1010, 1020 that corresponds to an idle one of the P. B. X trunks is energized. Each trunk in the P. B. X group controls a corresponding relay, such as relay 1510, 1520, 1530 or 1540 which is energized when the trunk is busy, opening the circuit to the corresponding unit relay.

We will assume all trunks except the last trunk 6 are busy in which case relays 1510, 1520 and 1530 will be energized. In this case unit relay 1010 will energize from ground at contacts 1513, 1523, 1533, conductor 1501 in cable 1500, contacts 1283, 1207, conductor U1–6 in cable 1290, and through the winding of relay 1010 to battery. In the previous description it was noted that each unit relay controls connections to two lines. Lines having unit numbers 1–5 are effective when the units switching relay 1000 is not energized and line 6–0 are effective when the subgroup or units switching relay 1000 is energized. Since P. B. X trunk #6 is the first idle P. B. X trunk a circuit may be traced for energizing relay 1000 from ground, contacts 1531, 1521, 1511, conductor 1506, contacts 1282, 1206, conductor US in cable 1290 and through the lower winding or relay 1000 to battery. Relay 1000 locks at contacts 1007 to ground on conductor 698. Relays 1010, 1030 and 1000 extend the P. B. X trunk 6, connected to conductors 1077, 1078, 1079 to conductors 637, 652 and 659 respectively.

A multiple holding circuit for relay 1010 is closed at contacts 1018 from ground on conductor 698 in series with relay 920. Relay 920 is shunted by ground at the winding of relay 1010 and does not operate at this time. Relay 1010 at contacts 1017 energizes relay 690 from ground on conductor 698, 986, contacts 918, 928, conductor 706 to battery at 690. Relay 690 at contacts 691 opens the holding circuit for relays 830 and C1 which restore and open contacts 834 and 875. The last named contacts opens the circuit to relay 1200 which restores and opens contacts 1201 disconnecting ground from conductor TG. Relay 1280 restores. Relay 1200 in restoring opens contacts 1206—1205' of which 1207 removes the shunting ground from conductor U1–6 to relay 1010. Relay 920 now energizes in series with relay 1010 and the common trunk equipment (Figs. 12 and 15) is free to handle another trunk call. Relay 920 at contacts 928 opens the circuit to relay 690 and at contacts 925 prepares a circuit over which relay 780 energizes in series with the line cutoff relay connected to conductor 1079. The operation of relays 920, 780, 690 together with dialing the ringing digit 1, energizing relay C1, followed by relays 830, 710, 730, connecting ringing circuit at relay 750 through relay 740, answering the call by energizing relays 740, 700, 620, 676 is identical to that described for the last digit when number 2701 was called. The transmission circuit between the called line connected to conductors 1077, 1078 is completed to the calling line connected to conductors 508, 509 through condensers D1 and D2. Battery supply for the calling line transmitter is from line relay 610 and for the called line from relay 700 through contacts 794, 796 and 781, 782. The last named relays are energized over the respective lines. Relay 610 controls relay 630, 640, 660, and relays 900, 910, 920, 780, 1000, 1010, 1030 are held from ground at contacts 667. The release of the connection is the same as previously described.

If all trunks are busy including trunk #6 the energizing circuit for the corresponding unit relay is not opened by the last trunk relay 1540, therefore relays 1010 and 1000 are energized as described hereinbefore. However conductor 1079 is grounded on a busy line and therefore busy relay 770 is energized before relay 920 is energized from ground on conductor 1079, contacts 1056, 1016, 1006, conductor 659, contacts 924, conductor 658, contacts 605, conductor 657 to battery at relay 770. Relay 770 locks to ground on conductor 655 at contacts 773 and connects busy tone to the calling line at contacts 771. Relay 770 at contacts 776 opens the incomplete circuit to relay 780 to prevent extending a complete circuit to the called line. Except for the described energization of relay 770 instead of 780 the relays operate in identical manner as previously described.

The established connection is released as described hereinbefore.

It should be noted that the idle P. B. X trunks are preselected, therefore the time period for establishing the described connection and energizing the unit relay 1010 from the common equipment relays 1200 and 1280 requires less time than the release period of a slow release relay, such as 1240. Accordingly provisions are made to release the stated common equipment if the connection is not established within a predetermined time period in the following manner. Relay 1200 at contacts 1205 energizes relay 1220 whereupon at contacts 1221 the circuit to the normally energized relay 1240 is opened. Under normal conditions relay 1200 and 1220 should restore and reenergize the slow-to-release relay 1240 before it can fully restore. Relay 1230 at contacts 1231 introduces a slight delay in the reenergizing circuit to relays 1200—1210 to prevent relay 1240 restoring prematurely due to successive calls. However, if a connection is not completed within approximately .03 of second relay 1240 restores. At contacts 1243 the busy relay 770 is energized from ground contacts 1243, 1204′, conductor 659, contacts 924, conductor 658, contacts 605, conductor 657 to battery at relay 770. Relay 770 at contacts 774 disconnects ground from conductor 708, and relays 830 and C1 restore, opening the circuit to relay 1200. Relay 1200 together with relays 1220 and 1230 restore and relay 1240 reenergizes. Relay 1280 restores when contacts 1201 are opened.

The busy relay 770 is held energized from ground on conductor 655 through contacts 798, 773 and at contacts 771 connects an audible busy tone to the line conductor 639 over conductor 635, condenser D3, contacts 661′, conductor 636, contacts 796 and conductor 639.

*Trunk calls*

We will now describe how the stations can reach the various trunk groups by dialing one digit numbers 7, 8, 9 or 0, respectively. A calling station is extended to the connector conductors 508, 509, and causes the operation of the dial pulse responsive relay 610, auxiliary pulsing relay 630, holding relays 640 and 660 as described under a preceding heading wherein station B extended a call to line 270. Let it be assumed that station B now extends a call to exchange 16 over one of the repeaters 1600 assigned to connector line terminations such as C205 by first dialing the digit 7. It is understood connector terminations C203 and C204, (preceding C205) although not shown, are also trunks to exchange 16 and are assumed to be busy.

Relay 610 together with relay 630 follow dial pulses, relays 640, 660 hold between pulses, relay 970 energizes on the first closure of contacts 634. The counting relays C1 to C7 each followed by an impulse sequence relay, such as 830, 820 or 810 are successively energized in response to the impulses. After seven impulses relay C7 and relay 830 are energized. Circuits for energizing relays 1040, 1200 and 1270 are prepared at contacts 834, 896, 898 and 899. Relay 970 restores making the above circuits effective. The circuit for energizing relay 1040 is traceable from ground contacts 662, conductor 655, contacts 834, conductor 729, contacts 972, 973, 903, 914, conductor 2 in cable 968, contacts 896, conductor 11 in cable 968 to battery at the winding of relay 1040. A circuit for holding relay 1040 is closed at contacts 1042, conductor 984, winding of relay 900 to ground on conductor 698. Relay 900 is shunted by ground at relay 1040 and is not energized at this time. Relay 1040 extends the 0 group of lines to the respective unit relays of which conductors 1087, 1089, 1091 are extended to contacts 1021, 1022 and 1023.

The circuit for energizing relay 1200 is traceable from ground, contacts 662, conductor 655, contacts 834, conductor 729, contacts 972, 901, 912, 911, 971, conductor 8 in cable 968, contacts 898, conductor TA in cables 969 and 1290, winding of relay 1200, contacts 1203, 1223, 1241, chain contacts 1214—1204, contacts 1231 to battery at resistance 1232. An individual holding circuit is closed to relay 1200 at contacts 1202 before the common chain is opened at contacts 1203 and 1204. Relay 1200 at contacts 1201 connects ground to conductor TG in cables 1290 and 969 over which relay 1270 energizes from contacts 899, conductor G7 in cables 969 and 1290 to battery at 1270. Relay 1270 in conjunction with relay 1200 extends the connections of the unit relays to the trunk selecting relays of the "7" trunk group (Fig. 14). The first two trunks of the 7 trunk group are shown busy in which case relays 1400, 1410, 1420 and 1430 are deenergized. The last trunk is idle and therefore relays 1440 and 1450 are energized to preselect this idle trunk, relay 1440 being energized over conductor 1443 from ground in repeater 1600. In this case the third trunk of the 7 trunk group is preselected and this trunk comprises conductors 1087, 1089 and 1091 extending to repeater 1600 and terminating in contacts 1046, 1047 and 1048 of the connector in Fig. 10. Since the third trunk is preselected a circuit for operating units relay 1020 may be traced as follows: from ground at contacts 1451, conductor 1485 in cable 1480, contacts 1277, 1202', conductor U5-0 in cable 1290, and through the winding of unit relay 1020 to battery. Relay 1020 at contacts 1021, 1022 and 1023 extends conductors 1087, 1089 and 1091 to conductors 637, 652 and 659 over contacts 1001, 1003 and 1005. A holding circuit is prepared for relay 1020 from contacts 1029, conductor 985, winding of relay 920 to grounded conductor 698. Relay 920 is shunted by the ground on conductor U5-0 and does not energize at this time. Relay 1020 completes a circuit for energizing relay 600 as follows: from grounded conductor 698, contacts 1028, conductor 986, contacts 919, conductor 742, contacts 777, conductor 707, and winding of relay 600 to battery. Relay 600 at contacts 601', 601, 602', 602 transfers the calling line conductors 508 and 509 from line relay 610 to conductors 637 and 652 over which the relays 1765 and 1760 in repeater 1600 are energized direct from the calling line. The operation of the repeater will be described under a separate heading. Relay 600 at contacts 604 connects ground to conductor 1091 for the purpose of causing the release of relay 1440 so that the trunk selecting relays of Fig. 14 may immediately preselect the next idle trunk. The following circuit operations take place in response to the closure of contacts 604. Relay 1630 in repeater 1600 is energized from ground, contacts 642, 661, 604, conductor 659, contacts 1005, 1023, 1048, conductor 1091 extending to repeater 1600 Fig. 16, contacts 1859, conductor 1795 and through the upper winding of relay 1630 to battery. At contacts 1632 ground is disconnected from conductor 1443 to release relay 1440 which restores and causes the trunk selecting relays to preselect the next idle trunk.

Relay 600 at contacts 603 disconnects ground at contacts 662 from conductors 692 and 708 to restore relays 830, C7 and 1200. At contacts 834 relay 830 removes the shunting ground from relay 900 which now energizes in series with relay 1040 over contacts 1042. Relay 900 at contacts 906 prepares the circuit for switching unit relay 1000 which is effective only in case a higher numbered units connection, such as to 6 to 0, is required. Relay 1200 restores and causes relay 1270 to restore. The shunting ground around relay 920 is removed at contacts 1202' and 1277 with the result that relay 920 now energizes in series with relay 1020 through contacts 1029. Relays 1040 and 1020 are held energized from grounded conductor 698 through the windings of relays 900 and 920. The common trunk equipment in Figs. 12 and 14 is now free to handle other trunk calls. When the line relays in repeater 1600 operate, ground is returned over conductor 1091 to hold relay 660 energized and to maintain conductor 594 grounded as follows: from grounded conductor 1091, contacts 1048, 1023 and 1005, conductor 659, contacts 604, conductor 594, and through contacts 661 and the winding of relay 660 to battery. Line relay 610 restores when relay 600, at contacts 601' and 602' and 601 and 602, transfers the calling loop to the repeater. Relay 610 at contacts 611 restores relay 630 and at contacts 612 opens one of the multiple ground paths to relays 640. Relay 630 at contacts 632 operates relay 650 without result at this time and at contacts 633 opens the circuit to relay 640 which restores after an interval. At contacts 643 relay 640 opens the circuit to relay 650 which restores and at contacts 642 opens the original energizing circuit of relay 660 which is now held energized from the repeater. The control of the connection is now under control of repeater 1600.

It is believed advisable at this time to describe in detail how the trunk selecting relays, such as shown in Fig. 14, preselect idle trunks in rotation. When repeater 1600 is seized either in an outgoing or incoming call, ground is removed from conductor 1443 to restore relay 1440. At contacts 1441 relay 1440 completes a circuit for operating reset relay 1460 from ground at contacts 1453. At contacts 1461 relay 1460 opens the circuit to the slow to release relay 1470 which does not restore for a predetermined time. At contacts 1462 relay 1460 opens the locking circuit of relay 1450 which restores. At contacts 1451 relay 1450 removes the marking ground from conductor 1485. Assuming now that the first two trunks are idle then relays 1400 and 1420 will be energized from normal ground connections extending from the corresponding repeaters, similar to repeater 1600. When relay 1450 restored contacts 1453 were opened with the result that relay 1460 restores and reestablishes the circuit to relay 1470 at contacts 1461 before relay 1470 had time to fully restore. A circuit may now be traced for operating relay 1410 as follows: from ground at contacts 1452, 1432, 1402, winding of relay 1410, contacts 1462, resistance 1463 to battery. At contacts 1411 relay 1410 grounds conductor 1483 to mark the first trunk so that the corresponding unit relay in a connector will be operated when this trunk group is again called. At contacts 1412 relay 1410 completes a locking circuit for itself as follows: from ground at contacts 1454, contacts 1434 and 1412, winding of relay 1410 to battery through resistance 1463. At contacts 1413 relay 1410 prepares a kickoff circuit for energizing relay 1430, which circuit is effective only if, for some reason, the connector does not switch through the desired connection before the slow to release relay 1240 deenergizes. When this first trunk is taken into use relay 1400 restores and completes a circuti for energizing relay 1430 as follows: from ground, contacts 1452, 1432, 1401, and 1422, winding of relay 1430, contacts 1462, and resistance 1463 to battery. At contacts 1431 relay 1430 connects marking ground to conductor 1484 to mark the second trunk as preselected and at contacts 1435 completes a locking circuit for itself from ground at contacts 1454. At contacts 1432 relay 1430 opens its original energizing circuit after closing its locking circuit, at contacts 1433 closes a multiple circuit for itself, at contacts 1434 opens the locking circuit of relay 1410 which restores, and at contacts 1436 prepares a kickoff circuit for relay 1450. Relay 1410 at contacts 1411 removes marking ground from conductor 1483 and at contacts 1414 prepares another point in the kickoff circuit to relay 1450.

When the second trunk is taken into use and assuming that the third trunk is idle relay 1420 restores and completes the circuit for relay 1450 as follows: from ground, contacts 1452, 1433, 1421 and 1442, winding of relay 1450, contacts 1462 and resistance 1463 to battery. At contacts 1451 relay 1450 connects the marking ground to conductor 1485, at contacts 1455 locks itself over contacts 1462, at 1452 opens its original energizing circuit, at contacts 1453 closes a multiple circuit for itself, at contacts 1454 opens the locking circuit of relay 1430 which restores, and at contacts 1456 prepares a kickoff circuit to the reset relay 1460. Relay 1430, upon restoring, at contacts 1431 removes the marking ground from conductor 1484 and at contacts 1437 prepares another point in the kickoff circuit to reset relay 1460. The trunk selecting relays are now in the condition illustrated in Fig. 14.

In case the connector does not switch through due to some fault relays 1200, 1220 and 1230 are held energized long enough to permit relay 1240 to restore and operate the connector busy relay in the manner previously described. In addition relay 1240 at contacts 1242 closes the kickoff circuit to the trunk selecting relays to cause the preselection of the next idle trunk. In case the first trunk in Fig. 14 is preselected, in which case relays 1400 and 1410 will be energized, then the ground at contacts 1242 completes the kickoff circuit for energizing relay 1430, if the second trunk is also idle, as follows: from grounded contacts 1242, contacts 1271, conductor 1486, contacts 1413, 1422 and through the winding of relay 1430 to battery at resistance 1463. Relay 1430 energizes, marks the second trunk and restores relay 1410 as previously described. In a similar manner relay 1450 or reset relay 1460 may be operated over the kickoff circuit from contact 1242.

In case all three trunks are busy then relays 1400 to 1450, inclusive, are all deenergized and the reset relay 1460 is energized over contacts 1452, 1432, 1401, 1421 and 1441. Relay 1470 is restored, to ground conductor 1487 at contacts 1471. If a call is made to the 7 trunk group at a time when all these trunks are busy the busy relay 770 in the connector is operated over the following circuit: from ground, contacts 1471, conductor 1487, contacts 1279, 1204′, conductor 659 in cable 1290, contacts 924, conductor 658, contacts 605, conductor 657 and through the winding of the busy relay to battery. The busy relay 770 at contacts 774 opens the circuit to relays 830 and C7 which restore, and at contacts 773 locks to grounded conductor 655. At contacts 834 relay 830 opens the circuit to relay 1200 and also removes the shunting ground from relay 900 which now energizes in series with relay 1040. No units relays were operated at this time because there was no marking ground at the trunk selecting relays Fig. 14. The busy relay transmits the busy tone to the calling party who now hangs up to release the partially established connection.

*Group 8 trunks*

Fig. 13 shows the Group Access relays and Trunk Selecting relays for the group 8 trunks. Since this group of trunks has considerable traffic a separate set of group access relays is provided to enable a trunk call to be made to this trunk group from one connector while another connector may be making a trunk call to the P. B. X, 7, 9, or 0 groups. Therefore simultaneous trunk calls can be made from different connectors to the 8 trunk group and to one of the other trunk groups mentioned. Simultaneous trunk calls from different connectors cannot, however, be made through the same Group Access relays because of the chain circuits controlling the energizing circuits of relays, such as relays 1200, 1210, 1300 and 1310. The Group Access relays of Fig. 13 are similar to the Group Access relays of Fig. 12 and the Trunk Selecting relays of Fig. 13 are similar to the Trunk Selecting relays of Fig. 14. The first of the two trunks illustrated in Fig. 13 of the 8 trunk group is shown as being busy with relays 1340 and 1350 deenergized while the second trunk is shown as being idle and preselected with relays 1360 and 1370 energized. Relay 1370 at contacts 1371 connects marking ground to contacts 1305′ to preselect the corresponding trunk so as to operate the corresponding connector units relay.

Assuming now that the calling line desires to call the 8 trunk group and dials the single digit 8. Extending the calling line through the finder together with the dialing is the same as described when digit 7 is dialled, except that relay C8 followed by relay 820 are energized after eight impulses. After series relay 970 recloses contacts 972 and 973, contacts 802 and 803 of relay C8 are effective for energizing relays 1030 and 1300 from grounded conductor 655.

The circuit for energizing relay 1030 is from grounded conductor 655, contacts 824, conductor 729, contacts 972, 901, 912, conductor 3 in cable 968, contacts 802, conductor 9 in cable 968 to contacts of the restricted service relays 930—950. These relays will be explained in detail in a following heading. For the present it will only be necessary to assume that the station is in the B group, and relay 940 is energized. The previously traced circuit to conductor 9 of cable 968 is further extended at contacts 933 and 944 to conductor 981 to battery at 1030. Relay 1030 energizes and a multiple holding circuit is closed thereto at contacts 1034 to ground at the winding of relay 900. Relay 900 is shunted and is not energized at this time. Relay 1030 extends the ten lines on trunk termination C271—C270 to the unit relays. The circuit for energizing relay 1300 is completed from grounded conductor 655, contacts 824, conductor 729, contacts 972, 901, 912, 911, 971, conductor 8 in cable 968, contacts 803, conductor TA8 in cables 969 and 1290, through the winding of relay 1300, contacts 1302, 1331, chain contacts 1313—1303, contacts 1326 to battery at resistance 1327. A multiple holding circuit for relay 1300 is closed at contacts 1301 before contacts 1302, 1303 open the common energizing circuit to all Group Access relays, such as 1310. Relay 1300 at contacts 1305—1308′ extends circuits from the unit connector relays to corresponding trunk selecting relays. With the last trunk idle, ground on contact 1371 is extended through contacts 1305′ to conductor U5-0 over which relay 1020 energizes. Relay 1020 at contacts 1021, 1022, 1023 extends the line conductors to conductors 1074, 1075, 1076 extending to repeater 1900, Fig. 19.

At contacts 1028 relay 1020 completes a circuit for energizing relay 600 from grounded conductor 698, contacts 1028, conductor 986, contacts 919, conductors 742, contacts 777, conductor 707 and through the winding of relay 600 to battery. Relay 600 at contacts 601 and 602 connects the calling conductors 508 and 509 directly to conductors 637 and 652 thereby closing a circuit over contacts 1001 and 1003, 1021 and 1022, 1051 and 1052, conductors 1074 and 1075 to repeater 1900 Fig. 19 for energizing the repeater line relays 2005 and 2000. At contacts 604 relay 600 closes a ground circuit over conductor 1076 extending to repeater 1900 as follows: from ground, contacts 642, 661, 604, conductor 659, contacts 1005, 1023, 1053 to conductor 1076. Grounded conductor 1076 causes the energization of relay 1945 in the repeater which removes ground from conductor 1999 to restore relay 1360. Relay 1360 at contacts 1361 completes the circuit for energizing reset relay 1380 from grounded contacts 1373. Relay 1380 at contacts 1382 opens the locking circuit of relay 1370 which restores and removes marking ground at contacts 1371. Assuming that the first trunk is idle then 1340 is energized, and when relay 1370 restores it opens the circuit to relay 1380 and closes the following circuit for relay 1350 from ground contacts 1372, 1342, winding of relay 1350, contacts 1382 and through resistance 1383 to battery. Relay 1350 energizes and preselects the first trunk by closing contacts 1351. The remainder of the operations of the trunk selecting relays including the kickoff circuit for preselecting the next idle trunk if the connector fails to switch through within a predetermined time, and the circuit arrangement for restoring relay 1390 to close contacts 1391 to operate the busy relay in the connector in case all the trunks are busy at a time a call is made, are the same as described for the 7 trunk group. Relay 600 also at contacts 603 opened the circuit of relays 820 and C8 which restore. At contacts 824 relay 820 opens the shunt around relay 900 with the result that relay 900 now energizes in series with relay 1030 over contact 1034 to hold relay 1030 operated. Contacts 824 also open the circuit of relay 1300 which restores. At contacts 1305′ relay 1300 removes the shunt from relay 920 with the result that relay 920 now energizes in series with relay 1020 over contacts 1029 to hold relay 1020 operated. Relay 1300 also, at contacts 1304 causes relay 1320 to restore. Relay 1320 at contacts 1321 reestablishes the circuit to relay 1330 before it can fully restore, and at contacts 1322 opens the circuit to relay 1325 which at contacts 1326 again reconnects battery through resistance 1327 to enable the Group Access relays to be used on another trunk call to the 8 trunk group.

When the line relays in repeater 1900 operate ground is returned over conductor 1076 to hold relay 660 energized and to maintain conductor 594 grounded before the slow to release relay 640 deenergizes. Line relay 610 restores when relay 600 operates, to cause the release of relays 630 and 640 as previously described. Since relay 660 is now held energized from the repeater the control of the connection has now been transferred to the repeater.

*Group 9 Trunks*

The lower portion of Fig. 11 shows the trunk selecting relays for the 9 group of trunks and is similar to the trunk selecting relays for the 7 trunk group shown in Fig. 14 except for the arrangement for permitting overflow calls from the 0 trunk group to extend into the 9 trunk group. Access to these trunk selecting relays is by way of the Group Access and Trunk Group relays of Fig. 12. As illustrated in the lower portion of Fig. 11, only the trunk selecting relays for three trunks are shown and these trunks are assumed to be idle and relays 1160, 1180 and 1194 are therefore energized from ground extended from their corresponding repeaters, such as repeater 2100 (Figs. 21–23). Relay 1169 is operated to preselect the first idle trunk in the 9 trunk group from ground, contacts 1174, 1188, 1168, winding of relay 1169, contacts 1124′, resistance 1126′ to battery. At contacts 1162 relay 1160 operates the overflow relay 1130 to prepare the circuit for preselecting the first trunk in the 9 trunk group as an overflow trunk when all the 0 trunks are busy. Since the first trunk in the 9 trunk group is the sixth trunk accessible through contacts of the tens relay 1040, relay 1169 at contacts 1165 and 1167 places ground on conductors 1226 and 1227 preparatory to operating the units switching relay 1000 and units relay 1010 when this trunk group is called.

It will now be assumed that the calling line desires to make a call to a trunk in the 9 trunk group. The extension of the calling line through the finder and the operation of the connector in response to dialling the single digit 9 is the same as that described for dialling digit 7 except that in this case relays C9 and 810 are energized after nine impulses. After series relay 970 closes contacts 971 to 973 relay C9 at contacts 806 and 807 closes circuits for energizing relays 1040 and 1200 from grounded conductor 655. The circuit for energizing relay 1040 may be traced from grounded conductor 655, contacts 814, conductor 729, contacts 972, 973, 903, 914, conductor 2 in cable 968, contacts 806, conductor 10 in cable 968, contacts 947, and through the winding of relay 1040 to battery. The circuit for energizing relay 1200 may be traced from grounded conductor 655, contacts 814, conductor 729, contacts 972, 901, 912, 911, 971, conductor 8 in cable 968, contacts 807, conductor TA in cables 969 and 1290, winding relay 1200, contacts 1203, 1223, 1241, through the chain contacts 1214 and 1204, contacts 1231, and resistance 1232 to battery.

Relay 1040 energizes over the above traced circuit and closes a holding circuit for itself by way of contacts 1042, conductor 984 and the winding of transfer relay 900 to grounded conductor 698. Relay 900 is shunted by the ground energizing relay 1040 and does not energize at this time. Relay 1040 extends its ten lines or terminals to the connector units relays. Relay 1200 also energizes over its above traced circuit and closes a holding circuit for itself at contacts 1202 before contacts 1203 and 1204 are opened to prevent any other group access relay, such as relay 1210, from operating at this time. At contacts 1205 relay 1200 operates relay 1220 which at contacts 1224 maintains the holding circuit for relay 1200 when relay 1230 operates and opens this circuit at contacts 1231.

At contacts 1206 to 1205′, inclusive, relay 1200 extends the conductors of cable 1290 to contacts 1261 to 1269, inclusive, of trunk group relay 1260. At contacts 1201 relay 1200 closes a circuit for operating relay 1260 as follows: ground, contacts 1201, conductor TG in cables 1290 and 969, contacts 808, conductor G9 in cables 969 and 1290 and through the winding of relay 1260 to battery. At contacts 1261 to 1269 relay 1260 extends the conductors of cable 1290 to the trunk selecting relays of the 9 trunk group shown in the lower portion of Fig. 11. Circuits may now be traced for energizing the units switching relay 1000 and units relay 1010. The circuit for relay 1000 extends from ground, contacts 1165, conductor 1226 in cable 1234, contacts 1262 and 1206, conductor US in cable 1290 and through the winding of relay 1000 to battery. The circuit for relay 1010 extends from ground, contacts 1167, conductor 1227 in cable 1234, contacts 1263 and 1207, conductor U1–6 in cable 1290 and through the winding of relay 1010 to battery.

Units switching relay 1000 at contacts 1002, 1004 and 1006, switches the connector line and test conductors to contacts 1014, 1015 and 1016, and at contacts 1007 closes a locking circuit for itself to grounded conductor 698. Unit relay 1010 at contacts 1014, 1015 and 1016 connects the connector line and test conductors through to the repeater conductors 1092, 1093 and 1094 by way of contacts 1061, 1062 and 1063 of relay 1040. At contacts 1018 relay 1010 closes a holding circuit for itself by way of conductor 985 and the winding of transfer relay 920 to grounded conductor 698. Relay 920 is shunted by the ground which energized relay 1010 and therefore does not energize at this time. At contacts 1017 relay 1010 completes a circuit for energizing the switch-through relay 600 as follows: from grounded conductor 698, contacts 1017, conductor 986, contacts 919, conductor 742, contacts 777, conductor 707 and through the winding of relay 600 to battery.

Relay 600 at contacts 601 and 602 switches the calling loop directly to repeater conductors 1092 and 1093 for energizing the repeater line relays 2145 and 2140. At contacts 604 relay 600 closes a ground circuit from contacts 642, 661, 604, conductor 659, contacts 1006, 1016 and 1063, to conductor 1094 for energizing relay 2110 which opens the circuit of relay 1160 to cause its release. Relay 1160 at contacts 1163 completes a circuit for energizing relay 1190 as follows: ground, contacts 1199, 1186, 1163, 1183, winding of relay 1190, contacts 1124′, and through the resistance 1126′ to battery. At contacts 1184 and 1185 relay 1190 grounds conductors 1226 and 1228 to preselect the next trunk, at contacts 1189 completes a locking circuit for itself from ground at contacts 1174, at contacts 1186 opens its original circuit, at contacts 1187 closes a multiple circuit for itself from ground at contacts 1199, at contacts 1188 opens the locking circuit of relay 1169 which restores, and at contacts 1191 extends the kickoff circuit to relay 1176. Relay 1169 restores and removes marking ground from conductors 1226 and 1227 at contacts 1165 and 1167 and at contacts 1171 extends the kickoff circuit to relay 1176.

Relay 600 also at contacts 603 opens the circuits to relays 810 and C9 which restore. At contacts 814 relay 810 opens the shunt around relay 900 with the result that relay 900 now energizes in series with relay 1040 over contact 1042 to hold relay 1040 operated. Contacts 814 also open the circuit of relay 1200 which restores. At contacts 1207 relay 1200 removes the shunt from relay 920 with the result that relay 920 now energizes in series with relay 1010 over contacts 1018 to hold relay 1010 operated. Relay 1200 at contacts 1205 opens the circuit of relay 1220 which restores. Relay 1220 at contacts 1224 disconnects battery at resistance 1232 from the chain contacts, and at contacts 1223 prepares a point in the circuit for operating a group access relay, such as 1210, which circuit is not completed at this time because contacts 1224 and 1231 are both open. At contacts 1221 relay 1220 reestablishes the circuit to relay 1240 before relay 1240 could fully restore, and at contacts 1222 releases relay 1230 which at contacts 1231 places battery through resistance 1232 on the chain contacts so a group access relay may now be energized. The delay in connecting battery to the chain contacts as just described is provided to prevent the energization of a group access relay, such as relay 1210, on a trunk call before the trunk selecting relays 1160, 1169 and 1190 have had time to perform their functions of releasing the marking ground for the first trunk and for marking the second trunk as the next preselected trunk as previously described. The relays involved have been carefully chosen so that their operating and releasing characteristics are such that double connections to the same trunk or single connections to two trunks are prevented.

When the line relays in repeater 2100 operate ground is returned over conductor 1094 to hold relay 660 energized and to maintain conductor 594 grounded after the slow to release relay 640 deenergizes. Line relay 610 restores when relay 600 operates to cause the release of relays 630 and 640 as previously described. Since relay 660 is now held from the repeater the control of the connection has been transferred to the repeater.

*Group 0 trunks*

The trunk selecting relays for the group "0" trunks are similar to the trunk selecting relays for the group "9" trunks and assign trunks in rotation the same as described for the 7 and 9 trunk groups. In Fig. 11 only the relays for two trunks are shown and it is assumed that the first trunk is idle and preselected with relays 1100 and 1106 operated while the second trunk is busy with relay 1110 deenergized. Relay 1106 is held operated from ground, contacts 1117, 1105, winding of relay 1106, contacts 1124, resistance 1126 to battery. Since the first trunk in the "0" trunk group is the first trunk accessible through contacts of the tens relay 1040, relay 1106 at contacts 1104 places ground on conductor 1236 to preselect the corresponding units relay, such as relay 1010.

It will now be assumed that the calling line desires to make a call to a trunk in the "0" trunk group. The extension of the calling line through the finder and the operation of the connector in response to the dialling the single digit 0 is the same as described for a trunk call to the 9 trunk group except in this case counting relay CO and relay 830 are operated after ten impulses. After relay 970 deenergizes relay CO at contacts 816 and 819 closes circuits for energizing relays 1040 and 1200 from grounded conductor 655. The circuit for energizing relay 1040 is from grounded conductor 655, contacts 834, conductor 629, contacts 972, 901, 912, conductor 3 in cable 968, contacts 816, conductor 11 in cable 968, winding of relay 1040 to battery. The circuit for energizing relay 1200 is from grounded conductor 655, contacts 834, conductor 729, contacts 972, 901, 912, 911, 971, conductor 8 in cable 968, contacts 819, conductor TA in cables 969 and 1290, winding of relay 1200, contacts 1203, 1223, 1241, 1214, 1204, 1231 to battery at resistance 1232.

Relay 1040 closes a holding circuit for itself over contacts 1042 in series with relay 900 which latter relay does not energize at this time since it is shunted as previously described. Relay 1040 extends the ten line terminals to the connector units relays. Relay 1200 closes a holding circuit for itself at contacts 1202, at contacts 1205 operates relay 1220, at contacts 1206 to 1205′, inclusive, extends conductors of cable 1290 to contacts 1252 to 1258′, inclusive, and at contacts 1201 completes a circuit for operating trunk group relay 1250. Relay 1220 operates 1230 at contacts 1222, opens the chain energizing circuit to the group access relays at 1223, and connects battery through contacts 1224 before relay 1230 opens this battery connection at contacts 1231.

The circuit for energizing relay 1250 may be traced from ground, contacts 1201, conductor TG in cables 1290 and 969, contacts 825, conductor GO in cables 969 and 1290, and through the winding of relay 1250 to battery. Relay 1250 at contacts 1251 to 1258' extends conductors 1233 to 1248 from the trunk selecting relays of the "O" trunk group in Fig. 11 to the group access relays. In response to this connection the preselected units relay is energized over the following circuit: ground, contacts 1104, conductor 1236, contacts 1253, and 1207, units conductor U1–6 and through the winding of units relay 1010 to battery. At contacts 1011, 1012 and 1013, relay 1010 connects the connector line and test conductors through to repeater 201' by way of contacts 1043, 1044, and 1045, and conductors 1084, 1085 and 1086. At contacts 1018 relay 1010 closes a holding circuit for itself in series with transfer relay 920 which does not energize at this time because it is shunted. At contacts 1017 relay 1010 completes the circuit for operating the switch-through relay 600 as previously described.

Relay 600 operates from contacts 1017 in the same manner as previously described, switches the calling line to the connected repeater and closes a circuit over conductor 1086 to operate a relay in the repeater which causes the release of trunk selecting relay 1100. Relay 600 at contacts 603 opens the circuit to relays 830 and CO which restore. At contacts 834 relay 830 opens the shunt around relay 900 which now energizes in series with relay 1040, and at the same contacts 834 also opens the circuit of relay 1200 which restores. At contacts 1207 relay 1200 removes the shunt around relay 920 which now energizes in series with relay 1010. Relay 1200 at contacts 1205 opens the circuit of relay 1220 which restores. At contacts 1224 relay 1220 disconnects battery from the group access relays to provide a slight delay before any group access relays can again operate, and at contacts 1222 opens the circuit of relay 1230 which restores and reconnects battery to the group access relays.

Relay 1100 restores when the connector switches through, as stated, and at contacts 1102 completes the circuit for relay 1119 if the second trunk is idle. However, in this case it is assumed that the second trunk is busy and instead of energizing relay 1119, reset relay 1125 is energized over the following circuit: ground, contacts 1115, 1102, 1112, and winding of relay 1125 to battery. At contacts 1124 relay 1125 removes battery from the trunk selecting relays in order to reset such relays in case any of the trunks in the "0" group are idle in a manner similar to that described for the "7" trunk group. Relay 1106 now restores and removes the marking at contacts 1104. Relay 1100 also at contacts 1101 completes a circuit for energizing relay 1136 in the overflow group so that a call to the "0" trunk group may overflow into the "9" trunk group when all "0" trunks are busy. This circuit may be traced as follows: ground, contacts 1101, 1111, 1145, 1132, winding of relay 1136, contacts 1153 and resistance 1154 to battery. If the first trunk in the "9" trunk group was busy at this time then relay 1130 would be deenergized and the above traced circuit would be extended to relay 1149 by way of contacts 1131 and 1142. With the first trunk in the "9" trunk group idle relay 1136 energizes and locks from ground, contacts 1101, 1111, 1147, 1135 to battery at resistance 1154. At contacts 1137 relay 1136 prepares the kick-off circuit to relay 1149 and at contacts 1133 and 1134 grounds conductors 1244 and 1236 for preselecting the first trunk in the 9 trunk group. In case a call to the "9" trunk group takes this first trunk then relay 1130 deenergizes and relay 1149 is operated to preselect the second trunk of the "9" group for overflow calls from the "0" group.

Assuming now that the second trunk in the "0" group becomes idle before another trunk call is made to the "0" group then relay 1110 energizes and at contacts 1111 opens the circuit to relay 1136 which restores and removes the markings at contacts 1133 and 1134. At contacts 1112 relay 1110 also opens the circuit of reset relay 1125 which restores and reconnects battery for energizing relay 1119 as follows: ground, contacts 1115, 1102 (first trunk busy) contacts 1113, winding of relay 1119, contacts 1124 and resistance to battery. Relay 1119 locks through contacts 1118 and at contacts 1114 grounds conductor 1237 to preselect the second trunk.

In case all the trunks in the "0" trunk group and the first two trunks in the "9" trunk group are busy then a circuit may be traced for energizing overflow reset relay 1155 as follows: ground, contacts 1101, 1111, 1145, 1131, 1141 and through the winding of relay 1155 to battery. At contacts 1153 relay 1155 removes battery from the overflow trunk selecting relays 1136 and 1149 and at contacts 1152 opens the circuit to slow to release relay 1127. Relay 1127 deenergizes after an interval and at contacts 1128 grounds conductor 1247 so as to operate the busy relay 770 in case a call to the "0" group is made at this time. As soon as any one of these trunks becomes idle the circuit to relay 1155 is opened with the result that relay 1127 is again energized to remove this busy condition. The kickoff circuits operate in the same manner as previously described for a call to the 7 trunk group in case relay 1240 fully restores.

In case a second connector, such as illustrated in Fig. 13, should make a trunk call to any one of the "0," "9," "7," or P. B. X trunk groups relay 1210 is operated in the same manner as described for relay 1200 and the connection is similarly completed; provided of course, that one of the other group access relays, such as 1200, is not at this time operated on a trunk call to one of these trunk groups. In case relay 1200 is operated on a trunk call from the first connector then relay 1210 cannot energize because the battery supply is open at contacts 1223. The calling subscriber is aware of this fact because dial tone is not transmitted thereto and the connector waits in its operated position until relays 1200, 1220 and 1230 release to supply battery for energizing relay 1210, after which the call proceeds in the manner obvious from the preceding description. However, the second connector may make a trunk call to the "8" trunk group through the Group Access relays of Fig. 13 at the same time that a trunk call is proceeding through the Group Access relays of Fig. 12.

*Restricted and special services*

It has been previously mentioned that direct service over trunks is provided for specified lines while other lines are restricted from interexchange trunk calls. Also incoming calls over specified trunks are denied access to certain lines or trunks but have access to other lines and trunks. Further a toll operator has special service facilities such as override of a busy connection for monitoring or access to a test number where additional dialing is required. These facilities will now be described. Reference will be made to the previous descriptions in order to avoid needless repetition.

Stations in the B group, specifically line L216 terminating on line circuit 216 is marked at relay 480 in conjunction with the energization of the tens relay 310, unit relay 340 and connect relay 550. The latter relays were described as energizing when a call is initiated to extend the calling line at relays 510 and 520. Relay 480 energizes at the same time from contacts 311 and at contacts 485 energizes relay 940 from ground, contacts 341, conductor 391, contacts 485, conductor 455, contacts 556, conductor 455' to battery at the lower winding of relay 940. Relay 940 locks to ground on conductor 698 at contacts 941. At contacts 947 one of the paths for energizing the tens relay 1040 is opened, therefore assuming the first dialed digit is "9," the circuit from contacts 806, conductor 10 of cable 968 is transferred at contacts 947, 946, from relay 1040 to relay 960. Relay 960 energizes and at contacts 961 closes a holding circuit for itself over conductor 984 and winding of relay 900 to ground on conductor 698. Relay 900 is shunted by a ground at coil 960 and does not energize at this time. Relay 960 at contacts 963 energizes the connector busy relay 770 from ground on conductor 698, conductor 659, contacts 924, conductor 658, contacts 605, conductor 657 to battery at coil 770. Relay 770 at 775 opens the impulsing circuit so that further dial pulses are not effective. At contacts 771 a busy tone is connected to the calling line and at contacts 774 the holding circuit to the pulse counting relays is open and relays C9 and 810 restore. At contacts 962 relay 690 is energized over contacts 907 and conductor 706, further opening the circuit to the counting relays at contacts 691. It is obvious that when the calling party disconnects relays 610, 630, 640 and 660 restore removing ground from conductors 655 and 698 at contacts 662 and 667. Relays 940 and 960 restore and all the equipment is returned to normal position.

Assume station B line L216 dials 8. Relay 940 is energized when the call is extended to the connector and relays C8 and 820 are energized after eight impulses. The circuit from contacts 802, conductor 9 of cable 968 is transferred at contacts 944 and 945 from relay 960 to conductor 981 over which relay 1030 energizes. The call is completed as previously described. From the above description it is obvious that calls to the 8 group of trunks are not extendable unless relay 940 is energized, therefore stations on lines that are not arranged to energize relay 940 are denied service over these trunks.

The restrictions applying to a line terminating on line circuit 205 are controlled by relay 930. When a call is initiated on this line relays 300, 330, 500, 530 are energized. At contacts 301, relay 420 is energized over conductor 396, at contacts 331 relay 930 energizes from ground contacts 331, conductor 392, contacts 426, conductor 457, contacts 558, conductor 457' to battery at the lower winding of relay 930. Assuming that the first two digits of the called number are 20 a circuit is extended over which relay 1040 is energized only if relay 930 is energized. This circuit is traceable after the second digit "0" from grounded conductor 655, contacts 834, conductor 729, contacts 972, 901, 913, conductor 5 of cable 968, contacts 817, conductor 00 of cable 826, contacts 868, conductor 965, contacts 934, conductor 11 to the winding of relay 1040 and battery. The call is then completed in a well-known manner for one line calling another station. It is obvious that relay 930 is energized only on calls from authorized lines, therefore any other line that calls "20" will energize the call block relay 960 and the call is blocked as described hereinbefore.

It is likewise obvious that line 205 cannot call trunk group 8 because the energizing circuit for relay 1030 from contacts 802 is not completed to conductor 981 at contacts 932 and 942 since relay 940 is not energized. Therefore a call from station 205 to the 8 group energizes relay 960 from conductor 9 of cable 968, contacts 932 and 943 and the call is blocked as described.

Subscriber stations terminated in the same tens group as the trunk group 8 are normally not restricted. The energizing circuit for relay 1030 when stations are called, such as lines 271 and 270, is controlled from contacts 897, conductor 70 in cable 826, contacts 864, conductor 964, contacts 953, conductor 981, through relay 1030 to battery.

A trunk terminating on line circuit 215 is restricted from calling lines C271 and C270 by the energization of relay 950. Line relay 215 energizes relays 310 and 330 together with relays 550—560 when a call is initiated. At contacts 311 relay 480 energizes, completing the circuit from contacts 331, conductor 392, contacts 484, conductor 458, contacts 559, conductor 458' to battery at relay 950. At contacts 953 and 952 conductor 964 is transferred from conductor 981 over which relay 1030 is energized to the call block relay 960. Therefore relay 960 energizes responsive to the calling party dialing 27. Relay 960 at contacts 963 energizes the connector busy relay as described hereinbefore.

Briefly stated, the restricted service arrangement controlled by relays 420, 480, 930, 940, 950 and 960 is as follows. No calls are denied to the "7" trunk group. Calls to the "8" trunk group are normally restricted unless relay 940 alone or relays 930 and 940 are both operated, therefore lines such as 201, 206, 211 and 216 can call the "8" trunk group while lines such as 200, 205 and 210 are denied trunk service to the "8" trunk group. Calls to the "9" trunk group are permitted to all lines except those that operate relay 940, therefore lines such as 200, 205, 210 and 215 can call the "9" trunk group while lines such as 201, 206, 211 and 216 are denied trunk service to the "9" trunk group. No calls are denied to the "0" trunk group. Calls to the P. B. X group C271 are denied only to line 215. Lines such as 201, 206 and 205 can call the 200 group while lines, such as 200, 211, 216, 210 and 215 are denied service thereto. It is understood that any of these restrictions can be made or easily changed at the distributing frame DF terminating conductors 455 to 458, inclusive, and the connections to the contacts of relays 420 and 480.

*Special services*

Provision is made to disable certain restriction features within the connector in addition to the restrictions controlled from relays 930—950. Accordingly we will now describe how a trunk call terminating in line 200 energizes relay 644 and thus causes the disabling of the conversation timing facilities within the connector and trunk circuits.

The call is established in the usual way and includes the energization of relays 300, 350, 550—560 for energizing the finder relays 500, 530, 540.

Relay 420 is energized from contacts 301 over conductor 396 which completes a circuit over which relay 644 energizes from ground contacts 351, conductor 390, contacts 422', conductor 459, contacts 563, conductor 586 to battery at the upper winding of coil 644. A holding circuit is closed to relay 644 at contacts 646 to ground on conductor 698 at contacts 667. Relay 644 at contacts 648 and 647 opens a portion of the timer circuit. At contacts 649 ground is connected to conductor 727 over which the repeater timer circuits are controlled.

Assume the call is directed to a local station in the usual manner. The called party on answering causes the back bridge relay 700 to energize relay 676. Relay 676 at contacts 678 disables the energizing circuit to timer relay 670 and at contacts 679 opens the last portion of the holding circuit to relay 670. Relay 670 restores if operated, and the timer is no longer effective.

Assume the call is directed to the "7" trunk group in the usual manner in which case relays 1200 and 1270 energize responsive to the first digit 7. The previously mentioned ground on conductor 727 at contacts 649 is extended through contacts 1203', 1278, conductor 1488, contacts 1458 to the selected repeater over conductor 1444.

A circuit is then completed to relay 1635 which disables the timer as will be described under a subsequent heading.

*Toll operators special services*

Other groups of trunks have additional special service facilities in addition to the restricted service and timer disconnect. We will now describe how calls originating on the line circuit 206 receive a special 60 IPM supervisory signal in addition to the conventional busy signal, and may override a busy line condition to monitor the connection, in addition to the disconnect of the timer described hereinbefore.

The calling line is extended by the repeater through the finder to the connector in the usual manner in which relays 300, 340 energize relays 500, 520, 540, 550 and 560. Relay 300 at contacts 301 energizes relay 420 over conductor 396. Relay 420 at contacts 427 in conjunction with relay 340 at contacts 341 energizes relays 930 and 940. Relay 930 establishes certain restricted services as described in the Restricted Service heading. At contacts 936 relay 625 energizes from ground on conductor 698, conductor 699 to the lower winding of relay 625.

A holding circuit for relay 625 is closed at contacts 628 to ground on conductor 698. At contacts 627' relay 644 energizes to disable the conversation timer in the connector and repeater in a manner similar to that previously described.

The call is completed within the connector in the usual manner. A one digit trunk call is directed to a trunk in the dialed trunk group through the Group Access and trunk selecting equipment in Figs. 12, 11, 13 and 14 in which relays such as 1200 or 1300 are temporarily energized, to associate a repeater preselected by the trunk selecting relays with the call. At contacts 629' ground is connected to conductor 726 which is extended through the Group Access relays, Fig. 12 or Fig. 13, for a special service trunk marking pulse applicable only from such calling lines. The above marking pulse is effective within the seized repeater to give toll calls additional facilities on trunk circuits. Specifically, on a call to trunk group 8, for example, conductor 726 is extended through contacts such as 1308' and 1378 and conductor 1379 to relay 1920 to permit the toll operator to dial a suffix digit over the group 8 trunks while other lines are prevented from dialing this extra digit as will be described under repeater Figs. 19 and 20.

Now assume a local number is dialed instead of a trunk and that the local line is occupied with another local call. We will describe how a call from a line from which toll relays 625 and 644 are energized as described above can override the busy condition. Specifically line C270 will be called in the usual way whereby relay 1030 is energized after the second digit and relays 1020 and 1000 after the third digit, completing a circuit from conductors 1081 and 1082 to the calling line. At the same time a busy test circuit is prepared from relay 770 to conductor 1083 a sdescribed under Local Calls. A busy condition on the called line is indicated by a ground on conductor 1083, therefore relay 770 is energized. A busy tone is returned to the calling line at contacts 771 in the usual manner. At contacts 772 in conjunction with energized relay 625 at contacts 626, a circuit is completed to the lower winding of relay 620 over conductor 654 and contacts 791 to a 60 IPM interrupted ground source. Relay 620 follows the ground pulses, and current to the calling line is reversed at contacts 621—624 at the stated intervals. Trunk circuits responsive to reverse battery are well known and will not be described herein. It is only necessary to understand that the trunk circuit in response to reversing line currents will cause the supervisory lamp at the calling operator's position to flash accordingly. Then the operator receives a visual signal in addition to the usual audible busy signal.

The operator may now camp on the busy line, may disconnect and release the connection in the usual manner or may dial an extra digit and over-ride the busy condition. The latter will now be described based on the previously established conditions wherein relays 1030, 1020, 1000, 770, 625 and 644 together with relays 610, 630 and 640 are energized. It was previously established that relay 710 energizes after the ringing digit is dialed and the impulsing circuit comprising contacts 634, 606, 666, conductor 693 leading to the counting relays is transferred at contacts 715 and 627 to relay 790 over conductor 695, contacts 783 and 793' to battery at 790. In response to the stated extra dialed impulse over the above traced circuit relay 790 energizes and prepares an operating circuit for relay 793 at contacts 792. Relay 793 is shunted by ground at 790 and is not operated until the operating pulse to relay 790 is open. Relay 793 energizes in series with relay 790 from ground on conductor 698 to battery at relay 790. Relay 790 holds over the latter circuit. Relay 790 at contacts 791 opens the connection to the 60 IPM source to stop the intermittent operations of relay 620. Relay 793 at contacts 798 opens the locking circuit of busy relay 770 but the busy relay is slow to release and when contacts 799 close, the busy relay is held energized over a circuit extending from battery through the winding of busy relay 770, contacts 773, 799, conductor 659, contacts 1006, 1027, 1059 to ground on conductor 1083 until the called line becomes idle. At contacts 795 and 797 relay 793 connects the talking conductors 638 and 639 to talking conductors 637 and 652 to permit the calling operator to monitor the local connection established to line C270. The operator may advise the called party that there is a call waiting or may camp on busy until the local connection is released.

When the local connection is released ground is removed from conductor 1083 with the result that busy relay 770 restores to complete a circuit for energizing the switching relay 780 over the following circuit: from ground, contacts 607, 668, upper winding of relay 780, contacts 776, conductor 738, contacts 925, conductor 659, contacts 1006, 1027 and 1059, conductor 1083 extending to the called subscriber's line circuit and through the windings of the cutoff and lockout relays, similar to relays 250 and 260, to battery. Relay 780 at contacts 786 locks through its lower winding, at contacts 787 opens the circuit to the override relays 793 and 790 which restore and at contacts 788 closes the circuit to operate the pick-up relay 730 which completes the circuit at contacts 731 for operating the odd ringing relay 750 from the common ringing interrupter. Relay 750 at contacts 755 and 753 completes the circuit for ringing the called line. In case the operator has remained on the connection she will hear ring-back tone over the following circuit: from generator Dir. Gen., winding of ring cut-off relay 740, condenser D4, contacts 751, 796 to conductor 639 and to the operator's position.

When the called party answers the ring cut-off relay 740 and back bridge relay 700 energize over the called loop and the connection is completed as previously described; in this case, however, the operation of reversing relay 620 from contacts 701 causes the operation of the well known supervisory signal at the operator's position to inform the operator that the called party has answered.

*Repeater 1600*

We will now describe the repeaters in the group 7 trunks over which the calls are extended to a connecting automatic exchange where the toll board is located. For descriptive purposes calls originated on the 9 and 0 group of trunks (operator trunks) can be extended to subscribers at the terminating exchange and subscribers herein need only dial one digit to reach the toll board over the interexchange trunk group 7. It is understood that the repeater at the connecting exchange may be any conventional automatic to automatic repeater arranged for reverse current supervision but for convenience of this description we will refer briefly to the repeater 1600 illustrated in Figs. 16, 17 and 18.

*Outgoing call*

The extension of a calling line through the finder and connector to the repeater in response to digit 7 was explained under a separate connector heading. It is only necessary to recall that the line conductors 1087, 1089 are closed at the calling station through the dialing springs. Also conductor 1091 is connected to conductor 594 and a ground thereon will hold the connection. Further a ground is extended to conductor 1444 during the seizure period only if the call is from predetermined trunks.

We will first describe the seizure from a subscriber wherein conductor 1444 is not grounded, thereby relay 1635 is not energized. Ground on conductor 1091 energizes relay 1630 over contacts 1859 and conductor 1795. Relay 1630 at contacts 1632 disconnects ground from conductor 1443 which restores relay 1440 making the trunk busy at the trunk select relays in Fig. 14 to prevent any other calling link from seizing the occupied trunk. At the same time relays 1765 and 1760 energize in series with the calling station line over conductors 1087 and 1089. Relay 1765 at contacts 1766 prepares a portion of the control path to the line reversing relay 1600. Relay 1760 at contacts 1763 energizes relay 1750 from ground at 1743. Relay 1750, at contacts 1752 energizes relay 1155, at contacts 1751 opens the incomplete circuit to relay 1730, and at contacts 1753 closes a multiple holding ground to contacts 1763. Relay 1755 at contacts 1757 prepares a portion of a path over which relay 1750 is reenergized during the pulsing period. At contacts 1758, relays 1740 and 1850 are energized. Relay 1850 at contacts 1859, 1858 transfers conductor 1091 from relay 1630, to ground at contacts 1612 in series with the low resistance winding of impedance 1700. The above traced circuit is the source of holding ground to the connector relay 660 as mentioned under connector calling digit 7. Relay 1630 restores but the guarding circuit is maintained at the open contacts 1749. Relay 1850 at contacts 1856 closes a multiple holding circuit to relay 1755. At contacts 1855 a polarizing winding of relay 1825 is energized but this winding does not have sufficient power to operate the contacts unless the current through both windings of relay 1825 are aiding each other. At contacts 1851—1854' the trunk conductors leading to the repeater at the distant exchange are transferred from relay 1860 to relay 1825 and include the impulse repeating contacts 1756, 1726, 1731. The distant end of the above trunk terminates on a line relay corresponding to relay 1860 which is energized over the above circuit. The circuit is traceable from ground through the line relay at the distant repeater conductor 1899, contacts 1866, winding of repeating coil 1845, contacts 1852, winding relay 1825, current limiting resistance 1825', contacts 1854, lower winding of repeating coil 1845', conductor 1895, contacts 1731, 1726, 1756, conductor 1894, contacts 1854', 1868, conductor 1898 to battery at the distant repeater through the other winding of the distant line relay.

The repeater is now ready to receive dial pulses from the calling station. Relay 1760 restores during each open period of the pulse to open the circuit at contacts 1763 to relay 1750. Relay 1765 also follows the pulses, but without effect. Relay 1750 restores and at contacts 1752 momentarily removes one of the grounds holding relay 1755 operated, but this relay is slow to release and maintains its armature attracted during pulsing. At contacts 1751 relay 1750 closes circuits for energizing relays 1730 and 1830. The circuit for energizing slow to release relay 1830 extends from ground, contacts 1751, 1723, 1712 and 1759, conductor 1884 through the winding of relay 1830 to battery. The circuit for energizing relay 1730 extends from ground, contacts 1751, 1746, 1738 and 1728 to relay 1730 and battery. Relay 1730 at contacts 1734 closes a locking circuit for itself, at contacts 1732 energizes relay 1725, and at contacts 1733 energizes relay 1735 from ground at contacts 1751 and contacts 1746. Relay 1735 locks through contact 1737 and resistance 1739 independent of contacts 1733, and at contacts 1738 opens the original energizing circuit of relay 1730 which is held over its locking circuit until relay 1725 energizes.

Relay 1730 at contacts 1731 opens the trunk loop to the distant repeater causing the connected line relay thereat to restore and thus repeat an impulse. Relay 1725 energizes and at contacts 1726 further opens the trunk loop to the distant repeater. Relay 1725 at contacts 1728 opens the circuit to relay 1730 which restores and at 1727 closes a circuit to maintain relay 1755 operated. The operating and release characteristics of relay 1725 are modified through variable resistance 1729 to produce a predetermined open interval at contacts 1726 and 1731 regardless of the variation of the received pulse at contacts 1751. It is only necessary that relay 1760 be restored for a sufficient interval to permit relay 1750 to restore when held by a weak current through resistance 1755'. It is obvious that relay 1750 cannot reenergize until relay 1760 reenergizes. Further, reenergization of relay 1735 is dependent on relay 1730 energizing and closing contacts 1733. Likewise, if relay 1760 is slow in energizing the repeated pulse is not affected because further operation of relays 1730, 1725 is blocked by relay 1735 until contacts 1751 are momentarily opened by relay 1760 reenergizing relay 1750 after relay 1735 is energized. Relay 1830 being slow to release will hold between successive impulses and at contacts 1831 shunts the upper winding of relay 1825 and resistance 1825' to improve impulsing to the distant repeater.

At contacts 1834 an energizing circuit for relay 1650 is completed from ground at contacts 1857, conductor 1883, contacts 1636, 1643 and 1666. At contacts 1653 relay 1650 locks in series with relay 1660 to ground on conductor 1885 at contacts 1758. The energizing circuit to relay 1660 is not effective during the series of impulses as ground is maintained at coil 1650. After the series of impulses relays 1760 and 1750 reenergize, relay 1830 restores and removes the shunt on relay 1660 which energizes and transfers conductor 1883 from relay 1650 to relay 1640 to contacts 1665—1666. Relay 1650 at contacts 1651 disconnects conductor 1799' from relay 1600 to disable the reverse battery supervisory feature unless the contacts 1638 are closed as will be explained hereinafter under Call By a Toll Operator.

Another reason for blocking reversal of current to the calling line, if only a single digit is dialled in the repeater, is to eliminate the necessity of collecting a coin at a calling post-pay paystation when such paystation calls the operator over repeater 1600.

Relay 1660 at contacts 1661—1664 prepares a circuit over which a well known class of service tone can be applied to the called line which will be briefly described.

Having energized relays 1650 and 1660 after the first digit, such calls can terminate on a manual switchboard such as a toll board. When such calls are answered at the manual board the current is reversed over the called trunk in a well known manner. The reversed current through the upper winding of relay 1825 now aids the lower winding instead of being in opposition and relay 1825 closes contacts 1826. Relay 1820 energizes and at contacts 1822 extends a ground to conductor 1889, energizing relay 1720, through contacts 1715, 1662 and conductor 1796. Relay 1720 at contacts 1721, 1722 bridges the upper winding of coil 1700 in series with condenser 1701 across the line conductors 1897 and 1896. Coil 1700 acts as a transformer and a class of service tone (A. C. of approximately 200–400 cycles) applied to conductor 594 at the calling line circuit is extended to conductor 1891 to ground at contacts 1612 through the lower winding of coil 1700. This tone is inductively transferred to the operator as outlined above. Contacts 1724 are controlled by a weighted spring that maintains a vibratory action to prevent contacts 1724 from effectively energizing relay 1710 until after a slight delay usually about one second. Relay 1710 energizes after this delay and locks to conductor 1889 at contacts 1714 and 1664. Relay 1710 at contacts 1712—1713 disconnects the circuit leading to relay 1830 and prepares a circuit to relay 1705. Relay 1710 at contacts 1715 opens the energizing circuit to relay 1720. Relay 1720 restores and disconnects coil 1700 from the line.

The energizing circuit for relay 1705 is not completed until the calling party disconnects reclosing contacts 1751 by deenergizing relays 1760 and 1750. In case the operator does not disconnect, reverse current is maintained over the interexchange trunk including battery over conductor 1899 extending to conductor 1893. Under the above condition relay 1705 energizes and at contacts 1706 holds relays 1740 and 1850 energized together with all connected equipment. The release of the connection is under control of the operator.

Having described a call directed over a trunk to a toll operator that is accessible from the connecting exchange by dialing a one digit number, we will now describe the action which takes place when a subscriber in the distant exchange is called. The operation is the same as described hereinbefore for the first digit, including the energization of relays 1650, 1660. Subscribers' numbers require a plurality of digits. Therefore, at the start of the second digit relays 1760 and 1750 deenergize, relay 1830 again energizes from ground at contacts 1751, completing a circuit for energizing relay 1640 from ground at contacts 1857 over contacts 1834, conductor 1883, contacts 1636, 1643 and 1665. Relay 1640 locks to ground on conductor 1885. Contacts 1642 open, restoring relays 1660 and 1650. The operate circuit to relay 1650 is opened at contacts 1643 and the circuit to reversing relay 1600 is made ready at contacts 1651. When the called station answers current is reversed over the interexchange trunk in a well known manner. The current through the upper winding of relay 1825 is now in the same direction as the current in the lower winding and both windings aid each other to energize relay 1825. Relay 1820 now energizes and operates relay 1600 from ground, contacts 1822, 1819, 1766, conductor 1799'. Relay 1600 at contacts 1601—1604 reverses the current to the calling station.

The repeater is released in a well known manner. Briefly, the calling party disconnects, relays 1760, 1750, 1755, 1740, 1850 restore and ground is disconnected from conductor 1891 at contacts 1858 which removes ground from conductor 594 and relay 660. The finder and connector link relays restore to their normal position.

*Call by a toll operator*

It is understood from the previous description that relay 1635 is energized when a call is initiated over a group of toll trunks such as the trunk from exchange 200. This is due to a momentary ground extended over conductor 1444 which is effective only during the seizure period. Relay 1635 locks to ground on conductor 1891. The operation of the repeater is the same as described hereinbefore except that the circuit to relay 1600 is not opened as the circuit to relay 1650 is open at contacts 1636. Further a multiple path for energizing relay 1600 is closed at contacts 1638. Thus relay 1600 energizes whenever the called station answers and a distant relay corresponding to relay 1825 energizes from the stated reversal of current over the interexchange trunk to the calling exchange.

Relay 1635 at contact 1637 opens the circuit to relay 1620, disabling the conversation timing as will be explained hereinafter.

*Timing a trunk call*

The timing arrangement of the repeater comprising relays 1620, 1610 and 1630 operates in a similar manner to the described operation for corresponding connector timing relays 670, 680 and 730 respectively. Briefly, circuits are prepared to the time control conductors 616, 618, 609, 619 and 617 by the timer pulse generator 760' in the following order: a ground pulse on conductor 616, two minutes later a ground pulse on conductor 618, one minute later a ground pulse on conductor 609. Conductors 619 and 617 are normally closed. Conductor 619 is momentarily opened prior to ground being connected to conductor 618. Conductor 617 is momentarily opened prior to the open on conductor 619. The type of timer used is well known and is not described herein. The specified impulse and open period is approximately one second.

Conductors 616, 618 are effective for timing an unanswered trunk call in the following manner.

The seizure of the repeater on an outgoing call including the energization of relay 1740 was described hereinbefore and will not be repeated. At contacts 1745 conductor 616 is extended to conductors 1886, 1887 leading to relay 1620. At the proper time interval a ground pulse is connected to conductor 616 energizing relay 1620. At contacts 1623 relay 1620 locks to ground on conductor 1796 to contacts 1821. At contacts 1624 conductor 618 is extended to the lower winding of relay 1610.

Approximately two minutes after relay 1620 operates relay 1610 is energized over timer conductor 618 provided the call has not been answered. Relay 1610 locks to grounded conductor 1885 through contacts 1617. At contacts 1612 relay 1610 disconnects ground from conductors 1798, 1882 and 1091 over which the local finder-connector link is held with the result that the link is automatically released. If the call is answered within two minutes after seizure, current is reversed over the trunk, energizing relays 1825 and 1820. Contacts 1821 open, restoring relay 1620. At contacts 1823 one of the multiple paths from conductor 616 is open. However, the branch path from conductor 616 to relay 1620 through contacts 1637 and 1652 is an effective path for reenergizing relay 1620 when conductor 616 is again grounded. It is obvious that the last mentioned energizing circuit to relay 1620 is disabled if either the terminating call is a one digit member wherein relay 1650 remains in the energized position or if the call is originated by a toll operator wherein relay 1635 is energized. Thus the means for timing the duration of a connection is disabled on one digit terminating members at the connecting exchange or if the call is originated by a toll operator.

After the call is answered relays 1825, 1820 and 1710 are energized and the latter relay at contacts 1711 grounds conductor 1091 by way of contacts 1621, 1613 and conductors 1798 and 1882 to hold the finder connector link after relay 1610 is energized. Relay 1610 is energized as previously described and at contacts 1612 and 1613 relay 1610 substitutes ground at contact 1711 for ground at contacts 1612. At contacts 1615 the locking circuit for relay 1620 is transferred to grounded timer conductor 619. Approximately two minutes after relay 1610 is operated ground is removed from timer conductor 619 to restore relay 1620. Relay 1620 at contacts 1622 transfers the holding ground from contacts 1711 to timer conductor 617. Approximately two minutes after relay 1620 releases ground is removed from conductor 617 thereby removing the holding ground to cause the release of the finder-connector link and the repeater. Prior to the release of the link, timer conductor 609 is grounded to operate relay 1630. Relay 1630 at contacts 1631 closes a tone circuit to the talking conductors to audibly advise the calling party that automatic disconnection is about to take place.

*Incoming call*

An incoming call is extended from the distant repeater to a subscriber's line or another trunk in a conventional manner. Briefly, on seizure, a bridge is connected across the trunk conductors which includes a polarized relay responsive to reversal of current, and pulse repeating contacts.

Relay 1860 is energized over the above circuit and energizes relay 1840 at contacts 1862. Relay 1840 at contacts 1843 opens the ground circuit to conductor 1443 to busy this trunk at the trunk selecting relays. Relay 1810 energizes from ground at contacts 1841 and at contacts 1811—1816 a bridge is connected across conductors 207 and 208 leading to line relay circuit 205. The bridge mentioned above includes the upper winding of relay 1825, resistances 1813', 1825' and pulse repeating contacts 1861. The circuit is traceable from conductor 207, contacts 1811, repeating coil 18 5, contacts 1813, resistance 1813', winding of coil 1825, resistance 1825', contacts 1816, lower winding of repeating coil 1845, contacts 1814, contacts 1861, conductor 208. It is understood that line circuit 205 is the same as line circuit 215 with conductors 207, 208 and 277' corresponding to conductors 217, 218 and 295', respectively. The closure of this bridge circuit energizes the line circuit line relay which causes a link to be seized over finder contacts 504, 505 and 506. A multiple holding circuit is completed to relay 1810 from ground at contacts of the line circuit line relay to conductor 277'.

Relay 1860 is responsive to dial pulses and at contacts 1861 repeats the incoming pulses to operate the connector in the usual manner. Relay 1830 energizes on the first impulse shunting the upper winding of relay 1825 at contacts 1831 to improve impulsing. Relays 1830 and 1840 remain energized between successive pulses.

When the link circuit was first seized the link was marked to provide restricted service in accordance with the operation of relay 930 and toll call facilities at relays 625 and 644 as described under line 205 restriction. Briefly stated relay 930 is energized from ground at contacts 331 over contacts 426, conductor 457, contacts 558, conductor 457', and lower winding of relay 930 to battery. Relay 930 energizes relay 625 at contacts 936. Relay 625 at contacts 627' energizes relay 644. Relay 930 provides access to the alarm circuit at contacts 934 and prevents access to the group 8 trunks at contacts 932. The purpose of energizing relays 625 and 644 to provide override of busy, special flash busy and special trunk services was described under toll services and will not be repeated.

*Repeater group 8 trunks*

We will now describe the type of automatic to automatic repeater shown in Figs. 19 and 20, which is restricted to repeating a predetermined number of digits (4) unless the call is originated from a specified group of trunks such as the toll centers. In the latter case markings are extended to the repeater that identify calls from such specified trunks and disable the digit restricting feature to permit repeating an unlimited number of digits.

*Outgoing calls*

The seizure of the repeater by the calling party dialing the digit 8 was described in a preceding heading of "Group 8 Trunks."

In a like manner relays 2000, 2005 energize in series with the calling line that is extended through the finder and connector. The latter are held by the repeater which extends a holding ground circuit at contacts 2046' to conductor 1076. The holding circuit is traceable as follows. Relay 2000, at contacts 2003, energizes relay 1985' from ground at contacts 1972. At contacts 1988' a multiple ground through resistance 1989' is connected thereto to hold relay 1985' after relay 1970 energizes. Ground at contacts 1987' energizes relay 1980. Ground at contacts 1981 energizes relays 1970 and 2040 over conductor 2091. Relay 2040 at contacts 2046' extends ground from contacts 1952, conductor 1991 to conductor 1076 to hold the preceding switches in the operated position. Relay 2040 at contacts 2041—2046 transfers the trunk conductors 2099, 2098 from ground and battery at coil 2055 to a bridge holding circuit comprising contacts 2042, the upper winding of coil 2025, resistance 2028, contacts 2044, lower coil 2070, conductor 1993, contacts 1985, 1969', 1968, conductor 1992, and contacts 2046 and 2063. The currents through the upper and lower winding of the coil 2025 oppose each other and relay 2025 is adjusted not to operate contacts 2026 unless the currents through both windings of coil 2025 are in the same direction. The trunk conductors terminate on a repeater in the automatic sub-office wherein battery and ground through a relay similar to 2055 is connected to the line. This relay is responsive to repeated dial pulses to control the extension of a call to the called station. When the call is answered current on the trunk conductor is reversed.

Having energized relays 2000, 2005, 1985', 1980, 1970, 2040 on seizure the repeater is now responsive to the next series of dial pulses. Relay 2000, in response to dial pulses, opens and closes contacts 2001—2003. At contacts 2001 a circuit is prepared for reenergizing relay 2000 through current limiting resistance 2004. The latter does not pass sufficient current to reenergize relay 2000 until the line loop is reclosed by the dial springs. At contacts 2002 a branch path is closed for holding slow relay 1980 energized. Relay 1985' restores from open contacts 2003 and at contacts 1986' energizes relay 1965' through contacts 1983, 1986, 1982 and 1966. Relay 1965' at contacts 1966' closes a self holding circuit. At contacts 1969' the bridge across the trunk conductors is opened thereby causing the energized trunk line relay to restore to repeat a corresponding open period to the terminating apparatus. At contacts 1967' relay 1985 energizes and closes a self holding circuit at contacts 1987. At contacts 1986 the first named energizing path to relay 1965' is opened. Relay 1985 at contacts 1988 in conjunction with closed contacts 1973 prepares a ground circuit over which relay 1985' reenergizes after contacts 2003 reclose. Relay 1985' at contacts 1988' energizes relay 1965. At contacts 1968 the trunk loop is further opened. At contacts 1966 relay 1965' restores and opens contacts 1968' restoring relay 1965. Relays 1965, 1965' reclose the trunk loop through completing a pulse. In a like manner successive pulses are repeated. It is obvious from the foregoing description that the duration of repeated pulses is independent of the received impulses at relay 2000. It is only necessary that relay 2000 open and close for a sufficient period to energize or restore relay 1985' together with relay 1985. The duration of the repeated pulse is controlled by the predetermined energizing and release characteristics of relays 1965 and 1965'. The former relay is variable by adjusting the shunting resistance 1959.

A feature of the repeater is to limit the number of digits that can be repeated on restricted calls. When relay 1985' restored a branch path from contacts 1986', 1983 is extended over conductor 2093, energizing relay 2030. At contacts 2033 ground at contacts 1971 conductor 2090 is extended to relay 1925 over conductor 1996, contacts 1921, 1926, 1931, 1931', 1941. Relays 1925—1940 are two step relays in which the upper windings have only sufficient power to close one set of make contacts. Specifically relay 1925 closes only contacts 1928, extending the lower winding to ground at contacts 2047 through contacts 1934, 1937, 1943, conductor 1995. The lower winding is shunted at coil 1925 during pulsing as relay 2030 holds between successive pulses. Relay 2030 restores during the interdigital pause, removes ground from conductor 1996 and relay 1925, with both windings effective, extends conductor 1996 to relay 1930 at contacts 1927. In a like manner relay 2030 reenergizes on the next series of impulses, and relay 1930 closes contacts 1933. Relay 1930 completely energizes after relay 2030 is restored again. Relay 1925 restores when contacts 1934 open to extend conductor 1996 to relay 1935 through contacts 1921, 1926 and 1932. In a like manner relays 1935 and 1940 are each energized on successive digits. At contacts 1944, contacts 1968, 1969' are shunted and further impulses cannot be repeated at contacts 1968, 1969'.

The above described feature to limit the number of repeated digits is not effective in cases where the call is initiated over a toll group of trunks whereby a ground is extended over conductor 1379 during the seizure period. The means of projecting the stated ground to conductor 1379 is similar to that described under calls initiated on the 0 or 9 group of trunks as mentioned under calling the "8" group of trunks. Relay 1920 energizes over conductor 1379 and completes a self holding circuit at contacts 1922 from ground on conductor 1076 to battery at the lower winding of coil 1920. At contacts 1921 the circuit to relays 1925—1940 is disconnected.

When the extended call is answered, the current is reversed to the trunk conductors 2099, 2098. The current through both windings of relay 2025 is in the same direction, closing contacts 2026 to energize relay 2020. Ground at contacts 2021 energizes relay 1905 over conductor 2097 and contacts 2006. Relay 1905 at contacts 1908 closes a multiple circuit to contacts 2006 thereby preventing the calling party from restoring relay 2025. At contacts 1906—1907′ the circuit to the calling line is reversed for supervisory purposes. The purpose of routing the energizing path for relay 1905 through contacts 2006 is to prevent the reversal of current to a ground line wherein relay 2000 is energized over one conductor to ground and relay 2005 is not energized. The grounded line operation is well known and is not described herein. It is obvious that any non-standard condition such as a ground on conductor 1074 would prevent relay 2005 from energizing thereby effectively blocking the reversal of current and a false release of the connected apparatus.

Relay 1915 is energized in multiple with relay 1905 the purpose of which will be explained hereinafter.

*Timing a trunk call*

The timer pulses are extended from the common timer 760′ over conductors 609, 617, 618, 619 and 616. Each conductor has a circuit condition established thereon in a varying time period of a two minute cycle as explained under connector timing. For explanatory purposes it will be more easily understood if the complete timer period is considered as four cycles of two minutes each. It is understood that conductors 616, 618 and 609 are normally open and conductors 617 and 619 are normally grounded.

We have previously described the energization of relay 1970 when the repeater was seized. At contacts 1975 conductor 616 is extended to relay 1960 through contacts 1912 and 1957. On the first cycle of a time period, conductor 616 is momentarily grounded, thereby energizing relay 1960 which locks to ground at contacts 2047 through contacts 1964, 1955, 1974, conductor 2088, contacts 2032, 2022, to 2047. This circuit is releasable at contacts 2032 for each series of received impulses or at contacts 2022 when the call is answered. Relay 1960 at contacts 1963 extends conductor 618 to relay 1950. On the next cycle conductor 618 is momentarily grounded energizing relay 1950 provided the above described holding circuit to relay 1960 is not opened due to dialing or an answer before the relay 1950 is energized. Relay 1950 at contacts 1952 and 1953 disconnects ground from conductor 1991. It will be recalled that ground on conductor 1991 was extended over conductor 1076 to hold the finder and connector therefore it is obvious that the finder and connector restore and the calling line is locked out at the line circuit in a well known manner.

We will now describe how the duration of a conversation is timed and released after a period of approximately eight minutes. In this case it is understood the call is answered before relay 1950 is energized. Further, when the call answer relay 2025 energizes, relay 2020 energizes to cause the energization of relay 1915 at contacts 2021. Relay 1915 at contacts 1918 closes a self holding circuit to ground at contacts 1971 before contacts 1917 open. At contacts 1916 ground is extended to contacts 1962′. During the next two minute interval relay 1960 is reenergized through contacts 1975, 1912 and 1957. During the following two minute interval relay 1950 is energized from ground on conductor 618. At contacts 1953 conductor 1991 is transferred to ground at contacts 1916 and at contacts 1956 relay 1960 is transferred to a timer controlled ground on conductor 619. During the next two minute interval conductor 619 is momentarily opened restoring relay 1960. At contacts 1962 conductor 1991 is transferred to ground on conductor 617. At contacts 1951, 1961 conductor 609 is extended to relay 1945. Within the following minute the timer extends a ground pulse to conductor 609 energizing relay 1945. At contacts 1947 an audible tone on conductor 779 is extended from contacts 1959, condenser 1948, conductor 1994 to the calling line connected to conductor 1075. The tone described above is a warning tone that the call will be disconnected within one minute. During the following minute the timer disconnects ground from conductor 617 which is the holding ground to the connector and finder. Thus the connected switches restore and the line is locked out at the line circuit in a well known manner. During the open period on conductor 617 conductor 609 is again closed to ground and relay 1945 reenergizes. Tone is again closed to the calling line during the release period and the trunk is guarded at open contacts 1946.

*Incoming call*

The method of establishing an incoming call is similar to calls on the other described repeaters. Accordingly incoming calls will be briefly described. The call is extended from the calling station at the distant exchange to a terminating repeater. The latter on seizure extends an impulse repeating bridge across conductors 2099, 2098 energizing relay 2055. Ground at contacts 2057 energizes relay 2035 which energizes 2010 at contacts 2037. Relay 2010 extends a pulse repeating bridge across conductors 217 and 218 leading to the line circuit 215. The latter is the same as line circuit 216 and accordingly the line relay energizes and causes a finder to extend the above conductor to a connector. The connector line relay 610 is now energized over a circuit from ground, upper winding of relay 610, over conductors 508 and 217, contacts 2011, upper repeating coil winding 2070′, contacts 2013, resistance 2029, upper winding of relay 2025, resistance 2028, contacts 2015, lower repeating coil winding 2070′, contacts 2016, contacts 2056, conductor 218, conductor 509 to battery at the lower winding of relay 610. Relay 2055 is responsive to dial pulses and at contacts 2056 corresponding pulses are repeated to relay 610. The latter in response to the stated repeated impulses extends the call therefrom in a well known manner. Relay 2025 does not close contacts 2026 until the currents through both windings are in the same direction. Accordingly when the called station answers current is reversed over conductors 217 and 218 at relay 620 and relay 2025 energizes relay 2020 at contacts 2026. Relay 2020 at contacts 2021 extends ground at contacts 2017 to relay 2060 through contacts 2019. Relay 2060 energizes and at contacts 2061—2064 reverses the current to conductors 2099, 2098 causing a relay, corresponding to 2025, to operate at the distant office repeater to reverse the current to the calling party.

A call established with a local termination is releasable when the calling party disconnects, restoring relay 2055 which opens the bridge at contacts 2056, and relay 2035 restores. The connector releases in a well known manner and disconnects ground from conductor 295′. Relay 2010 restores clearing the repeater.

It is obvious from the above description that on a call extended over another repeater, the ground on conductor 295′ is not disconnected until the called operator disconnects. Thus the call is held until both parties disconnect which permits the reversed current feature to be used for supervisory and recall purposes.

*Repeater—Automatic-manual dial back*

The trunk circuit at the manual exchange 290 may be any one of several well known types. It is only necessary to know that the control over the connecting trunk is on a single wire circuit and it is usually applied either as a simplex or a composite (Morse telegraph) leg to the transmission trunk conductors. For explanatory purposes it is shown as a simplex wherein the signals are extended over both conductors in parallel. The manual trunk circuit connected to the control lead mentioned above is used for incoming signalling, transmission of dial pulses and for supervisory purposes.

*Incoming call*

In response to the operator initiating a call over conductors 2398 and 2397 relay 2330 is energized in series with the operator's dial circuit when the trunk is seized at exchange 290. Relay 2330 at contacts 2332 energizes relay 2310 and at contacts 2333 completes a circuit for energizing the line relay in line circuit 211. This circuit is traceable from ground through one winding of the line relay not shown, conductor 212, contacts 2329, upper winding of repeating coil 2393, contacts 2325, upper winding of relay 2355, resistance 2354, lower winding of repeating coil 2393, contacts 2326', 2333 and 2328, conductor 213 to battery at the line relay not shown. The operation of the line relay in the line circuit causes the finder to find line circuit 211 and connect the connector to the calling trunk in a manner similar to that previously described. When the trunk is extended to the connector the connector line relay 610 is substituted for the line relay in the line circuit. At contacts 2312 relay 2310 completes a circuit through the lower polarizing winding of relay 2355 from grounded contacts 2323.

At contacts 2311 relay 2310 opens the holding circuit of allotter relay 2350' thereby causing relay 2350' to restore whereupon the allotter relays operate to preselect another trunk line circuit in a manner to be described hereinafter. The current through the upper winding of relay 2355 flows in an opposite direction to the circuit in the lower winding and relay 2355 does not energize until both windings aid each other.

Relay 2330 in response to dial pulses repeats corresponding impulses at contacts 2333 to the connector line relay 610 to establish the desired connection. During the dialing period relay 2340 is energized at contacts 2331 and 2314 and being slow to release it holds between impulses. At contacts 2341 relay 2355 and resistance 2354 are shunted to improve impulsing. Relay 2340 restores during the interdigital pause.

When the call is answered the current over conductors 212—213 is reversed in a well known manner. The current through both windings of relay 2355 is now in the same direction and relay 2355 energizes. Relay 2355 energizes relay 2350 at contacts 2356. At contacts 2352 the lower high resistance winding of coil 2330 is added to the upper winding in the simplex control path. This increased resistance in the simplex control path causes the supervisory equipment at the manual office to indicate an answered call. When the called station disconnects the current is again reversed restoring relays 2355 and 2350. The simplex control path is transferred to the low resistance upper winding of relay 2330 and the supervisory disconnect signal is energized at the manual board 290. The operator disconnects, restoring relay 2330 followed by relay 2310 and the release of the connected equipment.

Before describing an outgoing call from conductors 1092 and 1093 over conductor 2398, 2397 we will first describe how the trunk line portion shown in Fig. 23 is preselected for connecting with the dial back repeater shown in Fig. 22 by allotter relay equipment. This equipment is similar to the finder allotter in Fig. 4 and is so well known that it need only be briefly reviewed. Each busy trunk opens the circuit to a corresponding allotter relay such as at contacts 2311 or 2322 to open the circuit to 2350' which restores if energized and cannot be reenergized until the above mentioned contacts are closed. When all relays, similar to relays 2350' and 2370', are normal a chain circuit is completed that energizes relay 2340'. At contacts 2342' ground is extended to relays 2350'—2370' over circuits including contacts, such as contacts 2311 and 2322. Each relay corresponding to an idle trunk energizes and locks to ground at contacts 2355'—2375' respectively. The chain circuit through contacts 2371'—2351' is opened and relay 2340' restores. Relay 2330' is slow to release and will not restore during the normal resetting period described above; however, if all trunks are busy relay 2340' does not restore and relay 2330' then restores. At contacts 2331' a ground is extended to conductor 2287 which leads to a busy relay, such as relay 2250 of the preceding trunk equipment as will be described hereinafter. Likewise relay 2300' is energized when the allotted trunk is being extended and opens the circuit to relay 2310'. The latter is slow to release and will hold during the normal connecting period. However if the connection is not extended within the predetermined period relay 2310' restores and completes a shunting circuit from battery, resistance 2392, contacts 2302', 2311', 2343', 2353', contacts 2322 and 2311 to the winding of relay 2350' to battery. Relay 2350' now restores and the next trunk line is preselected by the energization of the next allotter relay, such as relay 2370'.

*Outgoing call*

We will now assume that a call is extended through the finder-connector link and that the connector has established a connection between the calling line and the terminals 1092, 1093 and 1094 terminating in repeater 2100. Relays 2140, 2145 energize over conductors 1092 and 1093, contacts 2134 and 2132 and the left hand windings of repeating coil 2170 in series with the calling line. Relay 2110 is energized over conductor 1094. Relay 2115 energizes from ground at contacts 2142. Relay 2200 energizes from ground at contacts 2118. Relays 2115 and 2200 are the release and hold relays and at contacts 2117 and 2203 extend ground at contacts 2123, 2264 to conductor 1094 from which the connected finder and connector links are held. Relay 2110 is held energized over the above path. At contacts 2111 the ground is disconnected from guard conductor 2112 to release relay 1160 which makes the trunk busy to the trunk selecting relays shown in Fig. 11. At contacts 2119 an audible A. C. tone, such as ringing current through condenser 2280', is extended to the calling line as a signal that the call is being extended. Ground at contacts 2202 energizes relay 2220 over contacts 2211, chain contacts 2279'—2279, contacts 2252, relay 2220, contacts 2222, contacts 2301', series chain contacts 2221'—2221 to battery through resistance 2229. Relay 2220 at contacts 2223 locks to battery before the chain circuit at contacts 2221, 2222 is opened. Relay 2220 at contacts 2226—2227 extends each of the trunk connect relays 2270—2270' to a corresponding allotter relay 2350'—2370'. Only the one circuit is completed at the last named allotter relays. Specifically relay 2270 is energized from ground at relay contacts 2356' over conductor 2288' and locks at contacts 2274' to ground at contacts 2202. Ground at contacts 2273' energizes relay 2320 over conductor 2291. Relay 2320 at contacts 2326 to 2329 disconnects the incoming line circuit and completes the transmission circuit from the calling line to the trunk leading to the distant office through repeating coil 2393. Ground at contacts 2324 energizes relay 2370 which opens the incomplete circuit to relay 2380 at contacts 2371 and at contacts 2372 energizes relay 2360. Relay 2360 opens contacts 2361 and relay 2370 restores. Relay 2360 is held from contacts 2373, 2382, 2362 and 2324. Relay 2360 at contacts 2365—2364 transfers the simplex trunk control path from relay 2330 to direct generator ringing current on conductor 2395 which causes the trunk signal lamp to light in a well known manner. Relay 2350 is now energized from ground at contacts 2232, conductor 2185, contacts 2141, conductor 2184, contacts 2271', conductor 2293, contacts 2363 and through relay 2350 to battery. Relay 2380 energizes after a slight delay which includes the slow to release period of relay 2370. Relay 2380 at contacts 2385 disconnects direct generator and connects direct current to the control path through resistance 2389 as a drain for foreign potentials that remain on the trunk. At contacts 2383 the circuit to relay 2350 is maintained. Relay 2380 opens contacts 2382 and relay 2360 restores, reclosing the control path to relay 2330 which now includes the lower high resistance winding of relay 2330 since contacts 2352 are closed and 2351 opened for supervisory purposes.

When the operator answers the operations are similar to that described for an incoming call. Relay 2330 energizes relay 2310 at contacts 2332 and at contacts 2333 prepares an incomplete pulse repeating circuit. Relay 2310 at contacts 2313 connects ground at contacts 2324 to energize relay 2255 which closes a well known tone induction circuit at contacts 2258 across the voice transmission conductors 2299 and 2292. Briefly reviewed the latter includes condenser 2259', contacts 2258, 2257 and lower winding of coil 2259. Thus any tone on conductor 1094 extends over the upper winding of coil 2259 and is inductively coupled to the trunk for a predetermined interval which is controlled by the delay in energizing relay 2300 from the weighted spring contacts 2256. After a delay relay 2300 energizes through contacts 2256 and opens contacts 2301 to restore relay 2255 and disconnect the tone from the trunk.

Relay 2310 at contacts 2315 energizes relay 2260 over conductor 2295 and contacts 2275. Ground at contacts 2267 energizes relay 2160 which disconnects the waiting signal from the calling line at contacts 2162. At contacts 2268 a multiple ground holding circuit is closed to relay 2200. At contacts 2261 relay 2120 is disconnected from the timer circuit. At contacts 2263 a multiple holding circuit is closed to relays 2270 and 2320. At contacts 2264 the shunt across the upper winding of coil 2259 is removed permitting coil 2259 to act as a tone transformer as described in the preceding paragraph.

It is obvious from the above that the transmission circuit between the calling party and distant operator is completed through repeating coil 2393 and that the repeating coil windings 2170 together with the calling party transmission battery supply coils 2140 and 2145 are bridged across the calling line.

Further, the release of the connection is controlled by relay 2200 which is controlled by the calling party from relays 2140 and 2115 and by the operator from relays 2330, 2310 and 2260. If the calling party disconnects, relay 2140 at contacts 2141 opens the circuit to relay 2350 which restores to give the operator disconnect supervision by substituting the upper low resistance winding of relay 2330 for the lower high resistance winding.

*Dial back*

We will now describe how the called operator extends a connection to another station by dialing back over the same trunk whereon the previous described call was established.

The operator connects her dialing set to the simplex control path of the trunk conductors 2398, 2397 in a well known manner and dials digit 1. Relay 2330 releases responsive to the dial pulse and at contacts 2331 energizes relay 2340. At contacts 2344 and 2345 relay 2340 opens the circuit through the high resistance winding of relay 2330 and closes the pulsing circuit through the upper low resistance winding during the pulsing period. On reenergization of relay 2330 after the first pulse, relay 2330 closes a circuit over contacts 2332, 2345', 2394', conductor 2294, contacts 2276 and 2235 to relay 2230. Relay 2340 at contacts 2346 energizes relay 2155 over contacts 2274 and 2214. Relay 2230 locks to ground at contacts 2204 before contacts 2235 open, at contacts 2232 opens the circuit to relay 2350 which restores, and at contacts 2236 and 2237 extends the conductors 275 and 276 leading to the line circuit 206 to contacts 2333, which causes a finder to extend a connector thereto. The latter circuit is traceable from battery at the line relay, conductor 276, contacts 2236, 2273, conductor 2297, contacts 2327, 2333, 2328', conductor 2298, contacts 2272, conductor 2194, contacts 2156, resistance 2174, conductor 2198, contacts 2237, conductor 275 to ground at the line relay. Relay 2350 at contacts 2352 opens the circuit to the high resistance winding of relay 2330 and at contacts 2351 substitutes the upper low resistance winding so as to give the operator a signal over the simplex control circuit to advise her that the connection has been switched through to the repeater line circuit. When the associated finder finds this line circuit and connects the associated connector of the local link, the operator receives dial tone in the customary manner from the connector and proceeds to dial the digits of the desired subscriber's call number. Contacts 2333 open and close in accordance with further dial pulses and the call is extended over the connector in the usual manner. When the call is answered the current over conductors 275 and 276 is reversed. During the impulsing the slow to release relays 2310 and 2340 hold between successive impulses with relay 2340 restoring during the interdigital pause. Relay 2155 controlled from relay 2140 also restores between digits, removes the shunt at contacts 2156 from across the upper winding of relay 2240 and reconnects the transmission circuit at contacts 2157. The latter is opened during impulsing to prevent objectionable dial clicks to the calling party. The currents through upper and lower windings of relay 2240 oppose each other until the current is reversed on answer whereby both windings aid each other and relay 2240 energizes. Relay 2240 energizes relay 2210 at contacts 2243. Relay 2210 at contacts 2215 and in conjunction with contacts 2143 completes a multiple circuit with contacts 2333 for the established connection on conductors 275 and 276. Relay 2210 at contacts 2216 extends conductor 2283 to the upper winding of relay 2200. Thus ground on conductor 2283 from the established branch connection will hold relay 2200 until the call is disconnected.

Relay 2210 at contacts 2212 completes a circuit for reoperating relay 2350 from ground by way of contacts 2233, 2212, 2141, 2271', and 2383 to battery at relay 2350. Relay 2350 again substitutes the high resistance winding of relay 2330 for the low resistance winding thereby giving the operator a supervisory signal to the effect that the called party has answered.

It is obvious that the operator may stay on the connection or disconnect and free the trunk end of the connection. Assume the operator disconnects. Relay 2330 restores and opens contacts 2332. Relay 2310 restores and opens contacts 2315. Relay 2260 restores and opens the circuit to relays 2270 and 2320. The equipment in Fig. 23 together with relays 2270, 2255 and coil 2259 are now free and can be used for establishing another call.

The call between the calling party and called party over the branch circuit is releasable by the calling party disconnecting. Relay 2140 opens the holding bridge at contacts 2143. Relay 2115 restores together with the holding relay in the connector. Relay 2200 restores and opens the ground to conductor 1094 by which the calling party connection releases. It is obvious that a ground on conductor 2283 will hold the connection at relay 2200. The latter condition exists only if the call is extended over another group of trunks which maintains the stated conductor grounded until the called party disconnects.

In case the repeater 2100 is seized by the local connector and the local connector had previously been operated from a toll trunk, instead of a local subscriber, then the toll relay 644 is operated and as previously described relay 2150 is operated. The circuit for operating relay 2150 may be traced as follows: ground at the connector, contacts 649, conductor 727 in cable 1290, contacts 1203', 1268, conductor 1291 in cable 1254, contacts 1172 of the trunk selecting relay 1169, conductor 2113 and through the upper winding of relay 2150 in repeater 2100. At contacts 2152 relay 2150 locks to grounded conductor 1094 and at contacts 2151 prepares the circuit to reversing relay 2130 so that when the operator answers or when the called subscriber in the dial-back connection answers contacts 2262 or 2242 complete the circuit through contacts 2151 and 2142 to operate relay 2130. Relay 2130 at contacts 2131 shunts contacts 2142, and at contacts 2132 to 2135 reverses battery back over conductors 1092 and 1093 to give the calling toll operator answer supervision.

*Time disconnect*

The repeater 2100 and the local link are automatically released in case the operator does not answer the call within a predetermined time after seizure or in case the subscriber called over the dial-back repeater by the operator does not answer after the operator has disconnected. This time disconnect circuit is controlled by relay 2120 which in turn is controlled from the common timer 760'. The circuit for relay 2120 extends from timer conductor 616, contacts 2121, conductor 2181, contacts 2241 which are closed provided the called subscriber has not answered, contacts 2261 which are closed provided the operator has not answered or has disconnected, contacts 2201, conductor 2182 to battery through relay 2120. When conductor 616 is grounded by the timer after relay 2200 is operated the above traced circuit is completed only if contacts 2241 and 2261 are closed. At contacts 2122 relay 2120 locks itself independent of conductor 616 and at contacts 2123 and 2124 substitutes grounded timer conductor 617 for ground at contacts 2123 to hold the established connection over conductor 1094. Relay 2120 will release if the operator answers or if the called party answers but if relay 2120 is held operated for a predetermined time, ground is then removed from timer conductor 617 with the result that ground is removed from conductor 1094 to release connector relay 660 to cause the release of the connection as previously described.

*Alarm supervisory and alarm checking supervisory*

Fig. 24 diagrammatically shows a portion of the alarm supervisory, alarm checking and alarm sending equipment in order to provide a means for supervising an unattended telephone exchange from an associated manual toll office. It registers alarms as they occur in the office and transmits alarm signals to the toll office. The alarm checking equipment is seized by calling the test number, in this case number "200", plus any ring digit which has been reserved for this purpose. The connectors are arranged so that only an operator or other authorized person in the toll office can dial into this equipment. The circuit is arranged so that more than one test or a whole series of tests in sequence can be made with one call to the alarm checking relays. To do this, a desired test which is first in order is made first, then the next test desired can be made by dialling another digit which is the difference between the number associated with the desired test and the one just completed. By dialling a series of digits "1" into the equipment all of the tests and operations can be made in sequence.

In order to describe the alarm checking circuits it will be assumed that the operator at exchange 16 originates an incoming call over repeater 1600 and then dials the alarm checking number "200", plus a ringing digit. In response to this call the repeater, finder and connector operate in the same manner as previously described. It should be remembered that on an incoming call over repeater 1600 the line circuit 205 causes the operation of relays 300 and 330 which in turn operate restriction relays 420 and 930. The latter relay prepares circuits for controlling toll relays 625 and 644 which permits the calling operator to make certain calls denied to other calling lines. Summarizing briefly, the connector in response to the first digit "2" causes the operation of relay 860 which locks in series with relay 910 and in response to the second digit "0" the tens relay 1040 is energized over the operated contacts 934 of relay 930 and locks in series with relay 900 as previously described. In response to the third digit "0" units relays 1000 and 1020 energize and relay 1020 locks in series with the third digit transfer relay 920. The circuit between the calling operator and the alarm checking circuit is now completed through the operated contacts of relays 1000, 1020 and 1040 to conductors 1095, 1096, 1097 and 1098 terminating the alarm checking circuits. Test relay 780 is now energized from ground, contacts 607 and 668, conductor 696, upper winding of relay 780, contacts 776, conductor 738, contacts 925, conductor 659, contacts 1006, 1027 and 1066, conductor 1097, and through the winding of relay 2410 to battery. Relay 780 operates and locks and at contacts 781 and 782 bridges the upper and lower windings of relay 700 across conductors 637 and 652 and therefore across conductors 1095 and 1096 of the alarm checking circuit. Relay 2400 and contacts 2404 close a bridge across conductors 1095 and 1096 thereby energizing the back bridge relay 700. At contacts 701 relay 700 energizes relay 620 which reverses current back to the calling operator to advise her that the alarm checking circuit has been seized. In response to the fourth digit, which may be any ringing digit, relay 710 is energized as previously described. At contacts 713 relay 710 energizes the register release relay 690 from grounded conductor 655, any one of the operated contacts 814, 824 or 834, conductor 729, contacts 713 and 703, conductor 706 through the lower winding of relay 690 to battery. At contacts 715 relay 710 prepares a pulsing circuit for enabling the operator to pulse the alarm checking relays. Relay 690 restores the operated counting relays as previously described.

When relay 930 operated and closed contacts 936 toll relay 625 was energized from grounded conductor 698, over conductor 699. Relay 625 then energizes and locks to conductor 698 and at contacts 627 prepares another point in the pulsing circuit to the alarm checking relays.

When the alarm checking equipment is seized by the connector relay 2410 is operated over conductor 1097 to prepare the pulsing circuit at contacts 2412 and at contacts 2414 operates relay 2478 which at contacts 2479 transfers the locking circuit of generator alarm relay 2480 to ground at contacts 2414. Relay 2400 is also energized in series with back bridge relay 700 over conductors 1095 and 1096 when the alarm checking equipment is seized. At contacts 2401 relay 2400 energizes slow to operate relay 2402 which at contacts 2403 locks to grounded conductor 1097. At contacts 2404 relay 2402 opens the circuit of relay 2400 and the back bridge relay 700 and relays 2400 and 700 restore. At contacts 2415 relay 2410 closes a circuit for intermittently operating relay 2442 over conductor TP3 which is intermittently connected to ground at the common timer at approximately four second intervals.

When the alarm checking equipment is sezied dial tone and busy tone are intermittently connected to the calling line to indicate to the operator that the tone equipment is functioning and that dialing may take place. This circuit may be traced from the dial tone and busy tone leads through contacts 2444 or 2443, contacts 2441, 2439 and 2437 to line conductor 1096 and thence back through the connector line conductor and eventually to the calling operator.

The single digit 1 dialed into the equipment will cause it to test for fuse alarms. In response to dialing digit 1 line relay 610 and 630 transmit a single ground pulse from ground at contacts 681 over contacts 634, 606 and 666, conductor 693, contacts 715, conductor 694, contacts 627, conductor 695, contacts 784, conductor 739, contacts 1008, 1024 and 1067, conductor 1098, contacts 2412, one branch extending through series relay 2420 to battery and the other branch extending through contacts 2429, 2430 and 2431 through the winding of relay 2435 to battery. Relays 2435 and 2420 operate and the latter relay at contacts 2424 completes a circuit to the slow to release relay 2425. At contacts 2447 relay 2435 closes a locking circuit for itself through relay 2428 and contacts 2438 and 2413. Relay 2428 does not operate until the ground pulse is removed from the pulse conductor 1098. When ground is removed from pulse conductor 1098 relay 2428 energizes in series with relay 2435 and at contacts 2434 transfers the pulse lead to the next counting relay. At contacts 2441 relay 2428 opens the previously traced tone circuit. Relay 2420 restores shortly after the termination of the pulse to close contacts 2421 whereby tone signals are transmitted over conductor 1096 in accordance with the fuse alarm conditions. If there are no fuse alarms then relays 2470 and 2474 will be at normal and dial tone and busy tone will be applied by way of contacts 2471, 2446 and 2475, 2445, contacts 2448, 2421 to conductor 1096 intermittently at about four second intervals. In case relay 2470 is operated over the trunk fuse alarm lead or over the common equipment fuse alarm lead contacts 2471 will be open and no dial tone is transmitted thereby informing the operator of such a condition. In case relay 2474 is operated over the link fuse alarm lead or over the other trunk fuse alarm lead, contacts 2475 will be open and no busy tone is transmitted to the operator.

In order to test for low voltage, charge failure, or commercial power failure the operator dials a second digit 1. Ground on pulse conductor 1098 now operates relay 2450 over contacts 2412, 2429, 2430, 2434 and 2449. At contacts 2451 relay 2450 locks in series with transfer relay 2427 which energizes when the ground pulse is removed. Relay 2427 at 2433 prepares the pulsing circuit to the next counting relay and at contacts 2438 opens the circuit of relays 2428 and 2435 which restore. In case low voltage alarm relay 2485 is at normal dial tone is intermittently connected by way of contacts 2486, 2455, 2452 and 2422 to line conductor 1096 to advise the operator. An absence of dial tone indicates that low voltage alarm relay 2485 has been operated over the low voltage alarm lead. In case charge alarm relay 2490 and commercial power alarm relay 2494 are normal busy tone is intermittently transmitted to the operator over contacts 2491, 2495 and 2454. An absence of busy tone indicates that the charge alarm relay 2490 has been operated over either the charge fuse alarm lead or over the charge alarm lead. In case of a commercial power failure, relay 2494 is energized over the commercial power failure lead and at contacts 2496 reverting call tone is intermittently transmitted to the operator.

In order to transfer the ringing converters the operator dials another single digit 1 to operate relays 2456 and 2426 in a similar manner. A short pulse is transmitted from ground, contacts 2423, 2425' and 2458 to conductor 2405 to the generator transfer relays to cause such relays to transfer from one converter to the other in the well known manner. In case the converter starts up promptly a tone is intermittently transmitted over conductor 2408, contacts 2407 and 2459 to conductor 1096 and to the operator. In case the relay 2480 is operated over the generator alarm lead reverting call tone is transmitted intermittently to the operator over contacts 2481 and 2406.

In order for the operator to find out if an equalizing charge is being given to the battery another single digit is dialled to operate relays 2460 and 2428 and restore relays 2456 and 2426. If the charge is being given relay 2410' is locked energized otherwise the relay is at normal. Dial tone will be transmitted over contacts 2415' and 2462 if an equalizing charge is not being given and busy tone will be transmitted over contacts 2414' and 2462 if a charge is being given.

Dialing another single digit 1 will cause the equalizing charge to be stopped if one is in progress or will cause an equalizing charge to be started if one is not in progress. In response to this single digit 1 relays 2464 and 2427 operate and relays 2460 and 2428 restore. When relay 2420 restores and during the release time of relay 2425 after the pulse, a short ground pulse extends by way of contacts 2411, 2423, 2425', 2467 to the upper and lower windings of relay 2410' and to the upper winding of relay 2420' over contacts 2422' and 2413'. Relays 2410' and 2420' are both differential with the result that relay 2420' alone is operated over the above traced circuit. At contacts 2421' ground is connected to the upper windings of relays 2410' and 2420' to lock relay 2420'. When the short ground pulse to relays 2410' and 2420' is terminated by the deenergization of relay 2425 the circuit through the lower winding of relay 2410' is opened with the result that relay 2410' now operates since its upper winding alone is energized. At contacts 2416' relay 2410 closes a circuit to start the equalizing charge in a well known manner. At contacts 2414' busy tone is substituted for dial tone to transmit such tone to the operator over contacts 2466 to thereby inform the operator that the charge has started. In case the charge was proceeding at the time the operator operated relay 2464 then relays 2410' and 2420' would be operated and such relays would then restore from the short pulse transmitted during the release time of relay 2425. This short pulse would extend through contacts 2412' to the lower winding of relay 2420' thereby causing it to restore. When the ground pulse was removed then the circuit through the upper winding of relay 2410' is opened and relay 2410' restores to stop further charging by opening the charge circuit at contacts 2416'. To disconnect the operator releases the connection to cause the release of the repeater, finder and connector as previously described. In response to the release of the connector ground is removed from conductor 1097 to restore relays 2410 and 2402. Relay 2478 restores when contacts 2414 open and the last operated counting relay and the last operated transfer relay, such as relays 2426, 2427 or 2428 also restore when contacts 2413 open. At contacts 2415 the intermittent operation of relay 2442 is stopped.

A key AK is provided at the alarm checking equipment to allow an attendant to determine which alarms are operated. In response to the operation of key AK battery through resistance 2416 and key contacts 2417 is provided for operating the lamps, such as fuse alarm lamp FL, generator alarm lamp GL, and voltage alarm lamp VL over obvious circuits in case any of the corresponding alarm relays or the charge relay are energized.

Having described the invention, what is considered to be new and is desired to be protected by Letters Patent will be set forth in the following claims.

What is claimed is:

1. In an impulse repeating arrangement, a line relay and a line over which said line relay is released and reoperated intermittently in response to incoming impulses received over said line, a pulse relay, an impulse repeating relay, a circuit for operating and releasing said pulse relay intermittently responsive to said impulses, from back contacts on said impulse repeating relay, a circuit for releasing and reoperating said impulse repeating relay intermittently responsive to said impulses, from make contacts on both said line and pulse relays, and contacts on said impulse repeating relay for repeating said impulses.

2. In an impulse repeater, a line relay operated in response to incoming impulses, a pulse relay energized and released in response to the operations of said line relay, a pair of impulse repeating relays the first of which is energized by the release of said pulse relay and the second of which is energized in response to the energization of the first impulse repeating relay, a lock relay energized in response to the release of said pulse relay and the energization of said first impulse repeating relay, means for locking said lock relay independent of said first impulse repeating relay, means controlled by the energization of said second impulse repeating relay for releasing said first impulse repeating relay whereby the release of said first impulse repeating relay causes the release of said second impulse repeating relay, impulse repeating contacts on said impulse repeating relays for repeating said incoming impulses, and circuit means whereby said pulse relay is conditioned for reoperation solely by the energization of said lock relay and is then reenergized in response to the operation of said line relay.

3. In an impulse repeater, a line relay operated in response to incoming pulses, a pulse relay operated by said line relay, a pair of impulse repeating relays the first of which is controlled by said pulse relay and the second of which is controlled by said first impulse repeating relay, a lock relay controlled by both said first impulse repeating relay and said pulse relay, contacts on said impulse repeating relays for repeating impulses, and circuit means whereby each repeated impulse starts with the opening of one of said contacts on the first of said repeating relays and the time period of each repeated pulse comprises only the operate time of the second of said impulse repeating relays and the release time of both said impulse repeating relays irrespective of any other relay operations.

4. In an impulse repeater including a line relay, a pulse relay, a lock relay, and a first and a second impulse repeating relay, said line relay operated in response to incoming impulses, contacts on said line relay for controlling the operation of said pulse relay, contacts on said pulse relay for controlling the operation of said first impulse repeating relay, contacts on said first impulse repeating relay for controlling the operation of said second impulse repeating relay, other contacts on said first impulse repeating relay for controlling the operation of said lock relay, contacts on said second impulse repeating relay for controlling the release of said first impulse repeating relay and impulse repeating contacts on both said impulse repeating relays for repeating impulses.

5. In an impulse repeater including a line relay, a pulse relay, a lock relay, and a first and a second impulse repeating relay, said line relay operated in response to incoming impulses, contacts on said line relay for controlling the operation of said pulse relay, contacts on said pulse relay for controlling the operation of said first impulse repeating relay, contacts on said first impulse repeating relay for controlling the operation of said second impulse repeating relay, other contacts on said first impulse repeating relay for controlling the operation of said lock relay, contacts on said second impulse repeating relay for controlling the release of said first impulse repeating relay, impulse repeating contacts on both said impulse repeating relays for repeating impulses, and contacts on said lock relay cooperating with said line relay contacts for controlling the operations of said pulse relay independent of said impulse repeating relays.

6. In a telephone system, a plurality of lines having different classes of service, a repeater for extending calls from lines of at least two of said different classes of service, means in said repeater responsive to incoming digits for repeating corresponding digits, a counting switch in said repeater operated in case the call is from a line of one class of service for counting the number of digits, means operated by said counting switch after a predetermined number of digits have been counted for disabling said repeating means to repeat subsequent digits, and means operative in case the call is from a line of a different class of service for disabling said counting switch to count the incoming digits to enable said repeating means to repeat an unlimited number of digits.

7. In a telephone system, an operator's position, a plurality of toll trunks extending to said position, a plurality of dial back repeaters, a toll trunk allotter operative to preselect idle ones of said toll trunks, each dial back repeater including one connect relay for each toll trunk for interconnecting said dial back repeaters and said toll trunks, a dial back relay chain comprising a relay individual to each dial back repeater, each dial back relay being common to said toll trunks, means responsive to a call extended to any one of said dial back repeaters for operating the corresponding individual dial back relay, contacts operated by said individual dial back relay for operating the connect relay in said one dial back repeater corresponding to the preselected idle one of said toll trunks to connect said one dial back repeater to said preselected toll trunk thereby routing the call to said operator's position, and means controllable from said operator's position for extending a call routed thereto over any one of said toll trunks revertively over said one toll trunk and the connected dial back repeater.

8. In a telephone system, an operator's position, a plurality of toll trunks extending to said position, a plurality of dial back repeaters, each dial back repeater including one connect relay for each toll trunk for interconnecting said dial back repeaters and said toll trunks, a dial back relay chain comprising a relay individual to each dial back repeater, each dial back relay being common to said toll trunks, a toll trunk marking lead for each toll trunk, a toll trunk allotter operative to preselect an idle one of said toll trunks by marking the corresponding one of said marking leads, means responsive to a call extended to any one of said dial back repeaters for operating the corresponding individual dial back relay, means controlled by the operated individual dial back relay for extending all said marking leads to the connect relays in said one dial back repeater to thereby operate the connect relay corresponding to the preselected marking lead marked by said allotter, and means operated by said last mentioned connect relay for operatively connecting said one dial back repeater with said preselected toll trunk.

9. In a telephone system, an operator's position, a plurality of toll trunks extending to said position, a plurality of dial back repeaters, each dial back repeater including one connect relay for each toll trunk for interconnecting said dial back repeaters and said toll trunks, a dial back relay chain comprising a relay individual to each dial back repeater, each dial back relay being common to said toll trunks, a toll trunk marking lead for each toll trunk, a toll trunk allotter operative to preselect an idle one of said toll trunks by marking the corresponding one of said marking leads, means responsive to a call extended to any one of said dial back repeaters for operating the corresponding individual dial back relay, means controlled by the operated individual dial back relay for extending all said marking leads to the connect relays in said one dial back repeater to thereby operate the connect relay corresponding to the preselected marking lead marked by said allotter, means operated by said last mentioned connect relay for operatively connecting said one dial back repeater with said preselected toll trunk, means responsive to the operation of said last mentioned connect relay for releasing said operated one dial back relay to disassociate said marking leads from said connect relays, means responsive to the release of said one dial back relay for conditioning the dial back relays in said dial back relay chain for operation in response to calls extended to said dial back repeaters, and means in said toll trunk allotter responsive to the connection of said one dial back repeater with said preselected toll trunk for removing said previous marking and for marking another toll trunk marking lead corresponding to an idle toll trunk to preselect said other toll trunk.

JOHN H. VOSS.
ROY W. JONES.

REFERENCES CITED

The following references are of record in the file of this patent:

UNITED STATES PATENTS

| Number | Name | Date |
|---|---|---|
| 1,746,327 | Von Beckerath | Feb. 11, 1930 |
| 1,867,791 | Zaph | July 19, 1932 |